US012729133B2

(12) United States Patent
Patheria et al.

(10) Patent No.: US 12,729,133 B2
(45) Date of Patent: Sep. 8, 2026

(54) LITHIUM-RICH ALUMINUM IRON SULFIDE Li-ION BATTERY CATHODES

(71) Applicant: California Institute of Technology, Pasadena, CA (US)

(72) Inventors: Eshaan S. Patheria, Pasadena, CA (US); Kimberly A. Robb, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 425 days.

(21) Appl. No.: 18/369,425

(22) Filed: Sep. 18, 2023

(65) Prior Publication Data

US 2024/0109786 A1 Apr. 4, 2024

Related U.S. Application Data

(60) Provisional application No. 63/408,025, filed on Sep. 19, 2022.

(51) Int. Cl.
*C01G 49/12* (2006.01)
*H01M 10/0525* (2010.01)

(52) U.S. Cl.
CPC .......... *C01G 49/12* (2013.01); *C01P 2002/30* (2013.01); *C01P 2002/60* (2013.01); *C01P 2002/72* (2013.01); *C01P 2006/40* (2013.01); *H01M 10/0525* (2013.01)

(58) Field of Classification Search
CPC ............................ H01M 4/136; H01M 4/1397
See application file for complete search history.

(56) References Cited

U.S. PATENT DOCUMENTS

| | | | |
|---|---|---|---|
| 2011/0193015 A1 | 8/2011 | Yamamoto et al. |
| 2011/0200882 A1 | 8/2011 | Barker et al. |
| 2015/0349377 A1 | 12/2015 | Sugura et al. |

FOREIGN PATENT DOCUMENTS

| | | |
|---|---|---|
| EP | 3798183 | 3/2021 |
| WO | WO 2023/235559 A1 | 12/2023 |

OTHER PUBLICATIONS

Brec et al. (1989) "Redox processes in the $Li_xFeS_2$/Li electrochemical system studied through crystal, Mössbauer, and EXAFS analyses," J. Power Sources, 26, 325.

Dey et al. (2009) "S K-edge XAS and DFT Calculations on Cytochrome P450: Covalent and Ionic Contributions to the Cysteine-Fe Bond and Their Contribution to Reactivity," J. Am. Chem. Soc. 131, 7869-7878.

(Continued)

*Primary Examiner* — Stephan J Essex
(74) *Attorney, Agent, or Firm* — Leydig, Voit & Mayer, Ltd.

(57) ABSTRACT

Provided herein are compositions, devices, electrochemical systems, and methods relating to lithium-rich iron sulfide lithium-ion battery cathodes. In one embodiment, a composition may be characterized by formula FX1: $Li_{w-\delta}Al_xFe_zS_2$. In some embodiments, w may be greater than or equal to 2 and less than or equal to 2.5. In some embodiments, x may be greater than 0 and less than or equal to 0.5. In some embodiments, z may be greater than 0 and less than or equal to 1. In some embodiments, δ may be greater than or equal to 0 and less than w. In some embodiments, the composition may have a net charge of 0.

26 Claims, 50 Drawing Sheets

(56) References Cited

OTHER PUBLICATIONS

Dugast et al. (1981) "$Li_2FeS_2$, a cathodic material for lithium secondary battery," Solid State Ionics, 5, 375.
Flamary-Mespoulie et al. (2020) "Lithium-rich layered titanium sulfides: Cobalt- and Nickel-free high capacity cathode materials for lithium-ion batteries," Energy Storage Mater. 26, 213-222.
Fong et al. (Nov. 1989) "Electrochemistry of Pyrite-Based Cathodes for Ambient Temperature Lithium Batteries," J. Electrochem. Soc. 136, 3206.
Fong et al. (Mar. 1989) "New $Li_{2-x}Cu_xFeS_2$ (0<x<1) and $Cu_xFeS_2$ (~0.25<x<1) phases," Physical Review B, vol. 39, No. 7, pp. 4424-4429.
Gamon et al. (2019) "Computationally Guided Discovery of the Sulfide $Li_3AlS_3$ in the Li—Al—S Phase Field: Structure and Lithium Conductivity," Chem. Mater. 31 (23), 9699-9714.https://doi.org/10.1021/acs.chemmater.9b03230.
Gamon et al. (Nov. 2021) "$Li_{4.3}AlS_{3.3}Cl_{0.7}$: A Sulfide-Chloride Lithium Ion Conductor with Highly Disordered Structure and Increased Conductivity," Chem. Mater. 33 (22), 8733-8744.https://doi.org/10.1021/acs.chemmater.1c02751.A.
Gard et al. (1986) "Infrared study of lithium intercalated phases in the $Li_xFeS_2$ system (0 < > < 2). Characterization of a new iron disulfide," Solid State Ionics, 20, 231.
Gaultois et al. (2013) "Data-Driven Review of Thermoelectric Materials: Performance and Resource Considerations," Chem. Mater. 25, 2911-2920.
Goodenough (1978) "Structural Chemistry of Iron Sulfides," Materials Research Bulletin, 13 (12), 1305-1314. https://doi.org/10.1016/0025-5408(78)90121-6.
James et al. (1988) "Structure and bonding in lithium ruthenate, $Li_2RuO_3$," J. Solid State Chem. 74, 287-294.
Hansen et al. (2020) "Multielectron, Cation and Anion Redox in Lithium-Rich Iron Sulfide Cathodes," J. Am.Chem. Soc. 142 (14), 6737-6749. https://doi.org/10.1021/jacs.0c00909.
House et al. (Feb. 2023) "Delocalized Electron Holes on Oxygen in a Battery Cathode," Nat Energy, 351-360.https://doi.org/10.1038/s41560-023-01211-0.5.
House et al. (Mar. 2021) "The Role of O2 in O-Redox Cathodes for Li-Ion Batteries," Nature Energy, 781-789.
International Search Report and Written Opinion, dated Jan. 10, 2024, corresponding to International Application No. PCT/US2023/033004, 12 pp.
Janek et al. (2016) "A solid future for battery development," Nature Energy, 1, 16141.
Kendrick et al. (2011) "The rate characteristics of lithium iron sulfide," J. Power Sources, 196, 6929-6933.
Kennedy et al. (1991) "Aluminum substitution in the glass system $0.33[(1-x)P_2S_5-xAl_2S_3]-0.67Li_2S$," Solid State Ionics, vol. 45, pp. 21-27.
Kitajou et al. (2014) "Discharge/charge reaction mechanism of a pyrite-type FeS2 cathode for sodium secondary batteries," J. Power Sources, 247, 391-395.
Kobayashi(1995) "Structure and lithium deintercalation of $Li_{2-x}RuO_3$," Solid State lonics, 82, 25-31.
Li et al. (Jun. 2022) "Capturing Dynamic Ligand-to-Metal Charge Transfer with a Long-Lived Cationic Intermediate for An-ionic Redox," Nature Materials, 21, 1165-1174.
Li et al. (Sep. 2021) "Correlating Ligand-to-Metal Charge Transfer with Voltage Hysteresis in a Li-rich Rock-Salt Compound Exhibiting Anionic Redox," Nature Chemistry, 13, 1070-1080.
Lim et al. (2018) "Structure of $Li_5AlS_4$ and Comparison with Other Lithium-Containing Metal Sulfides," Journal of Solid State Chemistry, 257, 19-25. https://doi.org/10.1016/j.jssc.2017.09.018.
Martinolich et al. (Jan. 2021) "Controlling Covalency and Anion Redox Potentials through Anion Substitution in Li-Rich Chalcogenides," Chem. Mater. 33, 378-391.
Mccalla et al. (Mar. 2015) "Understanding the Roles of Anionic Redox and Oxygen Release during Electrochemical Cycling of Lithium-Rich Layered $Li_4FeSbO_6$," J. Am. Chem. Soc. 137 (14), 4804-4814. https://doi.org/10.1021/jacs.5b01424.
Mccalla et al. (Dec. 2015) "Visualization of O—O Peroxo-like Dimers in High-Capacity Layered Oxides for Li-ion Batteries," Science, 350, 1516-1521.
Miura et al. (2007) "New-Type Phase Transition of $Li_2RuO_3$ with Honeycomb Structure," J. Phys. Soc. Jpn, 76, 033705.
Nitta et al. (2015) "Li-ion battery materials: present and future," Materials Today, 18 (5), 252-264.
Sathiya et al. (2013) "Reversible An-ionic Redox Chemistry in High-Capacity Layered-Oxide Electrodes," Nature Materials, 12, 827-835.
Thackeray (2007) "Li2MnO3-stabilized $LiMO_2$ (M = Mn, Ni, Co) electrodes for lithium-ion batteries," J. Mater. Chem. 17, 3112-3125.
Zak et al. (Jun. 2022) "An Exploration of Sulfur Redox in Lithium Battery Cathodes," J. Am. Chem. Soc. 144 (23), 10119-10132.

LITHIUM-RICH ALUMINUM IRON SULFIDE Li-ION BATTERY CATHODES

CROSS-REFERENCE TO RELATED APPLICATIONS

This application claims the benefit of priority to U.S. Provisional Patent Application No. 63/408,025, filed Sep. 19, 2022, which is hereby incorporated by reference in its entirety.

STATEMENT REGARDING FEDERALLY SPONSORED RESEARCH OR DEVELOPMENT

This invention was made with government support under Grant No. DE-SC0019381 awarded by the Department of Energy. The government has certain rights in the invention.

BACKGROUND OF INVENTION

The theoretical energy density limit of current lithium-ion battery cathode materials is set by the single-electron intercalation transition metal redox mechanism. Recently, the scarcity of battery-grade cobalt and nickel has prompted a surge in $LiFePO_4$, which is favored as a more scalable material given the relative abundance and low-cost of Fe and $PO_4$. However, $LiFePO_4$ is significantly less energy-dense than NMC 811. Single-electron redox itself imposes a theoretical limit on energy density. Thus, new positive electrode materials that both use highly abundant elements and surpass the single-electron redox paradigm must be developed to meet global energy storage demands.

SUMMARY OF THE INVENTION

Provided herein are compositions, materials, devices, device components, systems, and methods, for example, relating to electrochemical systems and components thereof, such as lithium-ion batteries and lithium-rich iron sulfide lithium-ion battery cathodes. For example, in aspects herein, provided are compositions characterized by formula FX1: $Li_{w-\delta}Al_xFe_zS_2$. In some aspects, provided are compositions characterized by formula FX1, wherein w is greater than or equal to 2 and less than or equal to 2.5; x is greater than 0 and less than or equal to 0.5; z is greater than 0 and less than or equal to 1; and δ is greater than or equal to 0 and less than w; optionally wherein the composition has a net charge of 0, optionally wherein the composition has an average net charge of 0, optionally wherein the composition is charge balanced, and optionally wherein the composition has a bulk phase characterized by an average charge of 0 and/or a bulk phase that is charge balanced. In some aspects, the present compositions exclude $Li_{w-\delta}Al_xFe_zS_2$, wherein x is equal to 0 and/or wherein z is equal to 0.

In some aspects, provided herein are devices, device components or systems comprising a composition, such as an electrode composition, as disclosed herein. In some aspects, provided herein are electrochemical systems, such as a battery or flow cell, having an electrode comprising a composition as disclosed herein. In some aspects, provided herein is a cathode of an electrochemical system, such as a lithium ion battery, wherein the cathode comprises a composition as disclosed herein.

In some aspects, provided herein are methods of making a composition comprising: (i) providing a first amount of $Li_2FeS_2$ and a second amount of $Li_{2.5}Al_{0.5}S_2$; (ii) combining the first amount of $Li_2FeS_2$ and the second amount of $Li_{2.5}Al_{0.5}S_2$, thereby forming a combination; and (iii) heating the combination to form the composition having a lithium iron aluminum sulfide composition; wherein the lithium iron aluminum sulfide composition is characterized by formula FX1: $Li_{w-\delta}Al_xFe_zS_2$; wherein w is greater than or equal to 2 and less than or equal to 2.5; x is greater than 0 and less than or equal to 0.5; z is greater than 0 and less than or equal to 1 and wherein δ is greater than or equal to 0 and less than w; optionally wherein the lithium iron aluminum sulfide composition has a net charge of 0, optionally wherein the composition has an average net charge of 0, optionally wherein the composition is charge balanced, and optionally wherein the composition has a bulk phase characterized by an average charge of 0 and/or a bulk phase that is charge balanced.

In some aspects, provided herein are methods of making a composition comprising: (i) providing a first amount of $Li_2S$, a second amount of FeS, and a third amount of $Al_2S_3$; (ii) combining the first amount of $Li_2S$, the second amount of FeS, and the third amount of $Al_2S_3$, thereby forming a combination; and (iii) heating the combination to form the composition having a lithium iron aluminum sulfide composition; wherein the lithium iron aluminum sulfide composition is characterized by formula FX1: $Li_{w-\delta}Al_xFe_zS_2$; wherein w is greater than or equal to 2 and less than or equal to 2.5; x is greater than 0 and less than or equal to 0.5; z is greater than 0 and less than or equal to 1; and 5 is greater than or equal to 0 and less than w; optionally wherein the composition has an average net charge of 0, optionally wherein the composition is charge balanced, and optionally wherein the composition has a bulk phase characterized by an average charge of 0 and/or a bulk phase that is charge balanced.

In some aspects, provided herein are compositions characterized by formula FX7: $Li_{2-\delta}FeS_uSe_v$; wherein u is greater than 0 and less than 2; v is greater than 0 and less than 2; and δ is greater than or equal to 0 and less than 2; optionally wherein the composition has an average net charge of 0, optionally wherein the composition is charge balanced, and optionally wherein the composition has a bulk phase characterized by an average charge of 0 and/or a bulk phase that is charge balanced.

In some aspects, provided herein are compositions characterized by formula FX9: $Li_{2-\varepsilon}Al_xFe_rQ_qS_2$; wherein x is greater than or equal to 0 and less than or equal to 0.67; r is greater than or equal to 0 and less than or equal to 1; q is greater than or equal to 0 and less than or equal to 0.33; ε is greater than or equal to 0 and less than or equal to 2; wherein the extrinsic cation vacancy is represented in the chemical formula as Q; optionally wherein the composition has an average net charge of 0, optionally wherein the composition is charge balanced, and optionally wherein the composition has a bulk phase characterized by an average charge of 0 and/or a bulk phase that is charge balanced.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 2D shows unit cell volume is a linear function of y with $R^2$=0.966; the error bars are the standard deviation of the unit-cell volume of at least two separate refinements of diffraction patterns of separate syntheses of the same material i.e., standard deviation between two replicates.

STATEMENTS REGARDING CHEMICAL COMPOUNDS AND NOMENCLATURE

Figure 1A:
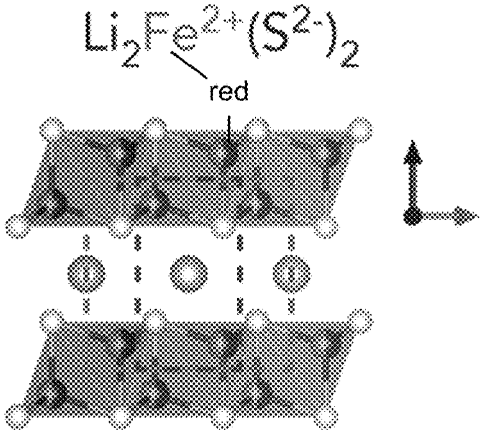
FIGS. 1A-1D: Crystals structures of (FIG. 1A) $Li_2FeS_2$ projected along the a-axis, and (FIG. 1B) along the c-axis, and of (FIG. 1C) $Li_5AlS_4$ projected along the b-axis, and (FIG. 1D) along the c-axis.
Figure 1B:
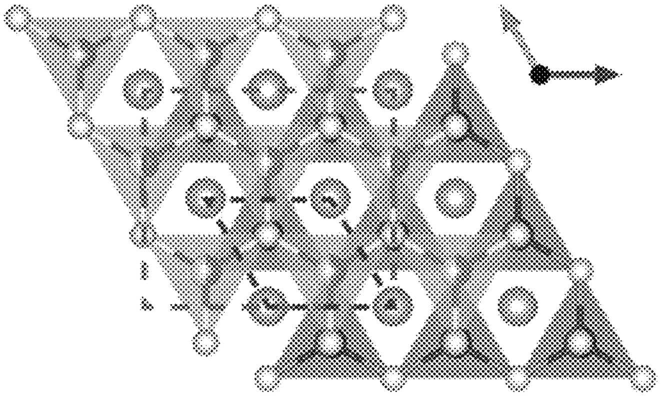
Figure 1C:
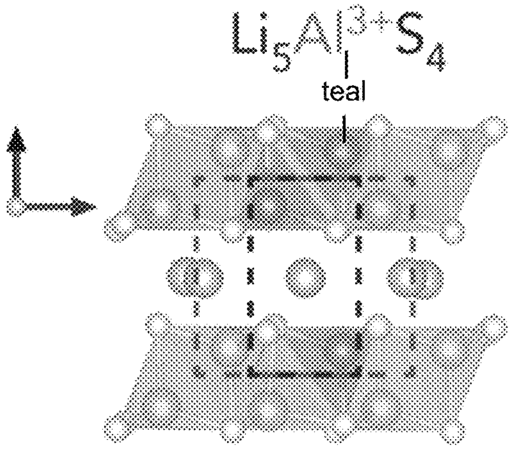
Figure 1D:
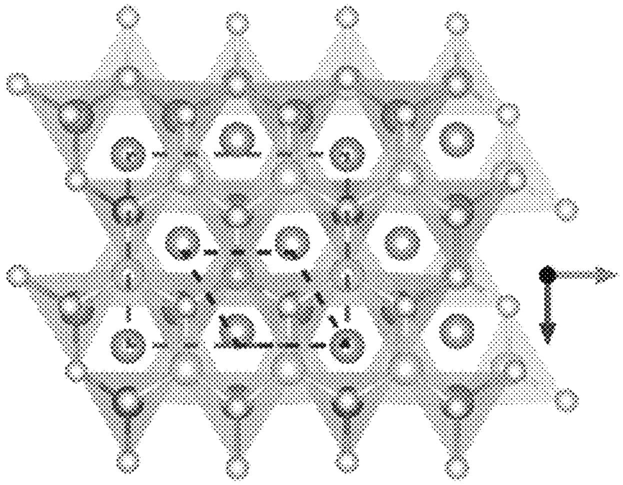

In general, the terms and phrases used herein have their art-recognized meaning, which can be found by reference to standard texts, journal references and contexts known to those skilled in the art. The following definitions are provided to clarify their specific use in the context of the invention.

The term "solid solution" refers to a homogeneous mixture of at least two crystalline materials in the solid state, such that the mixture can be described by (or optionally approximately as) a single crystal structure rather than a phase-separated mixture of the crystal structures of the individual components. In such a solid solution, the solid solution can be described by (or optionally approximately as) a single empirical molecular formula. Across the range of compositions covered by the term "solid solution," parameters that describe the crystal structure (e.g., lattice parameters, unit cell volume, etc.) may trend substantially linearly between the end-members of the solid solution (i.e. said parameters should follow Vegard's Law). In some examples, the single crystal structure may be characterized by a trigonal or monoclinic space group. In some examples, the single crystal structure may be characterized by a $P2_1/m$ monoclinic space group.

The term "extrinsic vacancy" refers to a vacancy in a crystal lattice that is reflected in the nominal formula of the crystal lattice. Extrinsic vacancies may be intentionally introduced into the crystal lattice, for example, by targeted chemical substitution. The number of extrinsic vacancies in a given crystal lattice may be independent of temperature.

The term "intrinsic vacancy" refers to a vacancy in a crystal lattice that is not reflected in the nominal formula of the crystal lattice. Types of intrinsic vacancies include vacancies due to Frenkel defects and Schottky defects. Intrinsic vacancies occur naturally in all crystalline materials. The number of intrinsic vacancies in a given crystal lattice varies with temperature. This temperature dependence can be modeled by the equation:

$$N_v = N\exp\left(\frac{-Q_v}{k_B T}\right),$$

where $N_v$ is the vacancy concentration, $Q_v$ is the energy required for vacancy formation, $k_B$ is Boltzmann constant, T is the absolute temperature, and N is the concentration of atomic sites.

The terms "cation vacancy concentration" and "anion vacancy concentration" refer to the concentration of extrinsic and intrinsic vacancies in a crystal lattice where the vacancies can accept a cation or anion, respectively. The vacancy concentration may vary with temperature. It is usually expressed as the ratio of vacant lattice sites to those containing atoms.

Similarly, the terms "extrinsic cation vacancy concentration" and "extrinsic anion vacancy concentration" refer to the concentration of extrinsic vacancies in a crystal lattice where the vacancies can accept a cation or anion, respectively.

The term "electrochemical cell" refers to a device that generates electrical energy from chemical reactions. Some examples include voltaic cells, galvanic cells, electrolytic cells, and fuel cells. Electrochemical cells include primary and secondary batteries, such as lithium batteries and lithium ion batteries.

The term "rechargeable" refers to the ability of an electrochemical cell or a battery to be charged, discharged into a load, and subsequently recharged multiple times. Such electrochemical cells and batteries are able to be charged due to the reversibility of the chemical reactions that occur within them.

The term "lithium battery" or "Li-ion battery" include batteries or electrochemical cells that employ lithium ions, for example, as charge carriers in order to counterbalance the charge deficit created by the movement of electrons from the cathode to the anode during discharge. Alternatively or additionally, a lithium battery or Li-ion battery may use lithium ions to counterbalance the charge deficit created by the movement of electrons from the anode to the cathode during charging.

In an embodiment, a composition or compound of the invention, such as an alloy or a precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Certain exemplary aspects and embodiments:

Various aspects are contemplated and disclosed herein, several of which are set forth in the paragraphs below. It is explicitly contemplated and disclosed that any aspect or portion thereof can be combined to form an aspect. In addition, it is explicitly contemplated and disclosed that: any reference to Aspect 1 includes reference to Aspects 1a, 1b, 1c, 1d, . . . , 1n, and/or 1o, and any combination thereof (i.e., any reference to an aspect includes reference to that aspect's lettered versions). Moreover, the terms "any preceding aspect" and "any one of the preceding aspects" means any aspect that appears prior to the aspect that contains such phrase (for example, the sentence "Aspect 15: The material, device, electrolyte, or method of any preceding Aspect . . . " means that any Aspect prior to Aspect 15 is referenced, including letter versions). For example, it is contemplated and disclosed that, optionally, any composition, method, or formulation of any of the below aspects may be useful with or combined with any other aspect provided below. Further, for example, it is contemplated and disclosed that any embodiment or aspect described above may, optionally, be combined with any of the below listed aspects or any portion(s) thereof.

Aspect 1a: A composition characterized by formula FX1:

$$Li_{w-\delta}Al_xFe_zS_2; \quad \text{(FX1)}$$

wherein w is greater than or equal to 2 and less than or equal to 2.5;

wherein x is greater than 0 and less than or equal to 0.5;

wherein z is greater than 0 and less than or equal to 1; and wherein δ is greater than or equal to 0 and less than w.

Aspect 1 b: A composition characterized by formula FX1:

$$Li_{w-\delta}Al_xFe_zS_2; \quad \text{(FX1)}$$

wherein w is greater than or equal to 2 and less than or equal to 2.5;

wherein x is greater than 0 and less than or equal to 0.5;

wherein z is greater than or equal to 0 and less than or equal to 1;

wherein δ is greater than or equal to 0 and less than w; and wherein the composition has an average net charge of 0, optionally wherein the composition is charge balanced, and optionally wherein the composition has a bulk phase characterized by an average charge of 0 and/or a bulk phase that is charge balanced.

Aspect 1c: A composition characterized by formula FX1:

$$Li_{w-\delta}Al_xFe_zS_2; \quad \text{(FX1)}$$

wherein w is greater than or equal to 2 and less than or equal to 2.5;

wherein x is greater than 0 and less than or equal to 0.5;

wherein z is greater than or equal to 0 and less than or equal to 1;

wherein δ is greater than or equal to 0 and less than w; and wherein the composition is charge balanced.

Aspect 1d: The composition or method of any one of Aspects 1a-1c or 39-54, wherein:

the composition is characterized by formula FX2:

$$Li_{2+y-\delta}Al_yFe_{1-2y}S_2; \quad \text{(FX2)}$$

wherein y is greater than 0 and less than 0.5;

wherein δ is greater than or equal to 0 and less than 2+y.

Aspect 1e: The composition or method of any one of Aspects 1a-1d or 39-54, wherein:

the composition is characterized by formula FX3:

$$Li_{2+y}Al_yFe_{1-2y}S_2; \quad \text{(FX3)}$$

wherein y is greater than 0 and less than 0.5.

Aspect 1f: A composition characterized by formula FX7:

$$Li_{2-\delta}FeS_uSe_v; \quad \text{(FX7)}$$

wherein u is greater than 0 and less than 2;

wherein v is greater than 0 and less than 2; and wherein δ is greater than or equal to 0 and less than 2.

Aspect 1g: The composition or method of any one of Aspects 1f or 39-54, wherein:

the composition is characterized by formula FX8:

$$Li_{2-\delta}FeS_{2-k}Se_k; \quad \text{(FX8)}$$

wherein k is greater than 0 and less than 2; and wherein δ is greater than or equal to 0 and less than 2.

Aspect 1 h: A composition characterized by formula FX9:

$$Li_{2-\varepsilon}Al_xFe_rQ_qS_2; \quad \text{(FX9)}$$

x is greater than or equal to 0 and less than or equal to 0.67;

r is greater than or equal to 0 and less than or equal to 1;

q is greater than or equal to 0 and less than or equal to 0.33;

ε is greater than or equal to 0 and less than or equal to 2;

the composition comprises extrinsic cation vacancies, where an extrinsic cation vacancy is represented in the chemical formula as Q; and the composition has a net charge of 0.

Aspect 1i: The composition or method of any one of Aspects 1h or 39-54, wherein:

the composition is characterized by formula FX10:

$$Li_{2-\varepsilon}Al_xFe_{1-1.5x}Q_{0.5x}S_2; \quad \text{(FX10)}$$

x is greater than or equal to 0 and less than or equal to 0.67;

ε is greater than or equal to 0 and less than or equal to 2; and the composition comprises extrinsic cation vacancies, where an extrinsic cation vacancy is represented in the chemical formula as Q.

Aspect 1j: A device comprising the composition of any one of the preceding Aspects.

Aspect 1k: An electrochemical system comprising a cathode comprising the composition of any one of the preceding Aspects.

Aspect 1l: A cathode of an electrochemical system, the cathode comprising the composition of any one of the preceding Aspects.

Aspect 1m: A method of making a composition of any one of the preceding Aspects.

Aspect 1n: The method of Aspect 1m, the method comprising:

providing a first amount of $Li_2FeS_2$ and a second amount of $Li_{2.5}Al_{0.5}S_2$; (operation 3710)

combining the first amount of $Li_2FeS_2$ and the second amount of $Li_{2.5}Al_{0.5}S_2$, thereby forming a combination; (operation 3720) and heating the combination having a lithium iron aluminum sulfide composition; (operation 3730)

wherein the lithium iron aluminum sulfide composition is characterized by formula FX1:

$$Li_{w-\delta}Al_xFe_zS_2; \quad \text{(FX1)}$$

wherein w is greater than or equal to 2 and less than or equal to 2.5;

wherein x is greater than 0 and less than or equal to 0.5;

wherein z is greater than 0 and less than or equal to 1;

wherein δ is greater than or equal to 0 and less than w; and wherein the composition has an average net charge of 0, optionally wherein the composition is charge balanced, and optionally wherein the composition has a bulk phase characterized by an average charge of 0 and/or a bulk phase that is charge balanced.

Aspect 1o: The method of Aspect 1m or 1n, the method comprising:

providing a first amount of $Li_2S$, a second amount of FeS, and a third amount of $Al_2S_3$; (operation 3810)

combining the first amount of $Li_2S$, the second amount of FeS, and the third amount of $Al_2S_3$, thereby forming a combination; (operation 3820) and heating the combination to form the composition having a lithium iron aluminum sulfide composition; (operation 3830)

wherein the lithium iron aluminum sulfide composition is characterized by formula FX1:

$$Li_{w-\delta}Al_xFe_zS_2; \quad \text{(FX1)}$$

wherein w is greater than or equal to 2 and less than or equal to 2.5;

wherein x is greater than 0 and less than or equal to 0.5;

wherein z is greater than 0 and less than or equal to 1;

wherein δ is greater than or equal to 0 and less than w; and wherein the composition has an average net charge of 0, optionally wherein the composition is charge balanced, and optionally wherein the composition has a bulk phase characterized by an average charge of 0 and/or a bulk phase that is charge balanced.

Aspect 2a: The composition or method of any one of Aspects 1 b-1c or 39-54, wherein y is selected from the range of 0.1 to 0.3.

Aspect 2b: The composition or method of any one of Aspects 1 b-1c or 2a or 39-54, wherein y is selected from the range of 0.15 to 0.25.

Aspect 2c: The composition or method of any one of Aspects 1 b-1c or 2a-2b or 39-54, wherein y is equal to 0.2.

Aspect 2d: The composition or method of any one of Aspects 1 b-1c or 2a-2c or 39-54, wherein y is optionally less than 0.5, less than 0.45, less than 0.4, less than 0.35, less than 0.3, less than 0.25, less than 0.2, less than 0.15, less than 0.1, or less than 0.05.

Aspect 2e: The composition or method of any one of Aspects 1 b-1c or 2a-2c or 39-54, wherein y is optionally more than 0, more than 0.05, more than 0.1, more than 0.15, more than 0.2, more than 0.25, more than 0.3, more than 0.35, more than 0.4, or more than 0.45.

Aspect 2f: The composition or method of any one of Aspects 1 b-1c or 2a-2c or 39-54 wherein y is optionally selected from the range of 0 to 0.5, the range of 0.05 to 0.5, the range of 0.1 to 0.5, the range of 0.15 to 0.5, the range of 0.2 to 0.5, the range of 0.25 to 0.5, the range of 0.3 to 0.5, the range of 0.35 to 0.5, the range of 0.4 to 0.5, the range of 0.45 to 0.5, the range of 0 to 0.45, the range of 0 to 0.4, the range of 0 to 0.35, the range of 0 to 0.3, the range of 0 to 0.25, the range of 0 to 0.2, the range of 0 to 0.15, the range of 0 to 0.1, the range of 0 to 0.05, the range of 0.05 to 0.45, the range of 0.1 to 0.4, the range of 0.15 to 0.35, the range of 0.2 to 0.3, the range of 0.05 to 0.35, the range of 0.1 to 0.3, or the range of 0.15 to 0.25.

Aspect 3: The composition or method of any one of the preceding Aspects or Aspects 39-54, wherein the composition is formed by contacting and/or annealing a first precursor comprising $Li_2FeS_2$ with a second precursor comprising $Li_{2.5}Al_{0.5}S_2$.

Aspect 4: The composition or method of any one of the preceding Aspects or Aspects 39-54, wherein the composition is formed by contacting and/or annealing a first precursor comprising $Li_2S$, with a second precursor comprising FeS, and with a third precursor comprising $Al_2S_3$.

Aspect 5: The composition of any one of the preceding Aspects, characterized as a solid solution.

Aspect 6: The composition of Aspect 5, wherein the solid solution follows Vegard's law with respect to a lattice constant as a function of a relative concentration of Al or Fe.

Aspect 7: The composition or method of any one of the preceding Aspects or Aspects 39-54, wherein the composition comprises only intrinsic vacancies and no extrinsic vacancies.

Aspect 8: The composition or method of any one of the preceding Aspects or Aspects 39-54, wherein the composition comprises both intrinsic vacancies and extrinsic vacancies.

Aspect 9: The composition or method of any one of the preceding Aspects or Aspects 39-54, wherein the composition and crystal structure of the composition correspond to those of $Li_2FeS_2$ modified by replacement of approximately 2n Fe ions with n Al ions and n Li ions in the crystal structure, wherein n is an integer greater than 0, and wherein the composition is characterized by formula FX3:

$$Li_{2+y}Al_yFe_{1-2y}S_2; \quad \text{(FX3)}$$

wherein y is greater than 0 and less than 0.5.

Aspect 10a: The composition or method of any one of the preceding Aspects or Aspects 39-54, wherein the composition is characterized by formula FX4:

$$Li_{2-\varepsilon}Al_{2y}Fe_{1-3y}Q_yS_2; \quad \text{(FX4)}$$

y is greater than or equal to 0 and less than or equal to 0.33;

ε is greater than or equal to 0 and less than or equal to 2; and the composition comprises extrinsic cation vacancies, where an extrinsic cation vacancy is represented in the chemical formula as Q.

Aspect 10b: The composition or method of any one of the preceding Aspects or Aspects 39-54, wherein the composition is characterized by formula FX10:

$$Li_{2-\varepsilon}Al_xFe_{1-1.5x}Q_{0.5x}S_2; \quad \text{(FX10)}$$

x is greater than or equal to 0 and less than or equal to 0.67;

ε is greater than or equal to 0 and less than or equal to 2; and the composition comprises extrinsic cation vacancies, where an extrinsic cation vacancy is represented in the chemical formula as Q.

Aspect 11a: The composition or method of any one of the preceding Aspects or Aspects 39-54, wherein the composition and crystal structure of the composition correspond to those of $Li_2FeS_2$ modified by replacement of approximately 3n $Fe^{2+}$ ions with 2n $Al^{3+}$ ions in the crystal structure; wherein n is an integer greater than 0.

Aspect 11 b: The composition or method of any one of the preceding Aspects or Aspects 39-54, wherein the composition and crystal structure of the composition correspond to those of $Li_2FeS_2$ modified by replacement of approximately 3n Fe ions with 2n Al ions in the crystal structure; wherein n is an integer greater than 0.

Aspect 12a: The composition or method of any one of the preceding Aspects or Aspects 39-54, wherein a lattice constant or a lattice volume of the composition has a linear dependence on x in FX1, the linear dependence having a linear regression or R-squared value greater than 0.91.

Aspect 12b: The composition or method of Aspect 12a, wherein the linear dependence optionally has a linear regression or R-squared value greater than 0.92, greater than 0.93, greater than 0.94, greater than 0.95, greater than 0.96, greater than 0.97, greater than 0.98, greater than 0.99, greater than 0.995, greater than 0.999, or greater than 0.9995.

Aspect 12c: The composition or method of any one of the preceding Aspects or Aspects 39-54, wherein a lattice constant or a lattice volume of the composition has a linear dependence on x in FX1, the linear dependence having a linear regression or R-squared value greater than 0.91, when measured on a lab-base diffractometer.

Aspect 12d: The composition or method of Aspect 12c, wherein the linear dependence optionally has a linear regression or R-squared value greater than 0.92, greater than 0.93, greater than 0.94, greater than 0.95, greater than 0.96, greater than 0.97, greater than 0.98, greater than 0.99, greater than 0.995, greater than 0.999, or greater than 0.9995, when measured on a lab-base diffractometer.

Aspect 13a: The composition or method of any one of the preceding Aspects or Aspects 39-54, wherein a lattice constant or a lattice volume of the composition has a linear dependence on y in FX3, the linear dependence having a linear regression or R-squared value greater than 0.91; wherein the composition is characterized by formula FX3:

$$Li_{2+y}Al_yFe_{1-2y}S_2; \quad (FX3)$$

wherein y is greater than 0 and less than 0.5.

Aspect 13b: The composition or method of Aspect 13a, wherein the linear dependence optionally has a linear regression or R-squared value greater than 0.92, greater than 0.93, greater than 0.94, greater than 0.95, greater than 0.96, greater than 0.97, greater than 0.98, greater than 0.99, greater than 0.995, greater than 0.999, or greater than 0.9995.

Aspect 13c: The composition or method of any one of the preceding Aspects or Aspects 39-54, wherein a lattice constant or a lattice volume of the composition has a linear dependence on y in FX2, the linear dependence having a linear regression or R-squared value greater than 0.91; wherein the composition is characterized by formula FX2:

$$Li_{2+y-\delta}Al_yFe_{1-2y}S_2; \quad (FX2)$$

wherein y is greater than 0 and less than 0.5;

wherein δ is greater than or equal to 0 and less than 2+y.

Aspect 13d: The composition or method of Aspect 13b, wherein the linear dependence optionally has a linear regression or R-squared value greater than 0.92, greater than 0.93, greater than 0.94, greater than 0.95, greater than 0.96, greater than 0.97, greater than 0.98, greater than 0.99, greater than 0.995, greater than 0.999, or greater than 0.9995.

Aspect 14: The composition or method of any one of the preceding Aspects or Aspects 39-54, wherein the composition is characterized by an atomic unit cell having formula FX1, FX2, FX3, or FX4.

Aspect 15a: The composition or method of any one of the preceding Aspects or Aspects 39-54, wherein:

the composition has lattice parameters a, b, c, and β;

lattice parameter a is selected from the range of 6.75 Å to 6.86 Å;

lattice parameter b is selected from the range of 7.80 Å to 7.84 Å;

lattice parameter c is selected from the range of 6.23 Å to 6.30 Å; and lattice parameter β is selected from the range of 89.98° to 90.34°.

Aspect 15b: The composition or method of any one of the preceding Aspects or Aspects 39-54, wherein:

the composition has lattice parameters a, b, c, and β;

lattice parameter a is selected from the range of 6.7585 Å to 6.8583 Å;

lattice parameter b is selected from the range of 7.804 Å to 7.8369 Å;

lattice parameter c is selected from the range of 6.2488 Å to 6.294 Å; and lattice parameter β is selected from the range of 90° to 90.333°.

Aspect 15c: The composition or method of any one of the preceding Aspects or Aspects 39-54, except Aspect 15b, wherein:

the composition has lattice parameters a, b, c, and β;

lattice parameter a is selected from the range of 6.757 Å to 6.829 Å;

lattice parameter b is selected from the range of 7.802 Å to 7.829 Å;

lattice parameter c is selected from the range of 6.234 Å to 6.297 Å; and lattice parameter β is selected from the range of 89.986° to 90.248°.

Aspect 16: The composition of any one of the preceding Aspects having a crystal structure characterized by a trigonal or monoclinic space group.

Aspect 17: The composition of any one of the preceding Aspects having a crystal structure characterized by a $P2_1/m$ monoclinic space group.

Aspect 18a: The composition or method of any one of the preceding Aspects or Aspects 39-54, wherein a gravimetric energy density of the composition is greater than or equal to 900 Wh/kg.

Aspect 18b: The composition or method of any one of the preceding Aspects or Aspects 39-54, wherein a gravimetric energy density of the composition is greater than or equal to 1000 Wh/kg.

Aspect 18c: The composition or method of any one of the preceding Aspects or Aspects 39-54, wherein a gravimetric energy density of the composition is greater than or equal to 1100 Wh/kg.

Aspect 18d: The composition or method of any one of the preceding Aspects or Aspects 39-54, wherein a volumetric energy density of the composition is greater than or equal to 2500 Wh/L.

Aspect 19: The composition of any of the preceding Aspects being capable of one or more multielectron redox reactions and one or more anion redox reactions.

Aspect 20a: The composition or method of any one of the preceding Aspects or Aspects 39-54, wherein an electrical conductivity of the composition is selected from the range of $1.25\times10^{-2}$ S·cm$^{-1}$ to $1.75\times10^{-2}$ S·cm$^{-1}$.

Aspect 21: The composition or method of any one of the preceding Aspects or Aspects 39-54, wherein an electrical conductivity of the composition is selected from the range of $1.00\times10^{-2}$ S·cm$^{-1}$ to $2.00\times10^{-2}$ S·cm$^{-1}$, $1.10\times10^{-2}$ S·cm$^{-1}$ to $1.90\times10^{-2}$ S·cm$^{-1}$, $1.20\times10^{-2}$ S·cm$^{-1}$ to $1.80\times10^{-2}$ S·cm$^{-1}$, $1.30\times10^{-2}$ S·cm$^{-1}$ to $1.70\times10^{-2}$ S·cm$^{-1}$, $1.40\times10^{-2}$ S·cm$^{-1}$ to $1.60\times10^{-2}$ S·cm$^{-1}$, $1.50\times10^{-2}$ S·cm$^{-1}$ to $1.60\times10^{-2}$ S·cm$^{-1}$, $1.53\times10^{-2}$ S·cm$^{-1}$ to $1.62\times10^{-2}$ S·cm$^{-1}$, $1.55\times10^{-2}$ S·cm$^{-1}$ to $1.59\times10^{-2}$ S·cm$^{-1}$, or $1.56\times10^{-2}$ S·cm$^{-1}$ to $1.58\times10^{-2}$ S·cm$^{-1}$.

Aspect 22: A device comprising the composition of any one of the preceding Aspects.

Aspect 23: The device of Aspect 22 being an electrochemical cell, such as a primary battery or secondary battery.

Aspect 24: The device of Aspect 22 or 23 being a lithium battery or lithium ion battery, such as a rechargeable battery.

Aspect 25: The device of any one of Aspects 22-24 having an electrode, such as a cathode, comprising the composition of any one of Aspects 1-21.

Aspect 26a: The device of Aspect 25, wherein the cathode is characterized by an operation voltage selected from the range of 1.7 V vs. $Li/Li^+$ to 3.0 V vs. $Li/Li^+$.

Aspect 26b: The device of Aspect 25 or 26a, wherein the cathode is characterized by an operation voltage selected from the range of 2.0 V vs. $Li/Li^+$ to 3.0 V vs. $Li/Li^+$.

Aspect 26c: The device of Aspect 25 or 26a, wherein the cathode is characterized by an operation voltage selected from the range of 1.7 V vs. $Li/Li^+$ to 2.5 V vs. $Li/Li^+$.

Aspect 26d: The device of Aspect 25 or 26a, wherein the cathode is characterized by an operation voltage selected from the range of 2.2 V vs. $Li/Li^+$ to 2.6 V vs. $Li/Li^+$.

Aspect 27: An electrochemical system comprising a cathode comprising the composition of any one of Aspects 1-21.

Aspect 28: An electrochemical system comprising:

a cathode comprising a composition characterized by formula FX1:

$$Li_{w-\delta}Al_xFe_zS_2; \quad \text{(FX1)}$$

wherein w is greater than or equal to 2 and less than or equal to 2.5;

wherein x is greater than 0 and less than or equal to 0.5;

wherein z is greater than or equal to 0 and less than or equal to 1;

wherein δ is greater than or equal to 0 and less than w; and wherein the composition has an average net charge of 0, optionally wherein the composition is charge balanced, and optionally wherein the composition has a bulk phase characterized by an average charge of 0 and/or a bulk phase that is charge balanced.

Aspect 29: The system of Aspect 27 or 28, wherein:

the composition is characterized by formula FX2:

$$Li_{2+y-\delta}Al_yFe_{1-2y}S_2; \quad \text{(FX2)}$$

wherein y is greater than 0 and less than 0.5;

wherein δ is greater than or equal to 0 and less than 2+y.

Aspect 30: The system of any one of Aspects 27-29, wherein:

the composition is characterized by formula FX3:

$$Li_{2+y}Al_yFe_{1-2y}S_2; \quad \text{(FX3)}$$

wherein y is greater than 0 and less than 0.5.

Aspect 31: The system of any one of Aspects 27-30, comprising an electrochemical cell, such as a primary battery or secondary battery.

Aspect 32: The system of any one of Aspects 27-31, comprising a lithium battery or Li-ion battery.

Aspect 33: A cathode of an electrochemical system, the cathode comprising the composition of any one of Aspects 1-21.

Aspect 34: A cathode of an electrochemical system, the cathode comprising: a composition characterized by formula FX1:

$$Li_{w-\delta}Al_xFe_zS_2; \quad \text{(FX1)}$$

wherein w is greater than or equal to 2 and less than or equal to 2.5;

wherein x is greater than 0 and less than or equal to 0.5;

wherein z is greater than or equal to 0 and less than or equal to 1;

wherein δ is greater than or equal to 0 and less than w; and wherein the composition has an average net charge of 0, optionally wherein the composition is charge balanced, and optionally wherein the composition has a bulk phase characterized by an average charge of 0 and/or a bulk phase that is charge balanced.

Aspect 35: A cathode of Aspects 33 or 34, wherein the composition is characterized by formula FX2:

$$Li_{2+y-\delta}Al_yFe_{1-2y}S_2; \quad \text{(FX2)}$$

wherein y is greater than 0 and less than 0.5;

wherein δ is greater than or equal to 0 and less than 2+y.

Aspect 36: A cathode of any one of Aspects 33-35, wherein the composition is characterized by formula FX3:

$$Li_{2+y}Al_yFe_{1-2y}S_2; \quad \text{(FX3)}$$

wherein y is greater than 0 and less than 0.5.

Aspect 37: A cathode of any one of Aspects 33-36, wherein the cathode is for an electrochemical cell, such as a primary battery or secondary battery.

Aspect 38: A cathode of any one of Aspects 33-37, wherein the cathode is for a lithium battery or Li-ion battery.

Figure 37:
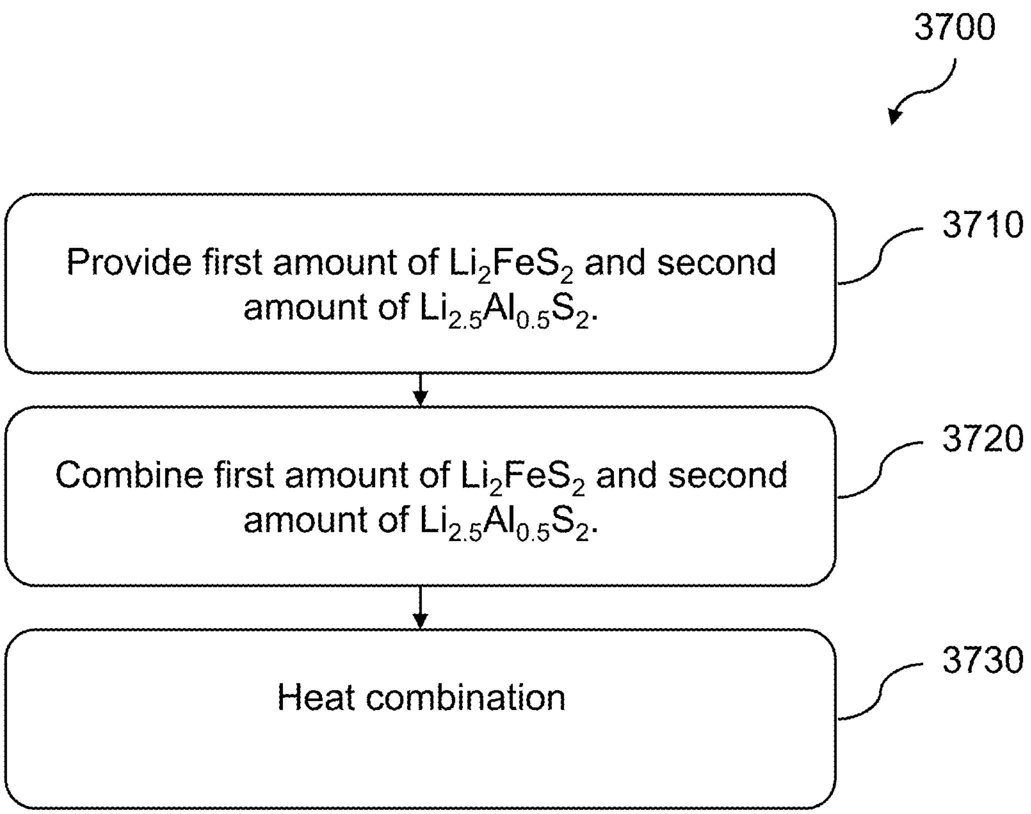
FIG. 37: A flow chart illustrating a method of making a composition.

Referring now to FIG. 37, Aspect 39: A method 3700 of making a composition, the method comprising:

providing a first amount of $Li_2FeS_2$ and a second amount of $Li_{2.5}Al_{0.5}S_2$; (operation 3710)

combining the first amount of $Li_2FeS_2$ and the second amount of $Li_{2.5}Al_{0.5}S_2$, thereby forming a combination; (operation 3720) and heating the combination having a lithium iron aluminum sulfide composition; (operation 3730)

wherein the lithium iron aluminum sulfide composition is characterized by formula FX1:

$$Li_{w-\delta}Al_xFe_zS_2; \quad (FX1)$$

wherein w is greater than or equal to 2 and less than or equal to 2.5;

wherein x is greater than 0 and less than or equal to 0.5;

wherein z is greater than 0 and less than or equal to 1;

wherein δ is greater than or equal to 0 and less than w; and wherein the composition has an average net charge of 0, optionally wherein the composition is charge balanced, and optionally wherein the composition has a bulk phase characterized by an average charge of 0 and/or a bulk phase that is charge balanced.

Aspect 40: The method of Aspect 39, wherein the combination is heated to a temperature above 600° C., optionally above 700° C., optionally above 800° C.; optionally above 850° C.; and optionally at a temperature of about 900° C.

Aspect 41: The method of Aspects 39 or 40, wherein the first amount and second amount are such that the $Li_2FeS_2$ and $Li_{2.5}Al_{0.5}S_2$ are provided in a stoichiometric ratio.

Aspect 42: The method of any one of Aspects 39-41, wherein the method comprises annealing the first amount of $Li_2FeS_2$ and the second amount of $Li_{2.5}Al_{0.5}S_2$.

Aspect 43: The method of any one of Aspects 39-42, wherein the method further comprises sealing the first amount of $Li_2FeS_2$ and the second amount of $Li_{2.5}Al_{0.5}S_2$ in carbon coated quartz ampules.

Figure 38:
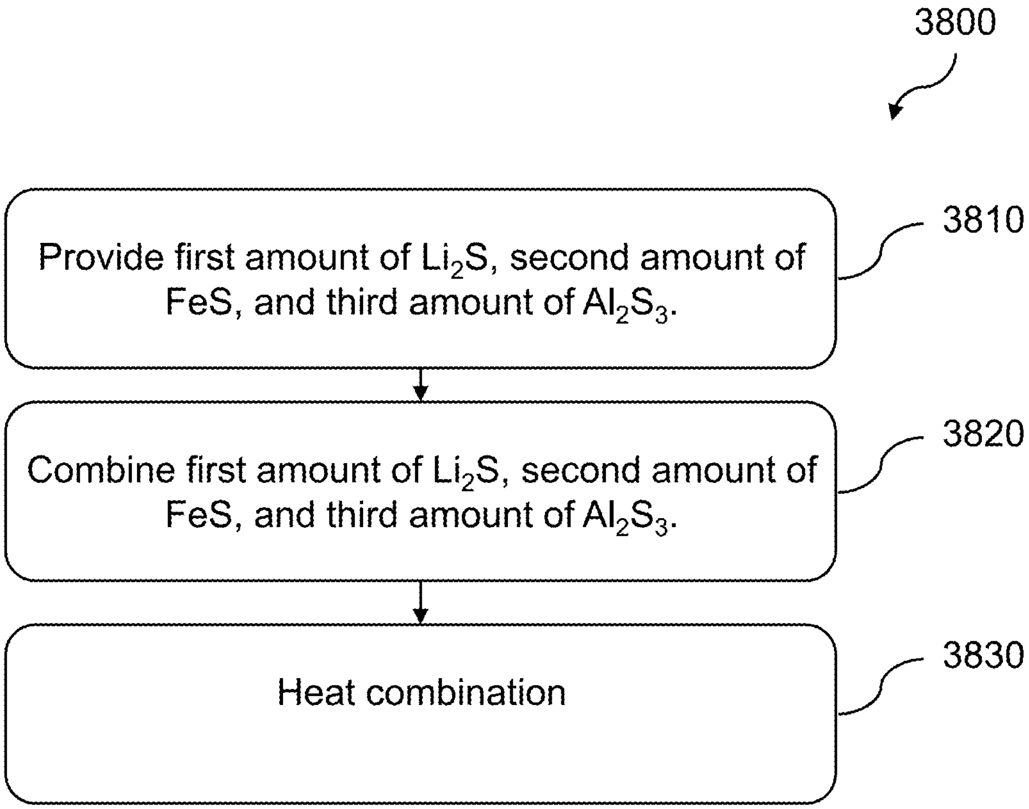
FIG. 38: A flow chart illustrating another method of making a composition.

Referring now to FIG. 38, Aspect 44: A method 3800 of making a composition, the method comprising:

providing a first amount of $Li_2S$, a second amount of FeS, and a third amount of $Al_2S_3$; (operation 3810)

combining the first amount of $Li_2S$, the second amount of FeS, and the third amount of $Al_2S_3$, thereby forming a combination; (operation 3820) and heating the combination to form the composition having a lithium iron aluminum sulfide composition; (operation 3830)

wherein the lithium iron aluminum sulfide composition is characterized by formula FX1:

$$Li_{w-\delta}Al_xFe_zS_2; \quad (FX1)$$

wherein w is greater than or equal to 2 and less than or equal to 2.5;

wherein x is greater than 0 and less than or equal to 0.5;

wherein z is greater than or equal to 0 and less than or equal to 1;

wherein δ is greater than or equal to 0 and less than w; and wherein the composition has an average net charge of 0, optionally wherein the composition is charge balanced, and optionally wherein the composition has a bulk phase characterized by an average charge of 0 and/or a bulk phase that is charge balanced.

Aspect 45: The method of any one of Aspects 39-44, wherein the combination is heated at a rate greater than 0.1° C./min, optionally greater than 0.5° C./min, optionally greater than 0.7° C./min; optionally greater than 0.8° C./min; optionally greater than 0.8° C./min; optionally a rate selected from the range of 0.1° C./min to 1° C./min; optionally 0.5° C./min to 1° C./min; optionally 0.8° C./min to 1° C./min; and optionally at a rate of about 1° C./min.

Aspect 46: The method of any one of Aspects 39-45, wherein the combination is held at a temperature above 600° C., optionally above 700° C., optionally above 800° C.; optionally above 850° C.; and optionally at a temperature of about 900° C. optionally for more than 5 hours, optionally more than 8 hours; optionally more than 10 hours; optionally for 5-12 hours, optionally for 8-12 hours; and optionally for about 12 hours; and subsequently cooled to room temperature.

Aspect 47: The method of any one of Aspects 39-46, wherein the providing operation comprises synthesizing the first amount of $Li_2FeS_2$ and the second amount of $Li_{2.5}Al_{0.5}S_2$ by solid-state synthesis.

Aspect 48: The method of any one of Aspect 39-47, wherein the synthesizing operation comprises grinding stoichiometric quantities of $Li_2S$, FeS, and $Al_2S_3$ powders.

Aspect 49: The method of Aspect 48, wherein the synthesizing operation further comprises pressing the ground powders into at least one pellet.

Aspect 50a: The method of Aspect 49, wherein each of the at least one pellet comprises a mass less than 1 g.

Aspect 50b: The method of Aspect 49, wherein each of the at least one pellet comprises a mass selected from the range of 1 mg to 500 mg.

Aspect 50c: The method of Aspect 49, wherein each of the at least one pellet comprises a mass selected from the range of 100 mg to 400 mg.

Aspect 50d: The method of Aspect 49, wherein each of the at least one pellet comprises a mass selected from the range of 200 mg to 300 mg.

Aspect 50e: The method of Aspect 49, wherein each of the at least one pellet comprises a mass selected from the range of 225 mg to 275 mg.

Aspect 50f: The method of Aspect 49, wherein each of the at least one pellet comprises a mass of about 250 mg.

Aspect 51: The method of Aspect 49 or 50, wherein the method further comprises sealing each of the at least one pellet in carbon coated quartz ampules.

Aspect 52: The method of any one of Aspects 49-51, wherein each of the at least one pellet is heated to a temperature above 600° C., optionally above 700° C., optionally above 800° C.; optionally above 850° C.; optionally to a temperature selected over the range of 600° C. to 900° C.; optionally 700° C. to 900° C.; optionally 800° C. to 900° C.; optionally to a temperature selected over the range of 600° C. to 900° C.; optionally 700° C. to 900° C.; optionally 800° C. to 900° C.; and optionally to a temperature of about 900° C.

Aspect 53: The method of any one of Aspects 49-52, wherein each of the at least one pellet is heated at a rate greater than 0.1° C./min, optionally greater than 0.5° C./min, optionally greater than 0.7° C./min; optionally greater than 0.8° C./min; optionally a rate selected from the range of 0.1° C./min to 1° C./min; optionally 0.5° C./min to 1° C./min; optionally 0.8° C./min to 1° C./min; and optionally at a rate of about 1° C./min.

Aspect 54: The method of any one of Aspects 49-53, wherein each of the at least one pellet is held at a temperature above 600° C., optionally above 700° C., optionally above 800° C.; optionally above 850° C.; optionally to a temperature selected over the range of 600° C. to 900° C.; optionally 700° C. to 900° C.; optionally 800° C. to 900° C.; and optionally at a temperature of about 900° C. optionally for more than 5 hours, optionally more than 8 hours; optionally more than 10 hours; optionally for 5-12 hours, optionally for 8-12 hours; and optionally for about 12 hours; and subsequently cooled to room temperature.

Aspect 55: A composition characterized by formula FX7:

$$Li_{2-\delta}FeS_uSe_v; \quad (FX7)$$

wherein u is greater than 0 and less than 2;

wherein v is greater than 0 and less than 2;

wherein δ is greater than or equal to 0 and less than 2; and wherein the composition has an average net charge of 0, optionally wherein the composition is charge balanced, and optionally wherein the composition has a bulk phase characterized by an average charge of 0 and/or a bulk phase that is charge balanced.

Aspect 56: The composition or method of any one of Aspects 39-55, wherein: the composition is characterized by formula FX8:

$$Li_{2-\delta}FeS_{2-k}Se_k; \quad (FX8)$$

wherein k is greater than 0 and less than 2; and wherein δ is greater than or equal to 0 and less than 2.

Aspect 57: A composition characterized by formula FX9:

$$Li_{2-\varepsilon}Al_xFe_rQ_qS_2; \quad (FX9)$$

x is greater than or equal to 0 and less than or equal to 0.67;

r is greater than or equal to 0 and less than or equal to 1;

q is greater than or equal to 0 and less than or equal to 0.33;

ε is greater than or equal to 0 and less than or equal to 2;

the composition comprises extrinsic cation vacancies, where an extrinsic cation vacancy is represented in the chemical formula as Q; and the composition has an average net charge of 0, optionally wherein the composition is charge balanced, and optionally wherein the composition has a bulk phase characterized by an average charge of 0 and/or a bulk phase that is charge balanced.

Aspect 58: The composition or method of any one of Aspects 39-56, wherein: the composition is characterized by formula FX10:

$$Li_{2-\varepsilon}Al_xFe_{1-1.5x}Q_{0.5x}S_2; \quad (FX10)$$

x is greater than or equal to 0 and less than or equal to 0.67;

ε is greater than or equal to 0 and less than or equal to 2; and the composition comprises extrinsic cation vacancies, where an extrinsic cation vacancy is represented in the chemical formula as Q.

The invention can be further understood by the following non-limiting examples.

Example 1: Multielectron Redox in Lithium-Rich Aluminum Iron Sulfides

Abstract

Multielectron redox in Li-ion battery cathode materials that invoke transition metal and anion redox can enable higher energy density than single-electron redox materials that are currently used commercially. To store and remove electrons from both transition metals and anions requires that both must have electron states near the Fermi level, an inherent complexity of multielectron redox compared to single-electron redox wherein the Fermi level is dominated by transition metal d-electron states.

This Example investigate the reversible electrochemical redox of $Li_2FeS_2$ (y=0) and $Li_{2.2}Al_{0.2}Fe_{0.6}S_2$ (y=0.2), taken from the $Li_{2+y}Al_yFe_{1-2y}S_2$ family of materials developed by this work where 0≤y≤0.5. Both exhibit multielectron redox via $Fe^{2+/3+}$ and $2S^{2-}/(S_2)^{2-}$ redox couples. In y=0.2, ~80% of the $S^{2-}$ in the anion sub-lattice of the pristine material is oxidized on charge, compared to ~50% in y=0.

The reversible oxidation/reduction of ~80% of the anions is among the highest reported levels of anion redox in a lithium-rich transition metal chalcogenide cathode. The total multielectron redox in y=0.2 yields a gravimetric energy density of ~1100 $Wh \cdot kg^{-1}$ and volumetric energy density of ~2500 $Wh \cdot L^{-1}$.

This Example shows that the electrochemical oxidation/delithiation of y=0.2 occurs via partial $Fe^{2+/2.6+}$ oxidation followed by the extensive $2S^{2-}/(S_2)^{2-}$ oxidation that incurs partial reduction of $Fe^{2.6+}$. This contrasts with y=0 for which electrochemical oxidation/delithiation occurs via partial $Fe^{2+/2.6+}$ oxidation followed by the less extensive $2S^{2-}/(S_2)^{2-}$ oxidation that does not incur a similar reduction of Fe.

This Example provides results supporting an understanding that dynamic transition metal redox is invoked in electrochemical anion oxidation in alkali-rich cathodes and supports its use in designing materials with similar redox capabilities as a pathway to next-generation, high energy density cathodes.

Introduction

The theoretical energy density limit of current lithium-ion battery cathode materials is set by the single-electron intercalation transition metal redox mechanism. Examples include $LiNi_xMn_yCo_{z=1-x-y}O_2$ (NMC xyz) and $LiFePO_4$, wherein on charge electron ($e^-$) removal is mediated by transition metal oxidation (e.g., $Co^{3+} \rightarrow Co^{4+}$ or $Fe^{2+} \rightarrow Fe^{3+}$). Recently, the scarcity of battery-grade Co and Ni has prompted a surge in $LiFePO_4$, which is favored as a more scalable material given the relative abundance and low-cost of Fe and $PO_4$ precursors.[1] However, $LiFePO_4$ (~577 $Wh \cdot kg^{-1}$, ~2068 $Wh \cdot L^{-1}$) is significantly less energy-dense than NMC 811 (~950 $Wh \cdot kg^{-1}$, ~4499 $Wh \cdot L^{-1}$). Single-electron redox itself imposes a theoretical limit on energy density; capacity at most 1 $e^-$ per transition metal, and voltage within the stability window of state-of-the-art carbonate electrolytes (~4.5V vs. $Li/Li^+$)-recall that energy density is the product of capacity and voltage. Thus, new positive electrode materials that both use highly abundant elements and surpass the single-electron redox paradigm must be developed to meet global energy storage demands.

One approach to achieve higher energy density is multielectron redox, i.e., storing/removing electrons on both transition metals and anions, surpassing the 1 $e^-$ per transition metal limit of single-electron redox. Multielectron redox thus requires that both transition metals and anions have electron states near the Fermi level. While transition metal redox underpins incumbent single-electron redox, invoking anion redox incurs structural distortions as it usually invokes the rearrangement of highly directional or localized p orbitals to access high energy anion p electrons.[2]

The structural distortions and high voltage of $2O^{2-}/(O_2)^{n-}$ redox are major practical challenges for multielectron redox in oxides. The distortions generate peroxo-like $(O_2)^{n-}$, which are generally unstable and tend to form molecular $O_{2(g)}$.[3,4] The high voltage is at/near the stability limit of the electrolyte, so $2O^{2-}/(O_2)^{n-}$ redox is accompanied by electrolyte decomposition.[5] Together, both effects make multielectron redox in oxides largely irreversible. The few reversible systems invoke 4d or 5d transition metals (e.g., $Li_{1.33}Ru_{0.67}O_2$ and $Li_{1.33}Ir_{0.67}O_3$); the diffuse metal orbitals stabilize $(O_2)^{n-}$ and related distortions, but electrolyte decomposition persists—regardless, Ru and Ir are highly scarce.

To overcome the challenges of multielectron redox in oxides, we turn to sulfides. In contrast to unstable peroxo-like $(O_2)^{n-}$, persulfide i.e., $(S_2)^{2-}$ is stable in many crystalline materials; perhaps the best known example is pyrite $FeS_2$ in which the formal oxidation states are $Fe^{2+}$ and $(S_2)^{2-}$. The higher energy and more diffuse S 3p electrons (relative to O 2p) enable even 3d transition metals to stabilize $(S_2)^{2-}$ compared to $(O_2)^{n-}$ that prefer to form $O_{2(g)}$. Thus, sulfides serve as a promising family of next generation multielectron redox cathode materials composed of highly abundant elements.

Previous work on the Li-rich sulfide $Li_2FeS_2$ shows that multielectron redox occurs via stepwise $Fe^{2+/3+}$ and $2S^{2-}/(S_2)^{2-}$ redox couples on charge. $Li_2FeS_2$ reversibly cycles ~1.6 $Li^+$ per formula unit (out of theoretical capacity of 2 $Li^+$ per formula unit) out of which, on charge ~0.6 $Li^+$ are first removed via oxidation of $Fe^{2+}$ to $Fe^{3+}$ to yield average oxidation state $Fe^{2.6+}$, and next ~1 $Li^+$ are removed via oxidation of $2S^{2-}$ to $(S_2)^{2-}$ (about ~50% of the $S^{2-}$ anions get oxidized on charge).[6] There is both leftover unoxidized $Fe^{2+}$ and $S^{2-}$ which could be used to approach the theoretical 2 $Li^+$ per formula unit. However, the work on $Li_2FeS_2$ suggests an intrinsic stability limit on the Fe oxidation state near ~2.6+; similar limits have been observed in other Fe—S binary and Li—Fe—S ternary materials.[7] Thus, to increase the total multielectron redox capacity towards theoretical limits, we aim to increase the S-redox capacity beyond ~1 $e^-$ per formula unit.

To achieve additional extra S-redox, we made new materials with formulae $Li_{2+y}Al_yFe_{1-2y}S_2$ where $0 \leq y \leq 0.5$ and observe increased redox capacity in $Li_{2.2}Al_{0.2}Fe_{0.6}S_2$ i.e., y=0.2. While the Fe content is lower in y=0.2 compared to $Li_2FeS_2$ i.e., y=0, ~80% of the $S^{2-}$ anions are used in the overall multielectron redox reaction. Thus, relative to y=0, y=0.2 operates in a regime of excess anion redox relative to transition metal redox. By combining structural, electrochemical, and spectroscopic characterization, we demonstrate new dynamic transition metal redox in y=0.2 incurred by excess anion redox that is not observed in y=0.

Experimental Section

Materials Preparation

All materials and precursors were handled inside an Ar-filled glovebox ($H_2O$ and $O_2$<1 ppm). All $Li_{2+y}Al_yFe_{1-2y}S_2$ where $0 \leq y \leq 0.5$ materials were prepared by solid-state synthesis. Powders of $Li_2S$ (Thermo Fisher Scientific, 99.9%), FeS (Sigma Aldrich, 99.9%), and $Al_2S_3$ (Thermo Fisher Scientific, 99+%) were weighed to an accuracy of ±0.1 mg to give total 250 mg of a desired stoichiometry (i.e., value of y) and then hand-mixed in an agate mortar and pestle. The mixed precursor powders were pressed into ¼ inch pellets with a hand-operated arbor press. The mixed precursor pellets were light gray in color. Pellets were placed inside carbon-coated vitreous silica ampules, evacuated to ≤50 mTorr, and sealed with a methane-oxygen torch without exposure to air. The ampules were coated by first coating the inside of the empty ampule with a thin layer of acetone, and then pyrolyzing that acetone with a methane-oxygen torch. The pyrolysis was repeated at least twice for conformal, continuous coating. The ampule was heated at 1° C./min to 900° C. with a dwell time of 12 h. After ambient cooling to room temperature, the ampules were opened inside the glovebox and the pellets were ground into fine powders, again in agate mortar and pestles, for further characterization. Only the y=0 pellet melts into a polycrystalline boule when heated to 900° C. The rest of the materials synthesized mostly retained the shape of the original pressed pellet. All products were black in both pellet and powder forms, except for y=0.4 which is dark brown and y=0.5 (i.e., no Fe) which is light orange.

Electrochemical Characterization

Electrode Fabrication

All electrode preparation was performed either under Ar or in an Ar-filled glovebox. Free-standing electrodes were prepared by mixing 60/20/20 (wt %) active material, carbon (SuperP, Alfa Aesar, >99%), and PTFE binder (Sigma, 1 μm powder), respectively, in agate mortar and pestles. The active material and carbon were mixed first before adding binder to evenly distribute the active material and carbon within the framework provided by the binder. The hand grinding with binder makes small (~1 $mm^2$) flakes that were broken into smaller pieces/a powder by hand with a stainless steel spatula. Roughly 6 to 10 mg of the composite fragmented mix was weighed and pressed into a 6 mm diameter electrode under ca. 2 tons of force using a manual hydraulic press (Vivtek).

Electrochemical Testing

All electrochemical cells were assembled in an Ar-filled glovebox ($H_2O$ and $O_2$<1 ppm). All electrochemistry unless otherwise noted was performed in 2032 coin cells (MTI) with a Li-foil counter electrode (Sigma, 99.9%, 0.75 mm, mechanically cleaned with an X-Acto blade before cell assembly), glass-fiber (Whatman, GF/D) or polypropylene (Celgard 2400) separator, working free-standing or slurry-cast electrode as described above, and 100 μL of electrolyte (30 μL on the counter, 40 μL on the separator, and 30 μL on the working). Glass-fiber separators were used for free-standing electrodes, and polypropylene for slurry-cast. The coin cells were crimped shut with a manual crimper (Pred Materials).

The electrolyte was a 1 M solution of $LiPF_6$ (Oakwood Chemical, battery grade) in a 1/1 (by volume) mixture of ethylene carbonate (EC) and dimethyl carbonate (DMC) (all Sigma, ≥99%) i.e., LP30. The electrolyte was made in a dried HDPE bottle by mixing of the carbonates and the salt. All coin cell components and HDPE bottle etc. were dried overnight in a vacuum oven at 60° C. prior to use in the glovebox.

All electrochemical experiments were performed with either a VMP3 multichannel potentiostat (Bio-Logic) or BCS 805 battery cycler (Bio-Logic).

Galvanostatic Cycling & Galvanostatic Intermittent Titration Technique (GITT)

All $Li_{2+y}Al_yFe_{1-2y}S_2$ composite electrodes were charged (oxidized) at the rate indicated (based on 1 $e^-$ per formula unit) to 3 V and discharged at the rate indicated to 1.7 V, unless otherwise indicated. All voltages are versus the Li foil counter electrode, which is expected to be at the $Li/Li^+$ reference potential.

The current in the GITT experiments was C/10 based on one electron per formula unit for 20 min separated by 4 h rest periods.

Electrochemical Impedance Spectroscopy (EIS) & DC Polarization

In an Ar-filled glovebox, between 90 to 120 mg of y=0 and y=0.2 powders were pressed into a 6 mm diameter electrode under ca. 2 tons of force using a manual hydraulic press (Vivtek). The pellets were roughly between 1.4 to 2 mm thick. The pellets were sputtered with Au at 40 mA for 60 s on both flat surfaces using a Ted Pella 108 auto sputter coater in an Ar-filled glovebox.

EIS and DC polarization measurements were collected using a Bio-Logic VSP300 multichannel potentiostat with ultralow current probes. Symmetric cells were assembled with the Au-sputtered pellets in 0.25 inch inner diameter spring-loaded Swagelok cells. Cells were kept in a home-made Faraday cage during measurement.

Figure 39A:
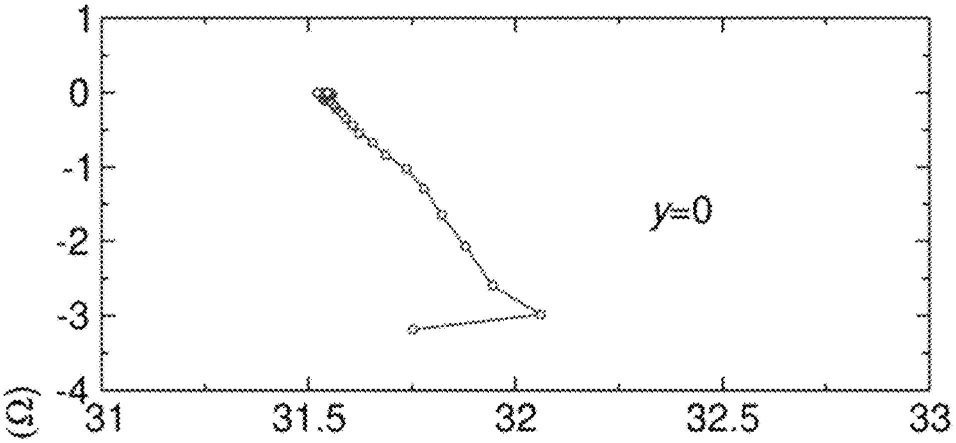
FIGS. 39A-39B: EIS measurements of pristine (FIG. 39A) y=0 and (FIG. 39B) y=0.2. The dimensions of the pellets are tabulated in the corresponding text.
Figure 39B:
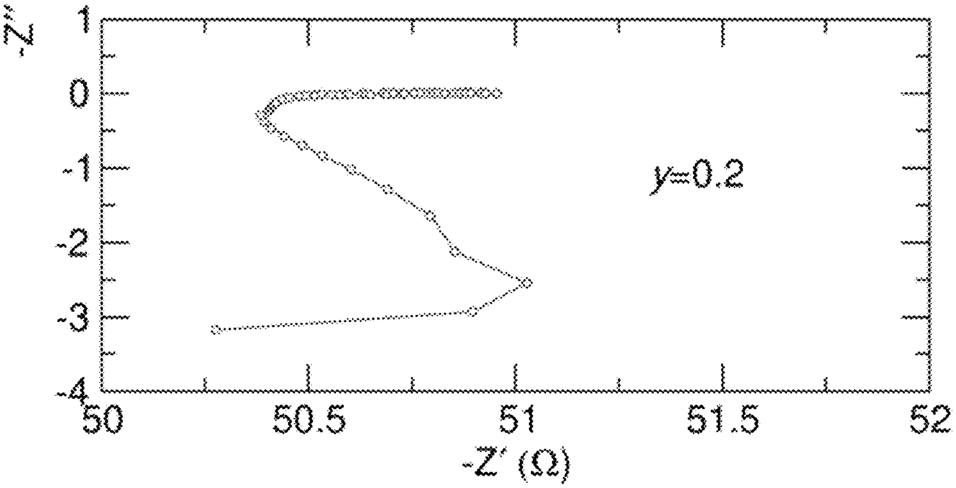

The EIS spectra were collected in FIGS. 39A-39B using a sinusoidal voltage amplitude of 50 mV in a frequency range of 3 MHz to 1 kHz and averaged over 10 measurements.

DC polarization (i.e., chronoamperometry) currents versus time data were collected at fixed voltages of 50, 40, 30, 20, 10 and 5 mV held for 2 min stretches each. In between voltages, cells were held at open-circuit voltage (OCV) for 5 mins and EIS was measured.

As shown in FIGS. 39A-39B, EIS measurements of pellets of both y=0 and y=0.2 revealed that the electronic conductivity is at least several orders of magnitude higher than the ionic conductivity. The discrepancy precludes a simple electromechanical measurement of the ionic conductivity even for the purposes of estimation (at least via EIS). The resistance (of the electronic conductivity) can be measured from x-intercept of the EIS. The rough x-intercept values are tabulated below for y=0 and y=0.2 and are comparable to the resistance values obtained from the DC polarization measurements.

TABLE 1 x-intercept values of from EIS measurement of y = 0 and y = 2.

| Material | x-intercept from EIS measurement (Ω) |
|---|---|
| y = 0 | 31.5 |
| y = 0.2 | 51.0 |

The electrical conductivity was calculated from DC polarization measurements. The data are plotted in FIGS. 40A-40B along with tabulated pellet dimensions in the table below.

TABLE 2

Pellet dimensions for y = 0 and y = 0.2.

| | y = 0 | y = 0.2 |
|---|---|---|
| Diameter (m) | $6.05 \times 10^{-3}$ | $6.05 \times 10^{-3}$ |
| Thickness (m) | $1.44 \times 10^{-3}$ | $1.92 \times 10^{-3}$ |

Figure 40A:
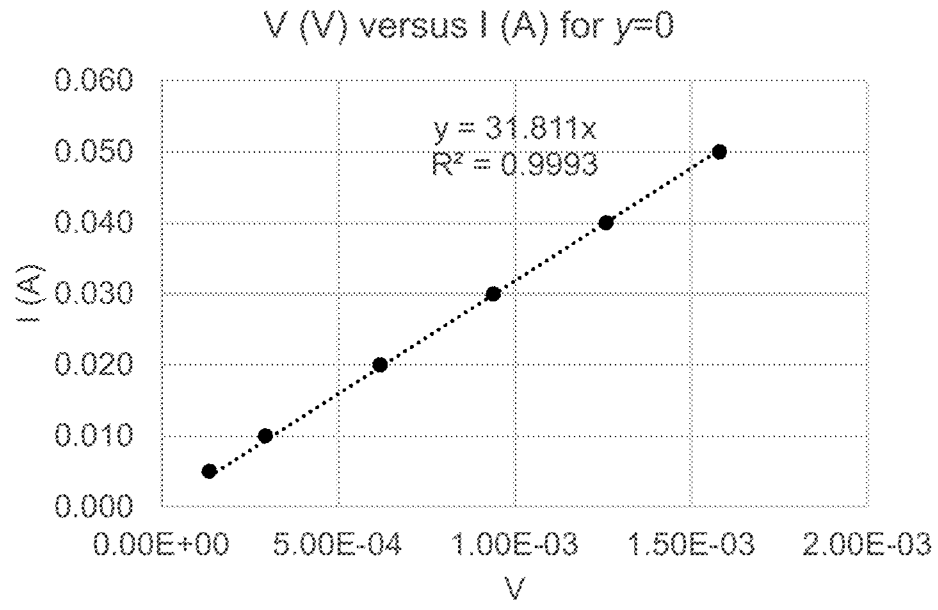
FIG. 40A-40B: DC polarization measurements and linear fit for y=0 and y=0.2.
Figure 40B:
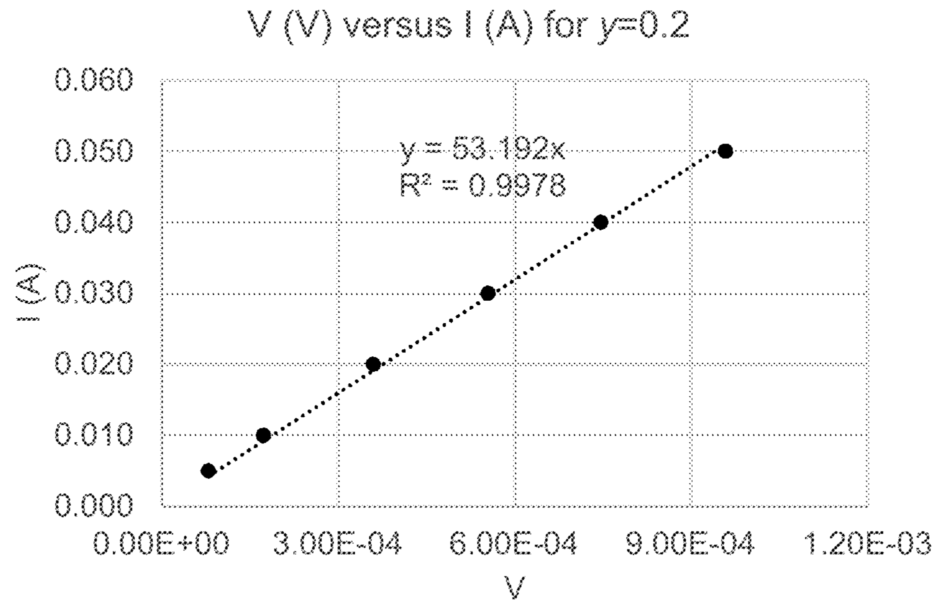

The slopes of the linear fits in FIGS. 40A-40B are the resistance values (i.e. R) in accordance with Ohm's law i.e., V=I×R. Using the equation $$\sigma = \frac{\text{thickness}}{\pi \cdot (\text{diameter}/2)^2} \cdot \frac{1}{R},$$

where σ is the electronic conductivity, the electronic conductivities of both y=0 and y=0.2 were found to be 1.57 $S \cdot cm^{-1}$.

$CuK_\alpha$ Powder X-ray Diffraction (PXRD)

$CuK_\alpha$ PXRD patterns were collected on a Rigaku SmartLab diffractometer. To prevent oxidation during measurement, roughly 10 to 20 mg of powder samples were placed and compressed (by hand using the edge of a glass slide) into a low background silicon sample holder. The diffraction patterns were fit by the Rietveld method using the General Structure Analysis System II (GSAS-II). Crystal structures were visualized using VESTA.

Synchrotron PXRD

High-resolution synchrotron PXRD patterns were collected on samples loaded into 20 mm long, 0.5 mm inner diameter polyimide tubes i.e., capillaries (Avantor), sealed with clay and Torr Seal (Varian) on both ends. The samples were measured on beamline BXDS-WLE (λ=0.81961 Å) at the Canadian Light Source (CLS). Instrument parameters were refined by the Rietveld method for a pattern collected on an $LaB_6$ standard. All refinements were done in GSAS-II. Crystal structures were visualized using VESTA.

Samples were sealed in Ar in aluminized mylar pouches (2 to 3 layers) using an impulse heat sealer (Uline) for transport to the synchrotron.

X-ray Absorption Spectroscopy (XAS)

Samples for ex-situ XAS were prepared in 2032 coin cells (MTI) with free-standing working electrodes as previously described. Electrodes were measured at the following states: pristine, charged to roughly halfway of the sloping portion of the charge curve (i.e., mid-slope), charged to the transition between the sloping and plateau portions (i.e., transition), charged to roughly halfway point of the plateau (i.e., mid-plateau), charged to 3 V (i.e., charged), and discharged to 1.7 V (i.e., discharged). After oxidation or reduction to one of the above-defined cut-offs, the cells were de-crimped and opened with a manual disassembling tool (Pred Materials) in an Ar-filled glovebox. The ex-situ cathodes were scraped off the current collector by hand using a stainless steel spatula. The ex-situ cathodes were immersed in ~300 μL of DMC to wash away residual electrolyte. The DMC was dabbed with a dry Kim wipe, which left minimal residual DMC, and then dried under vacuum for roughly 30 min until completely dry. The dry intact cathodes were then broken into smaller pieces/a powder by hand with a stainless steel spatula.

For Fe K-edge, the loose powders were loaded as is into aluminum sample holders provided by the Stanford Synchrotron Radiation Lightsource (SSRL) at SLAC National Accelerator Laboratory, encapsulated between two pieces of Kapton tape (1 mil film thickness, 2.5 mil total thickness, Uline).

For S K-edge, the sample powders were grinded and mixed with boron nitride (BN) (Alfa Aesar, 99.5%) so that the total sample concentration was ≤5% by mass. Roughly 10 to 15 mg of each composite BN-sample mix was pressed into ¼ inch diameter pellets under roughly 1 ton of force in a hand-operated arbor press. The pellets were then loaded into plastic sample holders provided by the National Synchrotron Light Source II (NSLS-II) at Brookhaven National Laboratory.

The loaded sample holders were sealed in Ar in aluminized mylar pouches (2 to 3 layers) using an impulse heat sealer (Uline) for transport to the respective synchrotrons.

Fe K-edge was measured at beamline 4-3 at SSRL in both fluorescence and transmission modes. The data shown are the merged transmission data of three sweeps of each sample. The Fe K-edge data were calibrated to a collinear Fe foil standard.

S K-edge was measured at beamline 8-BM in fluorescence mode. A gypsum (i.e., sulfate) standard was added to the sample holder to ensure a constant energy shift. Data collection in a limited window in k-space precluded EXAFS analysis.

Calibration, background correction, and data processing of X-ray absorption near-edge structure (XANES) and extended X-ray absorption fine structure (EXAFS) were done in Athena and Artemis from the IFEFFIT suite.

Mössbauer Spectroscopy

Samples for ex-situ Mössbauer were prepared as described above for ex-situ XAS. However, after rinsing in DMC and drying, the cathode was kept intact and placed on a small piece of Kapton tape (1 mil film thickness, 2.5 mil total thickness, Uline). The Kapton tape was then stuck to the inside of a static shielding bag (Uline) and sealed in Ar with an impulse heat sealer (Uline).

A 5.5 mm hole was punched in a roughly 2 mm thick Pb metal sheet, and a roughly 0.5 inch by 0.5 inch square hole was punched in a second 2 mm Pb metal sheet. The sample, sealed in the bag was encapsulated between the two Pb sheets to prevent excess background gamma rays from reaching the Mössbauer detector, and held in place with scotch tape such that the 5.5 mm hole revealed only the ex-situ cathode.

The Mössbauer measurements were taken in transmission geometry, in the constant acceleration mode and with a $^{57}Co(Rh)$ source with an initial activity of 25 mCi, and half-life of roughly 272 days. The nominal activity at the time of the measurements was about 19 mCi. The velocity scale (±3 mm/s) was calibrated at room temperature with a α-Fe foil.

Results and Discussion

Structural Characterization $Li_2FeS_2$ has alternating layers of tetrahedrally and octahedrally coordinated cation sites. The octahedral layer contains only $Li^+$, and the tetrahedral layer mixed occupancy $Li^+/Fe^{2+}$ sites. The mixed occupancy defines a high symmetry trigonal P-3m1 space group. The new materials we develop in this work follow a co-substitution pattern of 2 $Fe^{2+}$ for 1 $Li^+$ and 1 $Al^{3+}$ i.e., an aliovalent, iso-atomic substitution that conserves charge and atom count. We can perform the substitution because of the strong structural resemblance between $Li_2FeS_2$ and $Li_5AlS_4$. $Li_5AlS_4$ also has alternating layers of tetrahedrally and octahedrally coordinated cation sites. The primary difference is that the tetrahedral layer of $Li_5AlS_4$ has distinct, ordered $Li^+$ and $Al^{3+}$ sites. The $Al^{3+}$ ordered sites, likely enforced by the $Al^{3+}$ high charge density, subtly distort the anion sub-lattice which lowers the symmetry to a monoclinic $P2_1/m$ space group.[8,9]

Figures 2A, 2B, 2C, 2D:
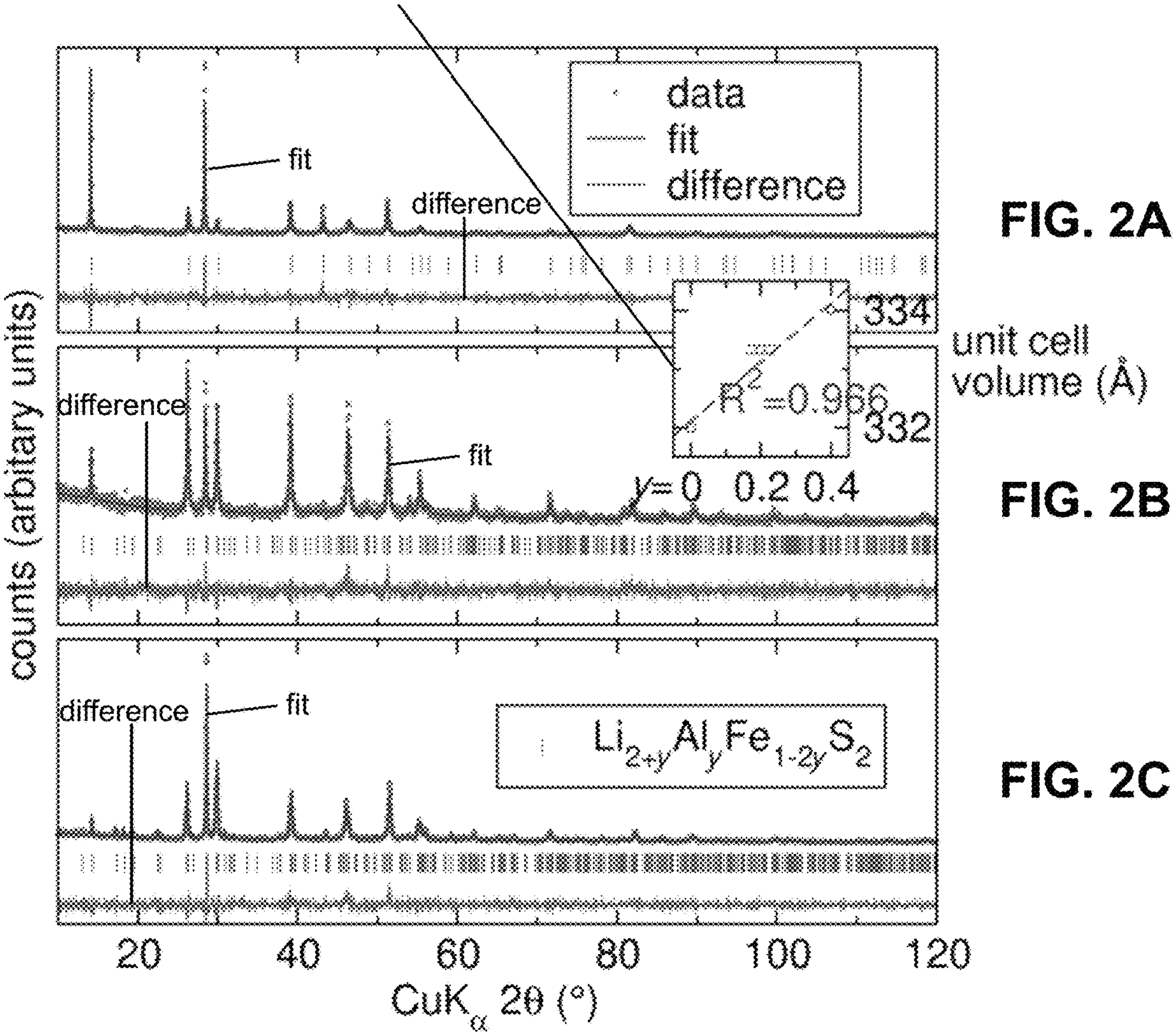
FIGS. 2A-2D: Powder X-ray diffraction of (FIG. 2A) y=0, (FIG. 2B) y=0.2, and (FIG. 2C) y=0.4, and (FIG. 2D) the trend in unit cell volume with y. The Rietveld refinement and resulting difference trace are shown for each material. The tick marks identify the locations of the Bragg reflections of the phases included in the fits (the $Li_2S$ impurity is excluded). The linear fit in panel

The powder X-ray diffraction (PXRD) of y=0, y=0.2, and y=0.4, the Rietveld refinements, and difference curves are shown in FIGS. 2A, 2B and 2C. While the pattern for y=0 is fit to the high symmetry trigonal P-3m1 $Li_2FeS_2$ model, the y=0.2 and y=0.4 patterns are fit to a hybrid model in which the ordered $Al^{3+}$ sites and lower symmetry monoclinic $P2_1/m$ $Li_5AlS_4$ model are preserved, but $Li^+$ and $Fe^{2+}$ sites are mixed like $Li_2FeS_2$. The hybrid model gives satisfactory ($R_{wp}$<10%). However, higher resolution synchrotron PXRD is still pending.

Electrochemical Characterization

Figures 3A, 3B, 3C:
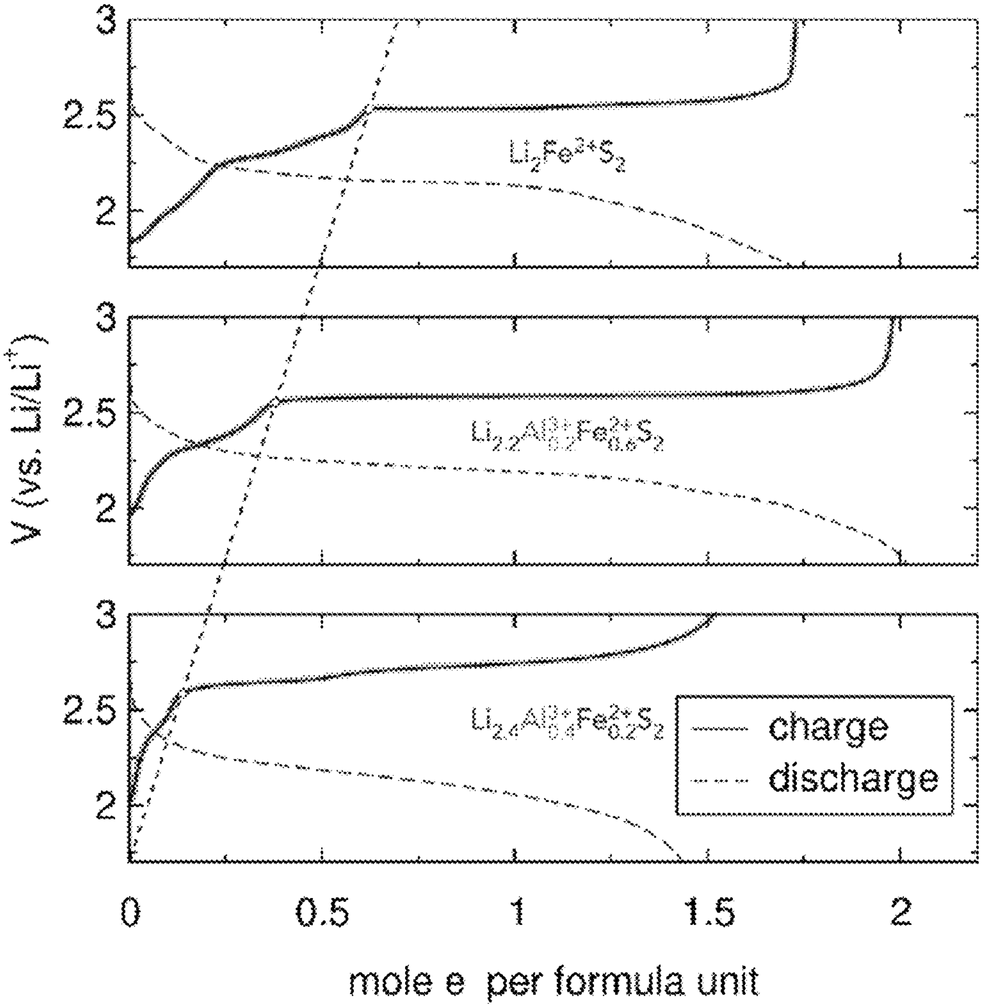
FIGS. 3A-3C: Galvanostatic cycling of (FIG. 3A) y=0, (FIG. 3B) y=0.2, and (FIG. 3C) y=0.4 at C/10 based on 1 $e^-$ per formula unit.
Figure 4:
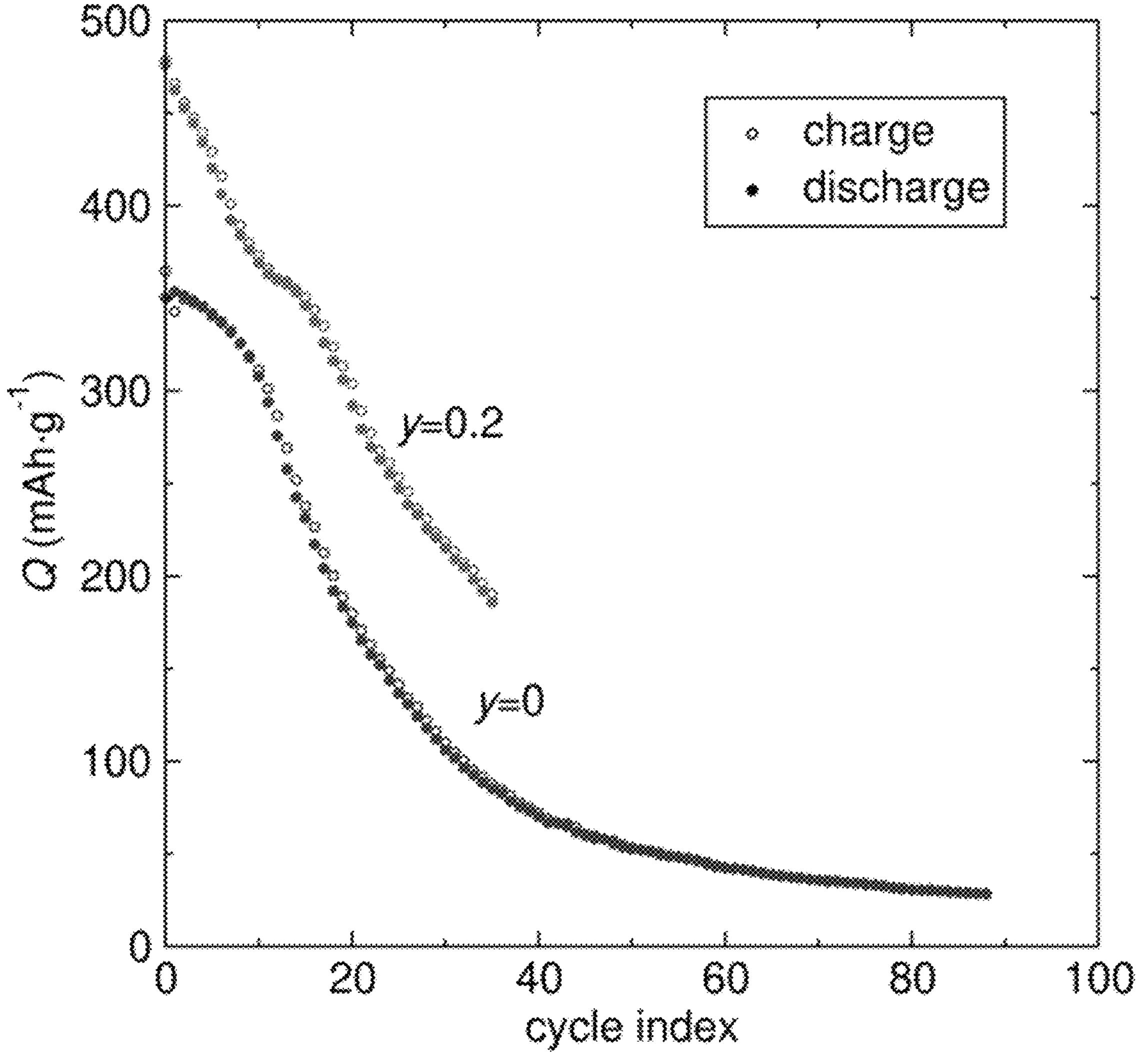
FIG. 4: Comparison of long-term cycling performance of y=0 and y=0.2 at C/10 based on 1 electron per formula unit. The performances are comparable.
Figures 5A, 5B:
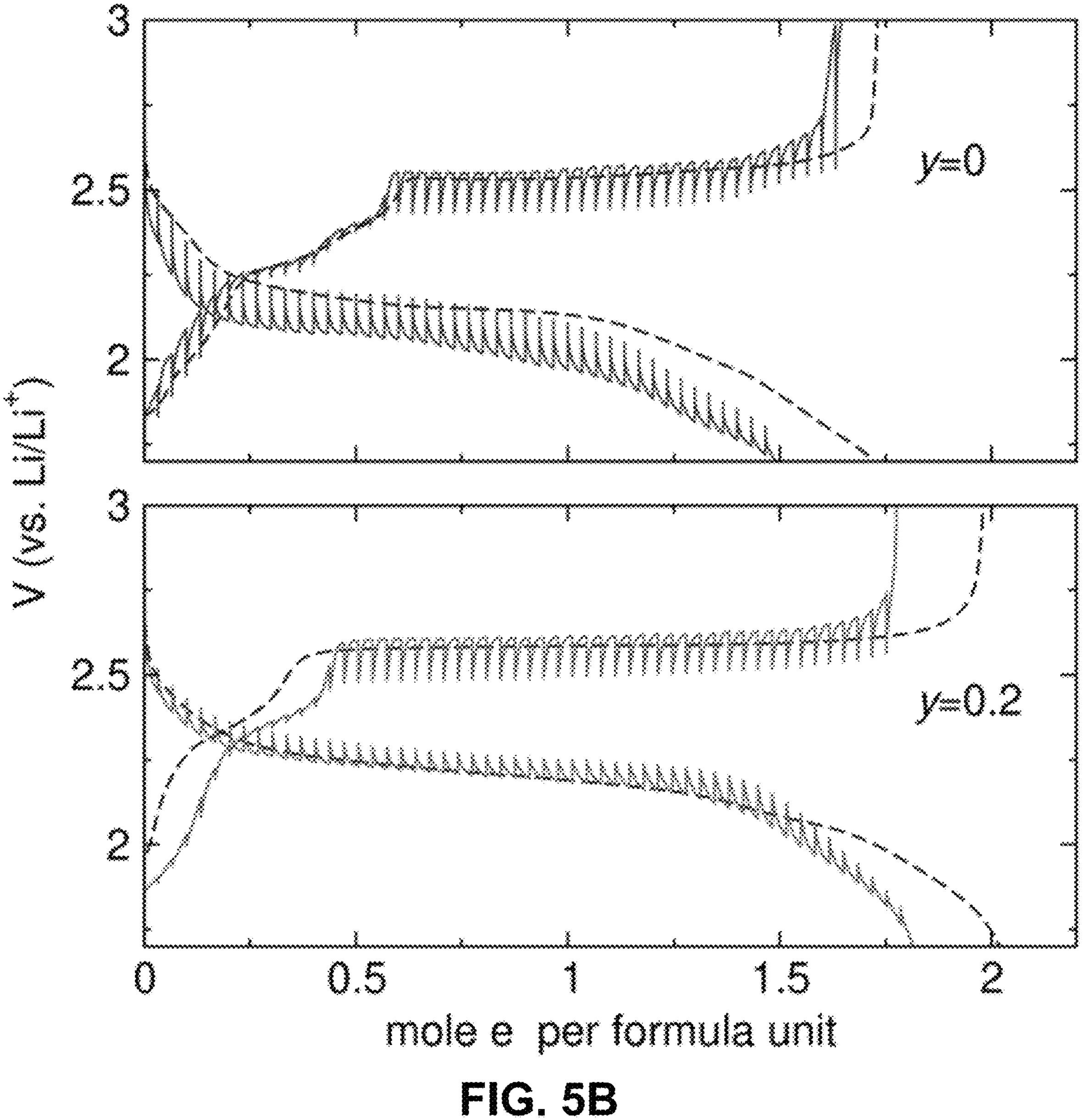
FIGS. 5A-5B: Comparison of galvanostatic intermittent titration (GITT) of the first cycle of (FIG. 5A) y=0 and (FIG. 5B) y=0.2 with representative C/10 traces. GITT was obtained at C/10 based on 1 electron per formula unit for 20 min separated by 4 h rest periods at OCV. The GITT are comparable i.e., overpotentials of Fe and S redox are similar in y=0 and y=0.2.
Figure 10:
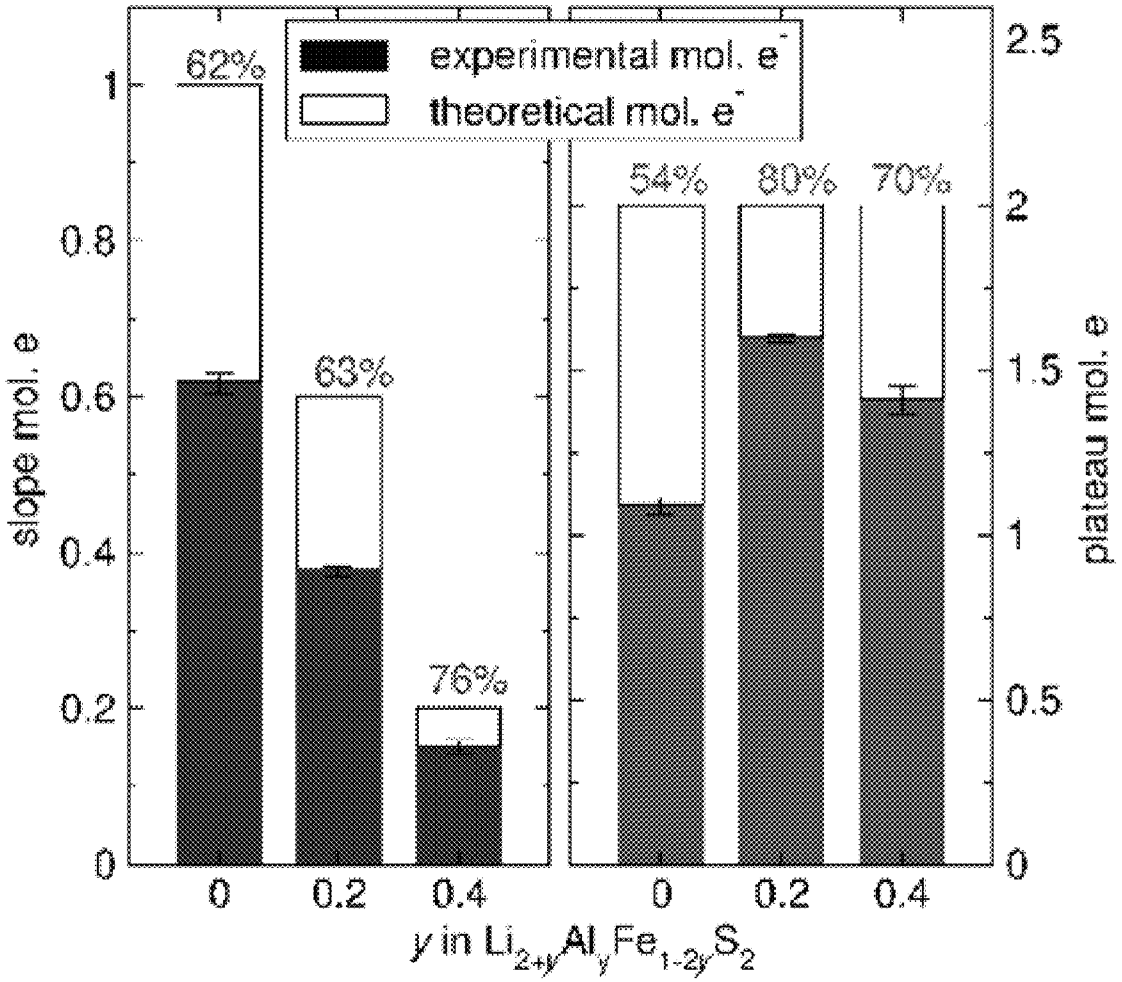
FIG. 10: The amount of $Fe^{2+/3+}$ redox and $2S^{2-}/(S_2)^{2-}$ redox as a fraction of the total theoretical capacity of each. Error bars are standard deviation of three replicates.

The y=0, 0.2, and 0.4 materials were electrochemically characterized by galvanostatic cycling experiments in half-cells with Li metal anodes and LP30 electrolyte. The charge and discharge curves for the first cycle of each material is shown in FIGS. 3A, 3B and 3C. The charge curves have an initial slope, the solid-solution-like $Fe^{2+/3+}$ redox, and then plateau, the conversion-like $2S^{2-}/(S_2)^{2-}$ redox. The $Fe^{2+/3+}$ redox capacity trends linearly with y, supporting the intended linear change in Fe content with y. The linear trend also shows that the rough stability limit of the oxidation state of Fe at ~2.6+ in y=0 persists at all y and suggests that it is an intrinsic thermodynamic stability limit rather than a kinetic one. Unlike $Fe^{2+/3+}$ redox, $2S^{2-}/(S_2)^{2-}$ redox is maximal at y=0.2. Error bars on the capacity differences in FIGS. 3A-3C are shown in FIG. 10 across three replicates and are all within ±5%.

The extra anion redox in y=0.2 begets a charge energy density of 1123±5 $Wh\cdot kg^{-1}$, 2617.8 $Wh\cdot L^{-1}$ and discharge energy density of 1034±22 $Wh\cdot kg^{-1}$, 2455.4 $Wh\cdot L^{-1}$. The gravimetric energy densities outperform NMC811 and while the volumetric energy densities do not outperform NMC811, they do outperform $LiFePO_4$. Importantly, the high energy density is highly reversibly between the first charge and discharge i.e., reversible redox of ~80% of the anion sub-lattice. Similar levels of anion redox in lithium-rich transition metal chalcogenides have not been previously reported. While y=0.4 also has higher levels of anion redox than y=0, we herein focus our study on the comparison of y=0 and y=0.2 to understand the impact of the excess anion redox. There is a greater extent of anion redox in y=0.2 than y=0.4, and hysteresis and overpotential for anion redox increase significantly in y=0.4 compared to y=0 and 0.2.

Characterization of the Redox Processes

To characterize Fe redox processes, we measured Fe K-edge X-ray absorption spectroscopy (XAS) at six different SOCs for both y=0 and y=0.2. The pre and near-edge data for y=0 and y=0.2 are plotted in FIGS. 6A-6B and FIGS. 7A-7B.

The Fe K-edge spectra at different SOCs for y=0 suggest $Fe^{2+/3+}$ and $2S^{2-}/(S_2)^{2-}$ are distinct, sequential events on charge; the rising edge does not shift between the transition and charged SOCs, suggesting that the ~$1e^-$ oxidation occurring in between does not involve Fe. However, the Fe K-edge spectra for y=0.2 show dynamic Fe redox occurs during $2S^{2-}/(S_2)^{2-}$ redox—specifically partial Fe reduction or changes in Fe—S covalency during the observed excess S-redox. The rising edge shifts to lower energy at full charge compared to at the transition. The shift to lower energy, suggesting reduction, is in contrast to the extensive ~$2e^-$ global oxidation of y=0.2 during charge.

Figure 8:
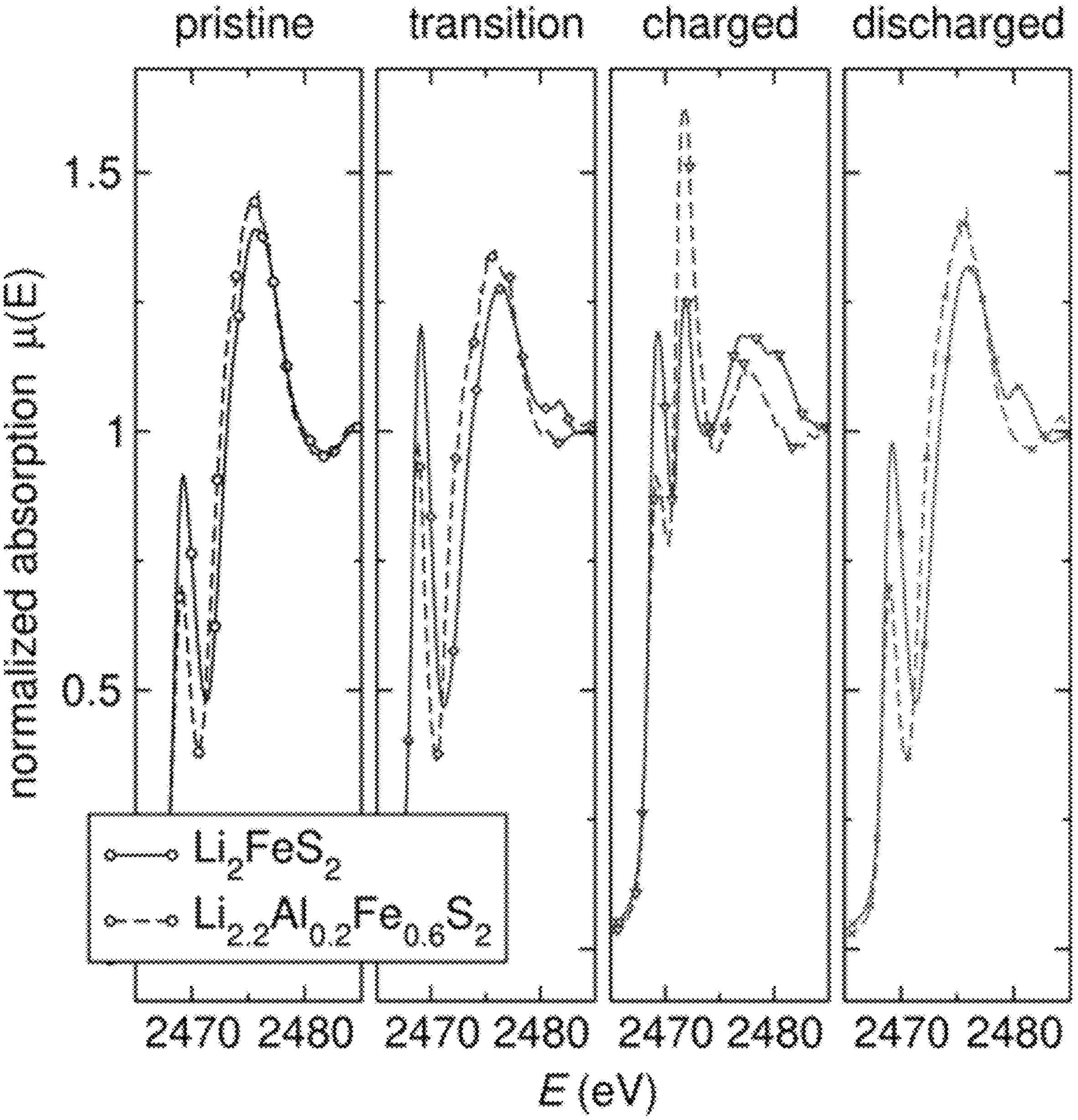
FIG. 8: S K-edge XANES spectra of y=0 and 0.2 at different SOCs.
Figure 9A:
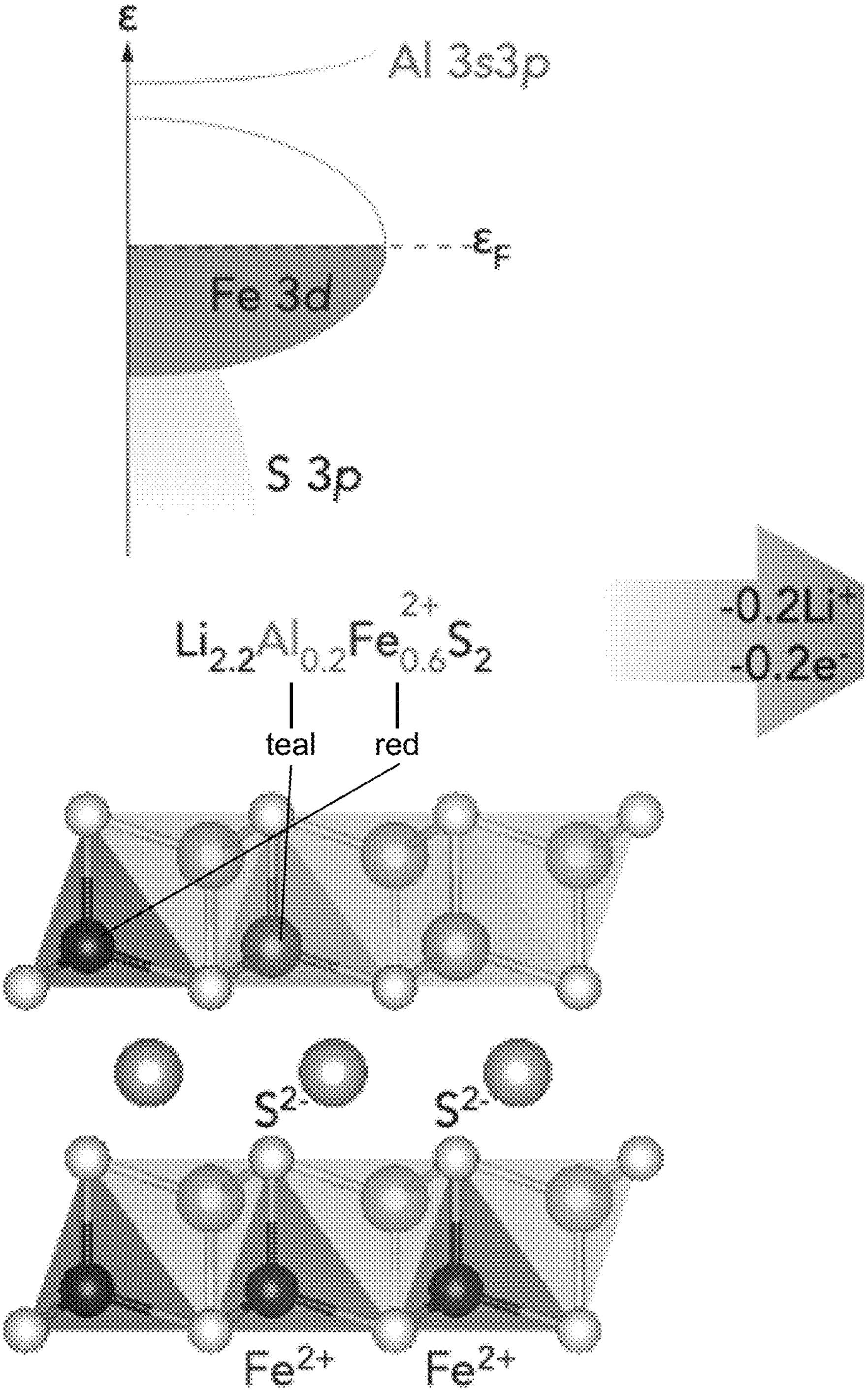
FIGS. 9A-9D: Hypothesized redox mechanism at the (FIG. 9A) pristine to mid-slope, (FIG. 9B) mid-slope to transition, (FIG. 9C) transition to mid-plateau, (FIG. 9D) mid-plateau to charged SOCs in y=0.2.
Figure 9B:
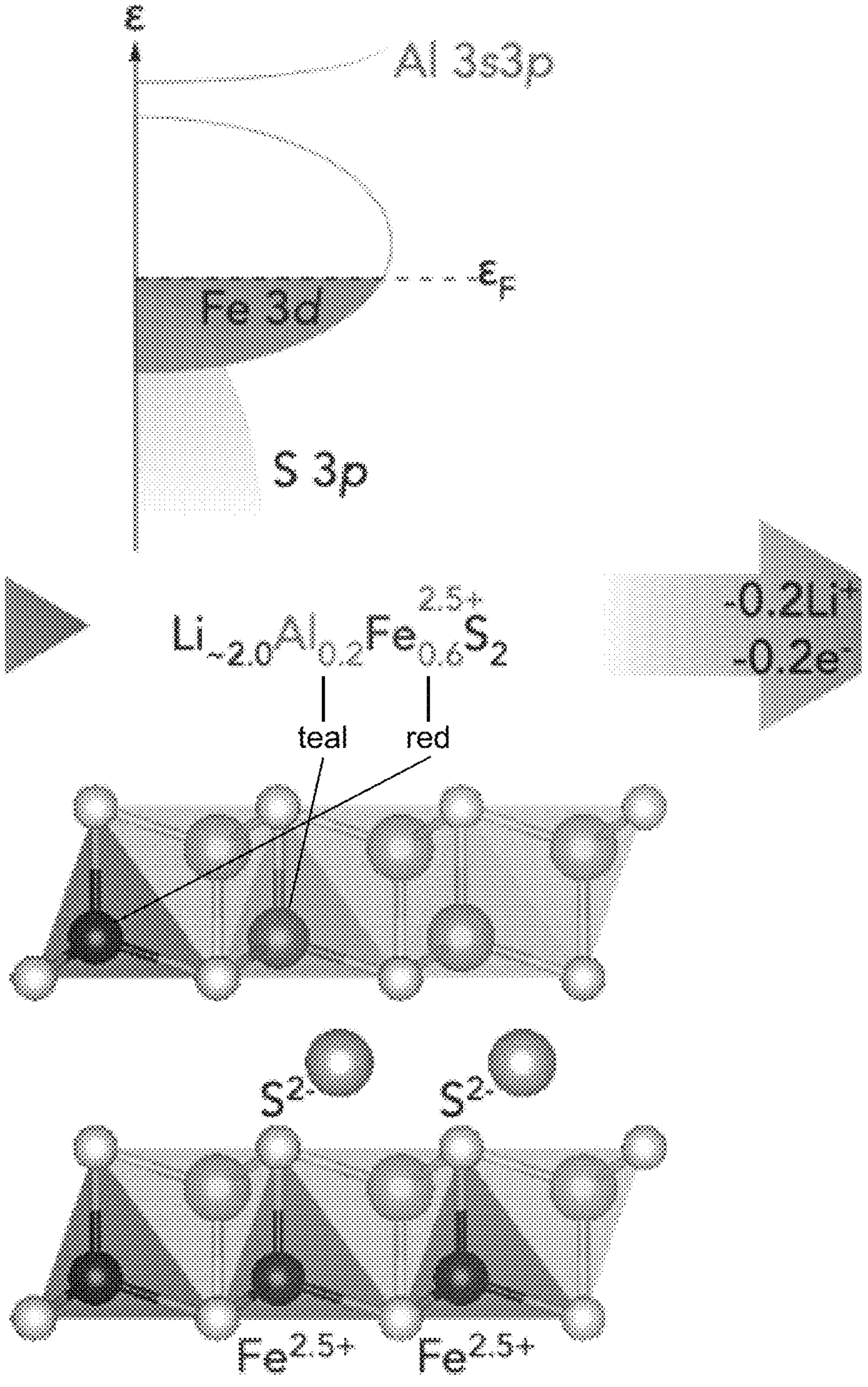
Figure 9C:
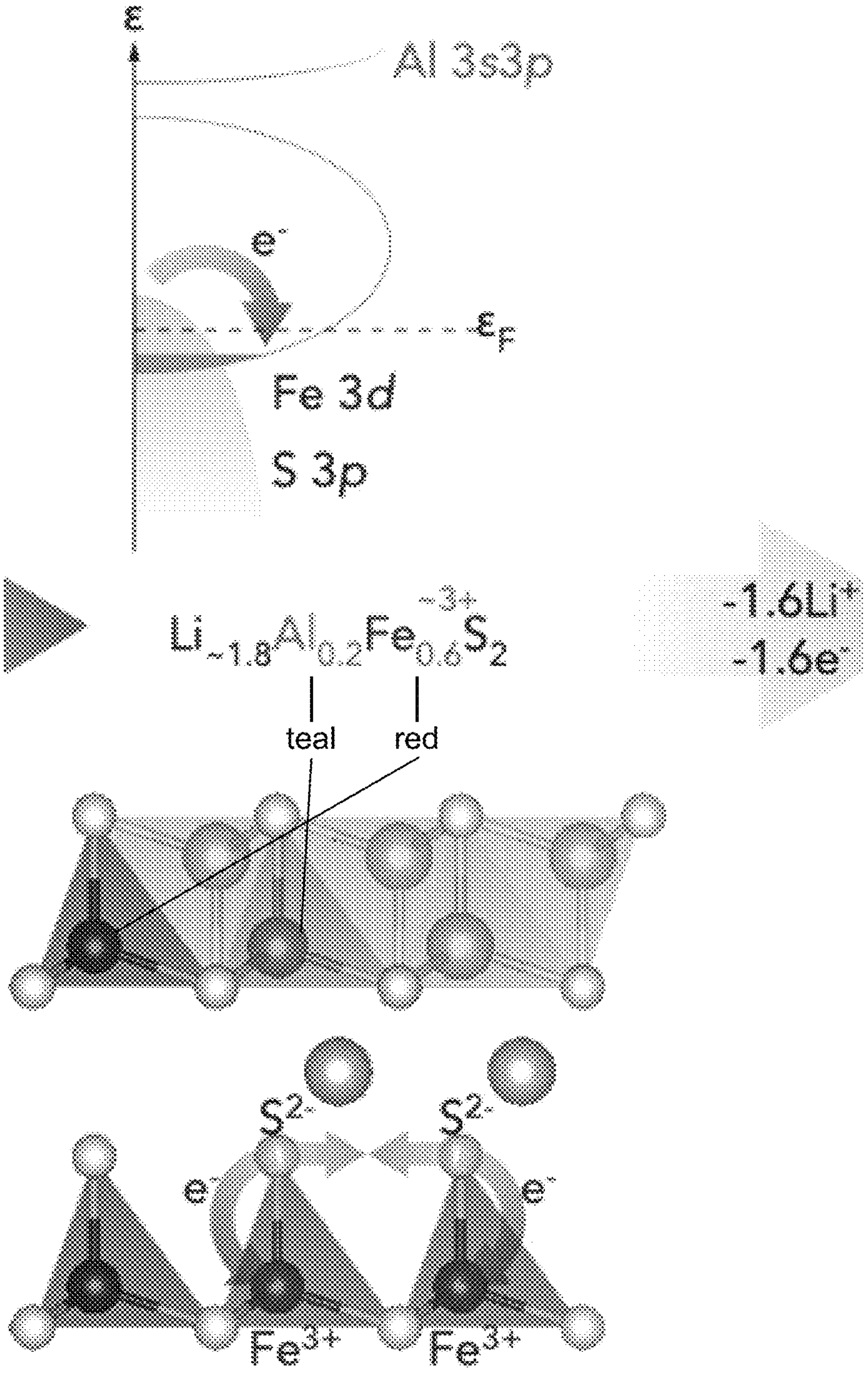
Figure 9D:
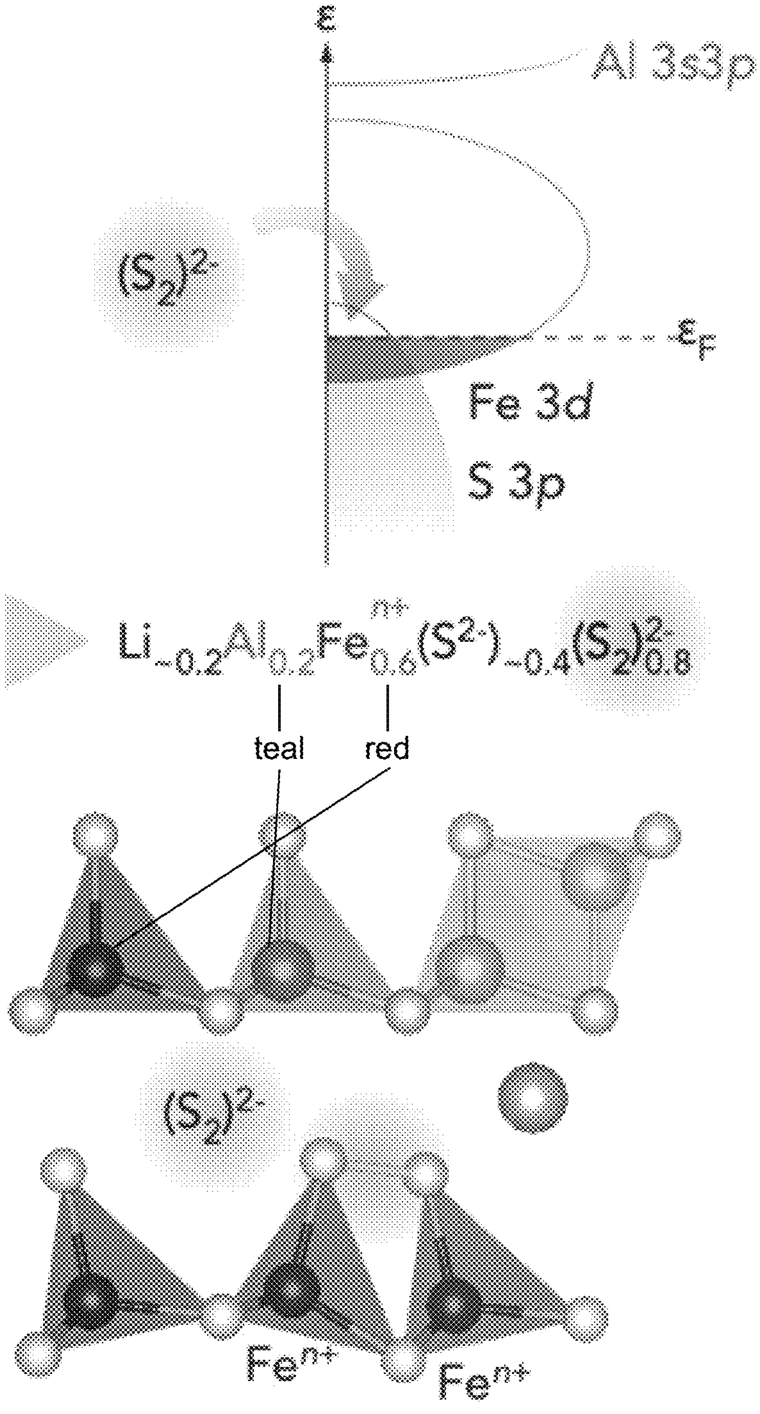

To characterize the S redox processes, we also measured S K-edge X-ray absorption spectroscopy (XAS) at the same six different SOCs for both y=0 and y=0.2. It was demonstrated by Hansen et al. that the pre-edge feature at 2471.8 eV indicates $(S_2)^{2-}$ formation.[6] The S K-edge XANES spectra comparison at full charge in FIG. 8 shows a much more intense pre-edge feature at 2471.8 eV for y=0.2 compared to y=0, corroborating oxidation of a large portion (~80%) of the anion sub-lattice.

Supplementary Information

Figure 11:
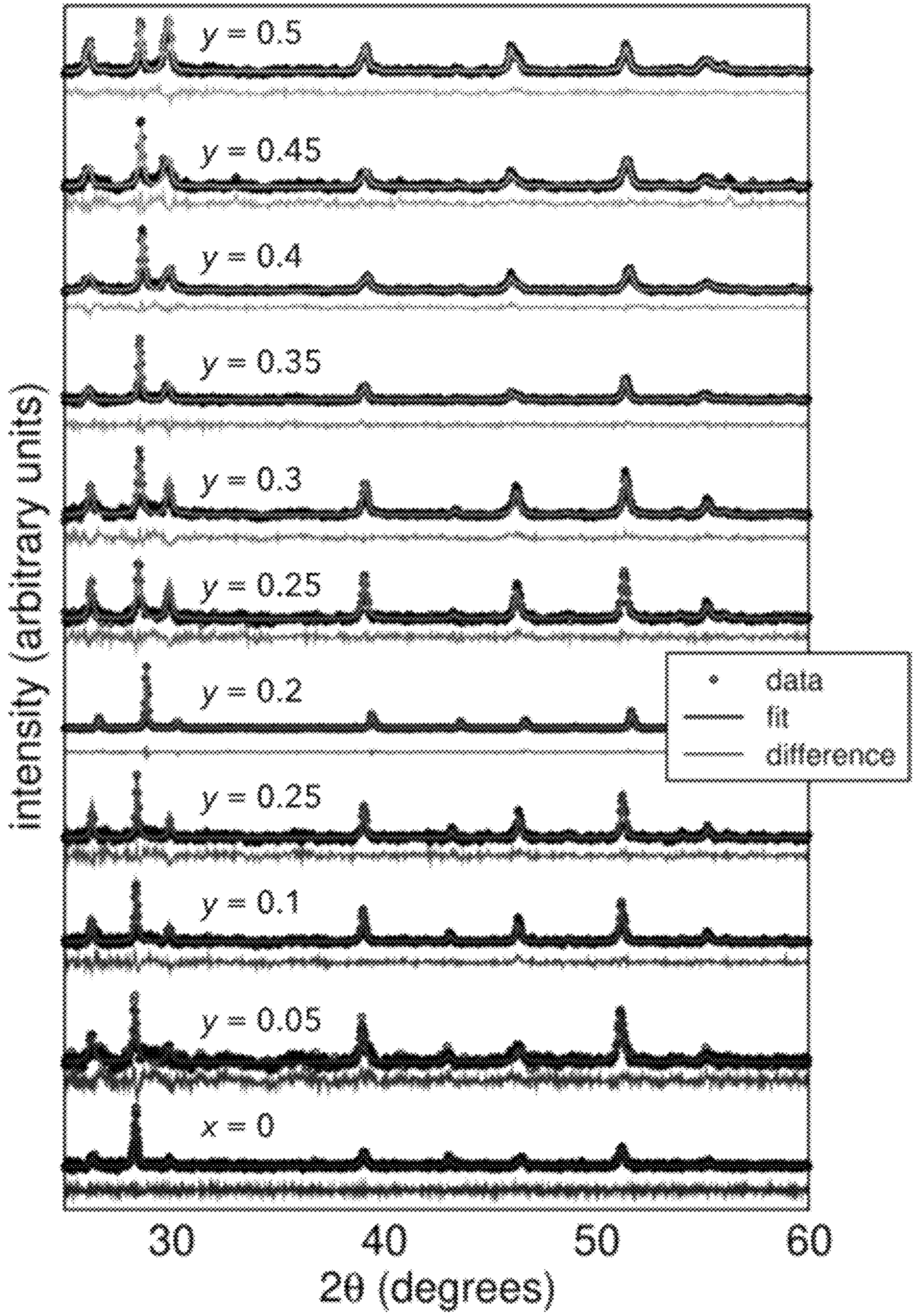
FIG. 11: PXRD of y values at increments of 0.05 between 0 and 0.5.
Figure 12:
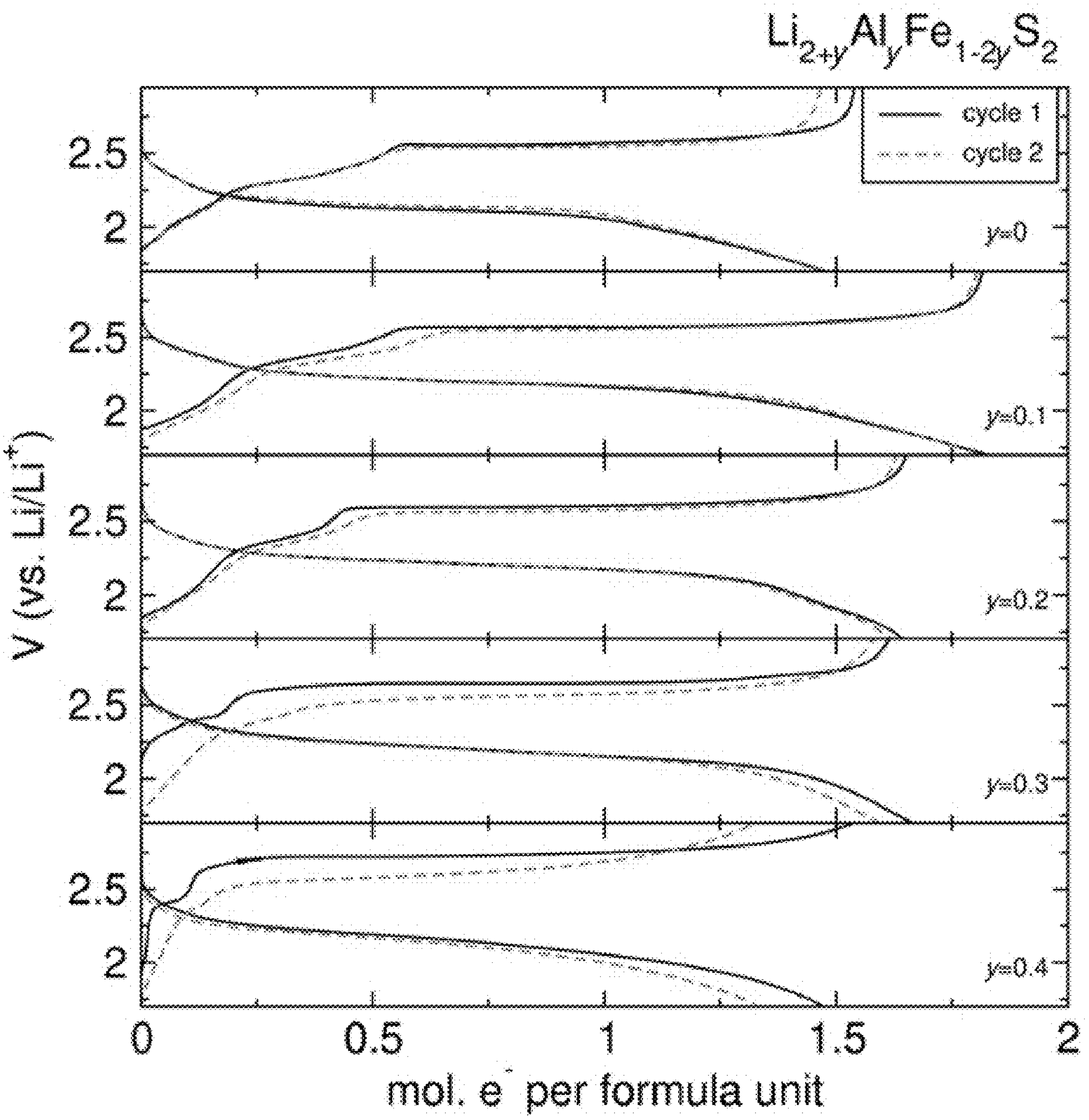
FIG. 12: Comparison of galvanostatic cycling curves for cycles 1 and 2 of y values at increments of 0.1 between 0 and 0.4 (y=0.5 is electrochemically inactive).

FIGS. 11 and 12 demonstrate the ability to synthesize and cycle materials at many values of y. In FIG. 11, PXRD patterns are shown for increments of 0.05 in y. The patterns illustrate that every material can be refined to the hybrid model described in the discussion of FIG. 2 i.e., all the major reflections in all patterns in FIG. 11 are accounted for. It is observed that the major reflections are preserved despite the space group change from P-3m1 to P21/m between y=0 and y=0.5, i.e., that any lower symmetry reflections unique to P21/m are also lower in intensity than the major reflections defined by the lattice sites. The patterns are of samples encapsulated between a glass slide and Kapton tape and diffracted using $CuK_{\alpha}$ radiation, which limits resolution and 26 range to between 25 and 60. The patterns in FIG. 2 are of samples in inert Ar gas inside a sealed chamber with X-ray transparent windows; thus higher resolution and a wider 26 range between 10 and 60. To validate systematic tunability of electrochemical properties with y, FIG. 12 shows galvanostatic cycling data of cycles 1 and 2 for increments of 0.1 in y. The overall trend is consistent with the data in FIG. 3, wherein the capacity from the initial sloping portion of the charge curve corresponds directly to Fe content i.e., 1-2y. The capacity from the later charge curve plateau does not show any obvious trend with y (our study focuses on the excess anion redox in y=0.2). The cycle 1 to cycle 2 capacity fade becomes markedly more pronounced in y=0.3 and even more so in y=0.4. No galvanostatic cycling data of y=0.5 are shown as attempts to cycle it showed it is electrochemically inactive i.e., no capacity. Overall, the data demonstrate tunable stoichiometry with y with minimal structural differences (e.g., no obvious phase transition, abrupt change in symmetry between P-3m1 and P21/m etc.) and continuous, systematic changes in electrochemistry with y.

REFERENCES CORRESPONDING TO EXAMPLE 1

(1) Armstrong, R.; Chiang, Y.-M.; Gruenspecht, H. *The Future of Energy Storage*; MIT Future of.

(2) Zak, J. J.; Kim, S. S.; Laskowski, F. A. L.; See, K. A. An Exploration of Sulfur Redox in Lithium Battery Cathodes. *J. Am. Chem. Soc.* 2022, 144 (23), 10119-10132.

(3) House, R. A.; Marie, J.-J.; Pérez-Osorio, M. A.; Rees, G. J.; Boivin, E.; Bruce, P. G. The Role of O 2 in O-Redox Cathodes for Li-Ion Batteries. *Nature Energy* 2021, 1-9.

(4) House, R. A.; Rees, G. J.; McColl, K.; Marie, J.-J.; Garcia-Fernandez, M.; Nag, A.; Zhou, K.-J.; Cassidy, S.; Morgan, B. J.; Saiful Islam, M.; Bruce, P. G. Delocalized Electron Holes on Oxygen in a Battery Cathode. *Nat Energy* 2023, 1-10. https://doi.org/10.1038/s41560-023-01211-0.

(5) McCalla, E.; Sougrati, M. T.; Rousse, G.; Berg, E. J.; Abakumov, A.; Recham, N.; Ramesha, K.; Sathiya, M.; Dominko, R.; Van Tendeloo, G.; Novek, P.; Tarascon, J.-M. Understanding the Roles of Anionic Redox and Oxygen Release during Electrochemical Cycling of Lithium-Rich Layered $Li_4FeSbO6$. *J. Am. Chem. Soc.* 2015, 137 (14), 4804-4814. https://doi.org/10.1021/jacs.5b01424.

(6) Hansen, C. J.; Zak, J. J.; Martinolich, A. J.; Ko, J. S.; Bashian, N. H.; Kaboudvand, F.; Van der Ven, A.; Melot, B. C.; Nelson Weker, J.; See, K. A. Multielectron, Cation and Anion Redox in Lithium-Rich Iron Sulfide Cathodes. *J. Am. Chem. Soc.* 2020, 142 (14), 6737-6749. https://doi.org/10.1021/jacs.0c00909.

(7) Goodenough, J. B. Structural Chemistry of Iron Sulfides. *Materials Research Bulletin* 1978, 13 (12), 1305-1314. https://doi.org/10.1016/0025-5408(78)90121-6.

(8) Lim, H.; Kim, S.-C.; Kim, J.; Kim, Y.-I.; Kim, S.-J. Structure of $Li_5AlS_4$ and Comparison with Other Lithium-Containing Metal Sulfides. *Journal of Solid State Chemistry* 2018, 257, 19-25. https://doi.org/10.1016/j.jssc.2017.09.018.

(9) Gamon, J.; Dyer, M. S.; Duff, B. B.; Vasylenko, A.; Daniels, L. M.; Zanella, M.; Gaultois, M. W.; Blanc, F.; Claridge, J. B.; Rosseinsky, M. J. Li4.3AlS3.3Cl0.7: A Sulfide-Chloride Lithium Ion Conductor with Highly Disordered Structure and Increased Conductivity. *Chem. Mater.* 2021, 33 (22), 8733-8744. https://doi.org/10.1021/acs.chemmater.1c02751.

Example 2: Spectroscopic and Structural Implications of Multielectron Redox in Li-Rich Battery Cathodes Redox in the cathode is formally localized on the metal. Conventional intercalation materials, like $LiCoO_2$ or NMC, undergo a single electron (or less) reduction upon lithiation. The charge compensation is formally localized on the metal.

Figure 13:
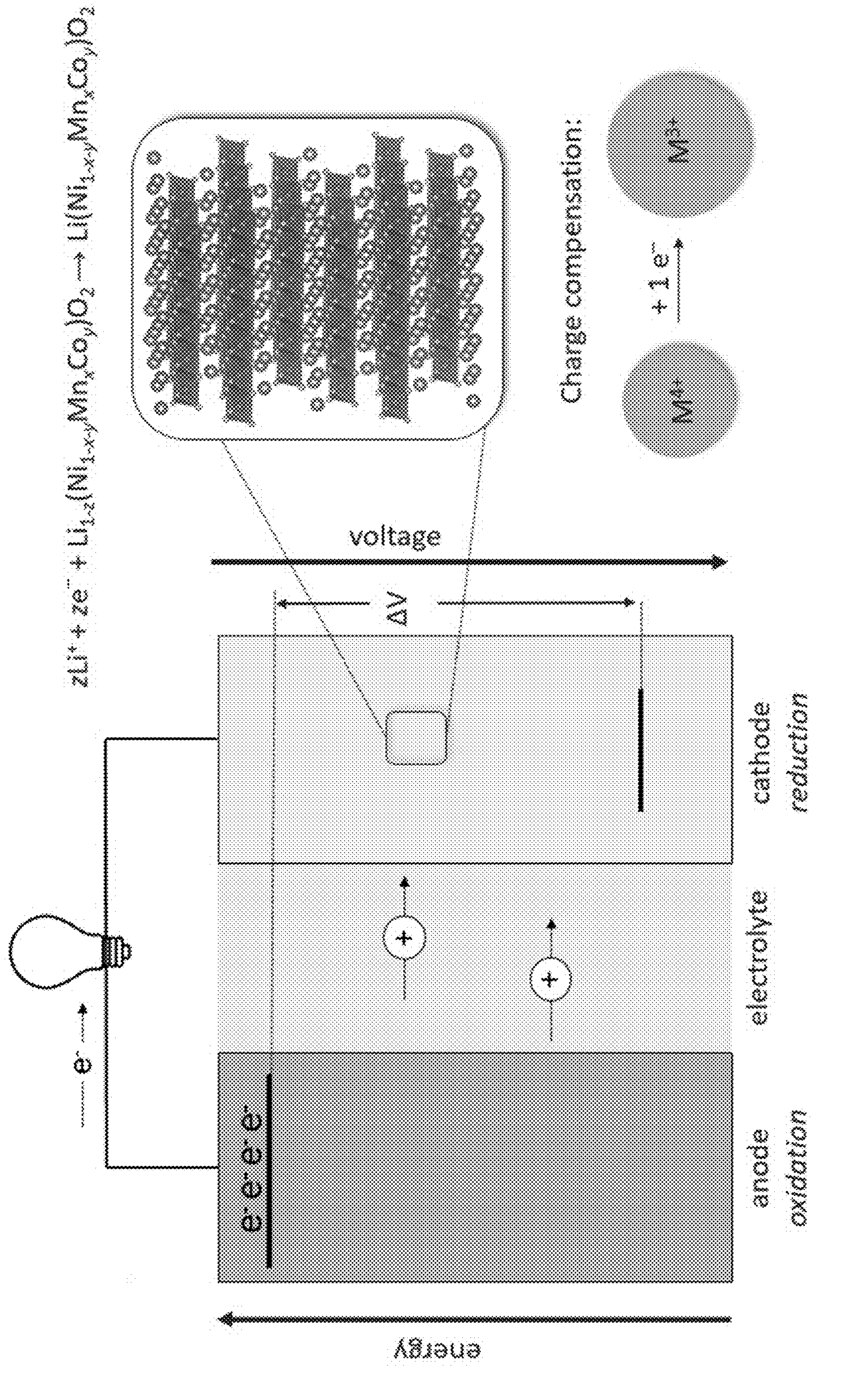
FIG. 13: Illustration showing how conventional intercalation materials undergo a single electron reduction upon lithiation.

FIG. 13 illustrates such a process, which follows the following formula:

$$zLi^{+}+ze^{-}Li_{1-z}(Ni_{1-x-y}Mn_{x}Co_{y})O_{2}\rightarrow Li(Ni_{1-x-y}Mn_{x}Co_{y})O_{2}.$$

Figure 14:
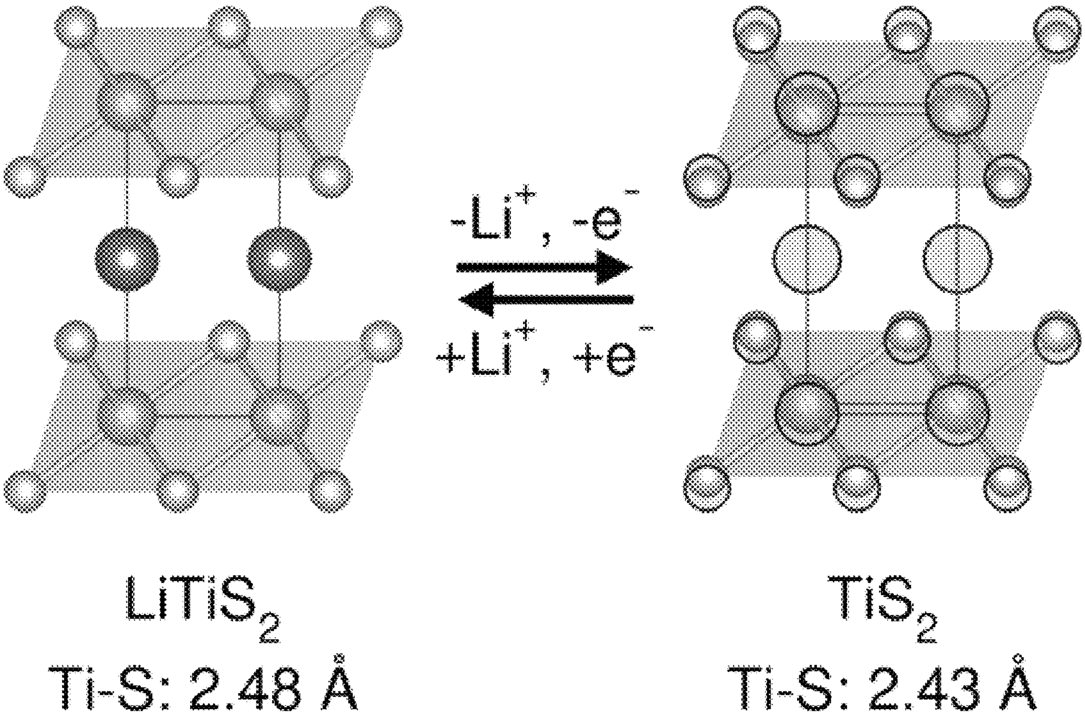
FIG. 14: Illustration showing effects and reversibility of reduction and lithiation of $TiS_2$.

Intercalation chemistry causes minimal changes to the structure of the cathode, as shown in FIG. 14 for $TiS_2$. As the $TiS_2$ is lithiated, the lithium ions intercalate between the layers of $TiS_2$. The process is reversed as the $TiS_2$ is de-lithiated.

Figure 15:
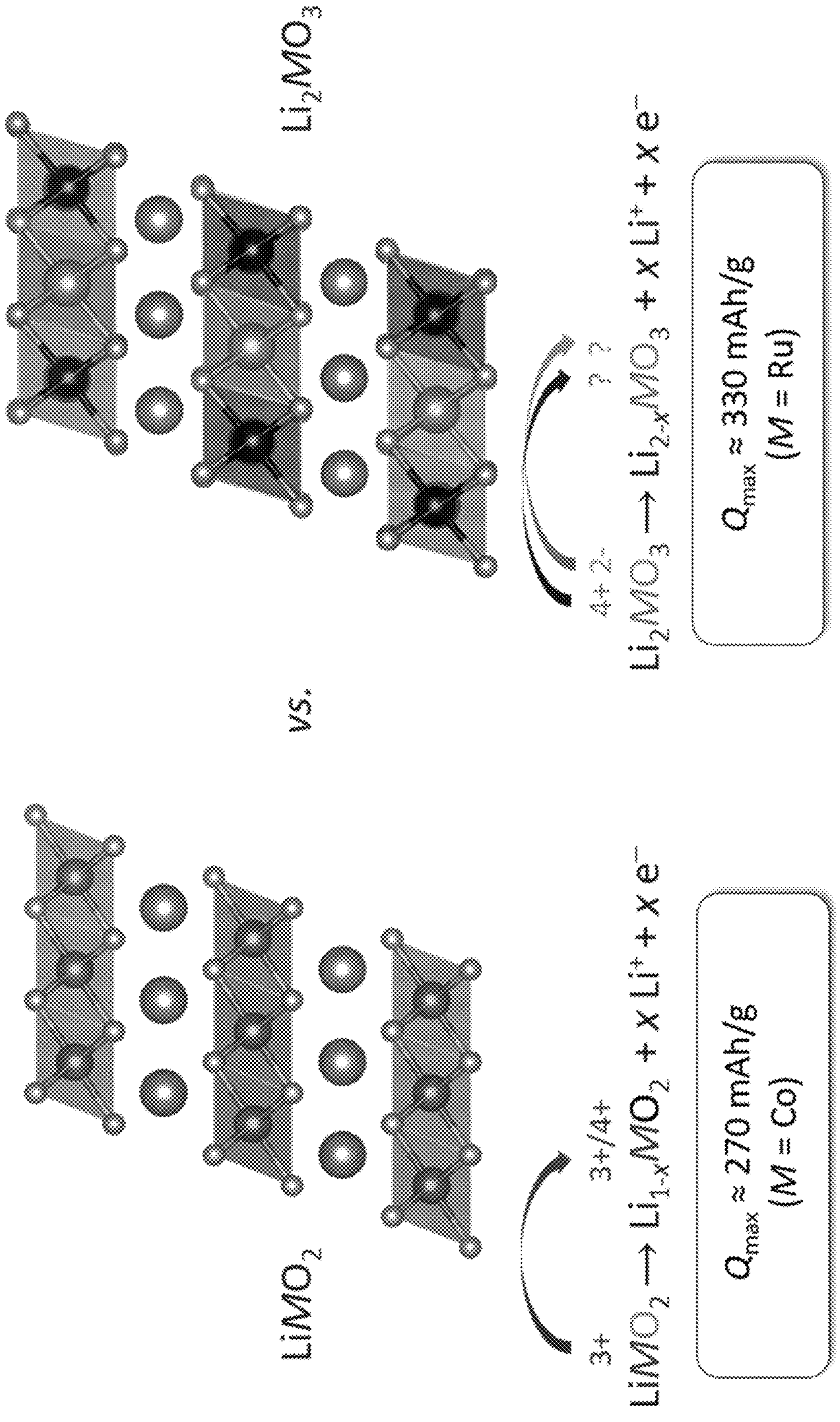
FIG. 15: Illustration showing that multi-electron cathodes employ mechanisms beyond conventional intercalation.

In contrast, multi-electron cathodes employ mechanisms beyond conventional intercalation. For example, as shown in FIG. 15, a conventional $LiMO_2$ type material with only one Li per M transition metal can invoke only up to one electron of transition metal redox. However, in Li-rich materials, such as the example $Li_2MO_3$ shown in FIG. 15, there is an excess of Li relative to the M transition metal content. Thus, to access the additional redox capacity provided by the excess Li, the redox must go beyond 1 electron on the transition metal and in fact invoke redox on the anions. In the case of the example in FIG. 15, this is shown as the removal of electrons from the 0 (i.e., oxide anion) component of the material.

Figure 16:
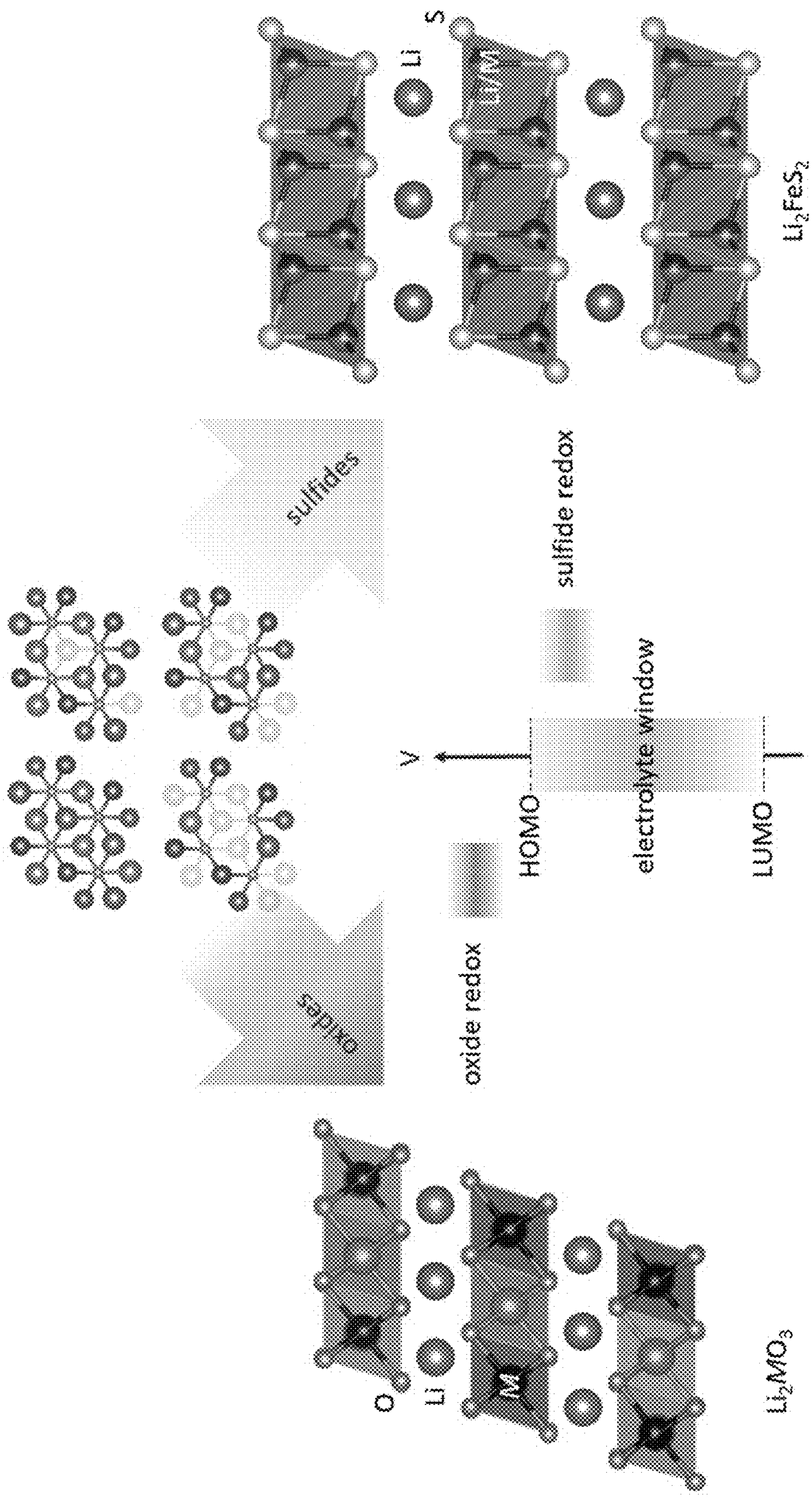
FIG. 16: Illustration comparing the voltages at which redox occurs for oxide and sulfide cathodes.

Multi-electron cathodes employ bands with anionic character to facilitate more than one electron transfer per transition metal. As shown in FIG. 16, the position of the anion bands plays an important role in the technical feasibility and stability of the anion redox in practical batteries. While oxides can exhibit anion redox, the oxide redox voltage lies outside of the electrolyte stability window, and so frequently results in electrolyte decomposition. Contrastingly, sulfides can be used as a model system to understand anion redox as the sulfide redox voltage lies within the electrolyte stability window. This provides fundamental clarity to study the redox reactions and positions them as more technically viable with existing, commercial electrolytes/batteries.

Iron is a more abundant element than nickel or cobalt. It is most commonly found as hematite, $Fe_2O_3$. Abundance and criticality are often cited interchangeably. However, abundance is only one dimension of criticality.

Criticality is defined by many dimensions and is dynamic: abundance, geographical distribution, geopolitics, environmental and/or social costs (of mining/extracting), existence/viability of substitutes, costs of refining, incumbency/economies of scale etc.

One way of measuring the criticality of iron is using the Herfindahl-Hirschman Index (HHI), which is proportional to geographical distribution. The HHI is calculated using the following formula:

$$HHI=\sum_{i}^{N}s_i^2$$

where N is the total number of countries involved and $s_i$ is the percent market share of country i.

Figure 17:
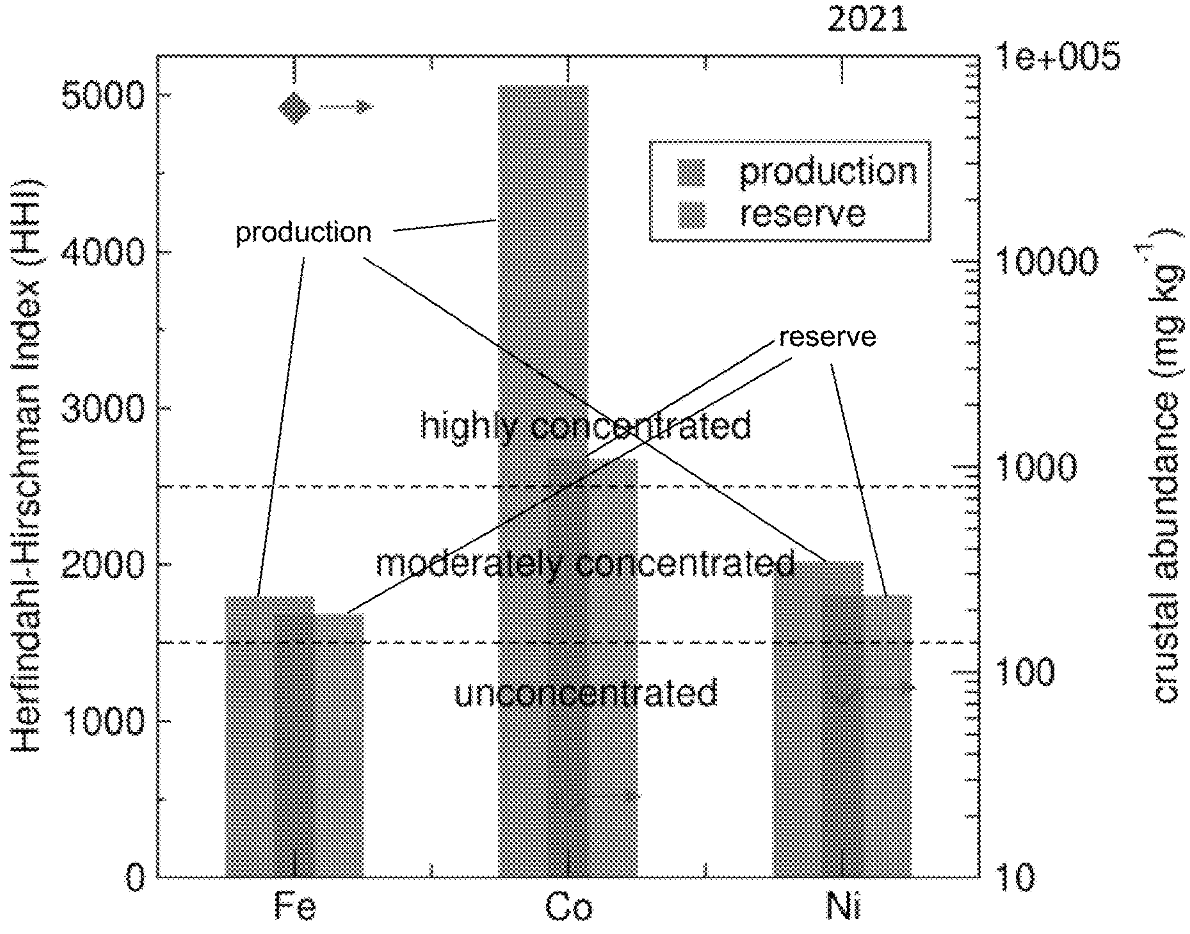
FIG. 17: Graph illustrating the relative abundance of Fe, Co, and Ni, and the geographical distribution of said elements.

As can be seen in FIG. 17, iron has an HHI indicating moderate concentration. However, iron has a very high crustal abundance. Therefore, iron is a non-critical material.

Figure 18:
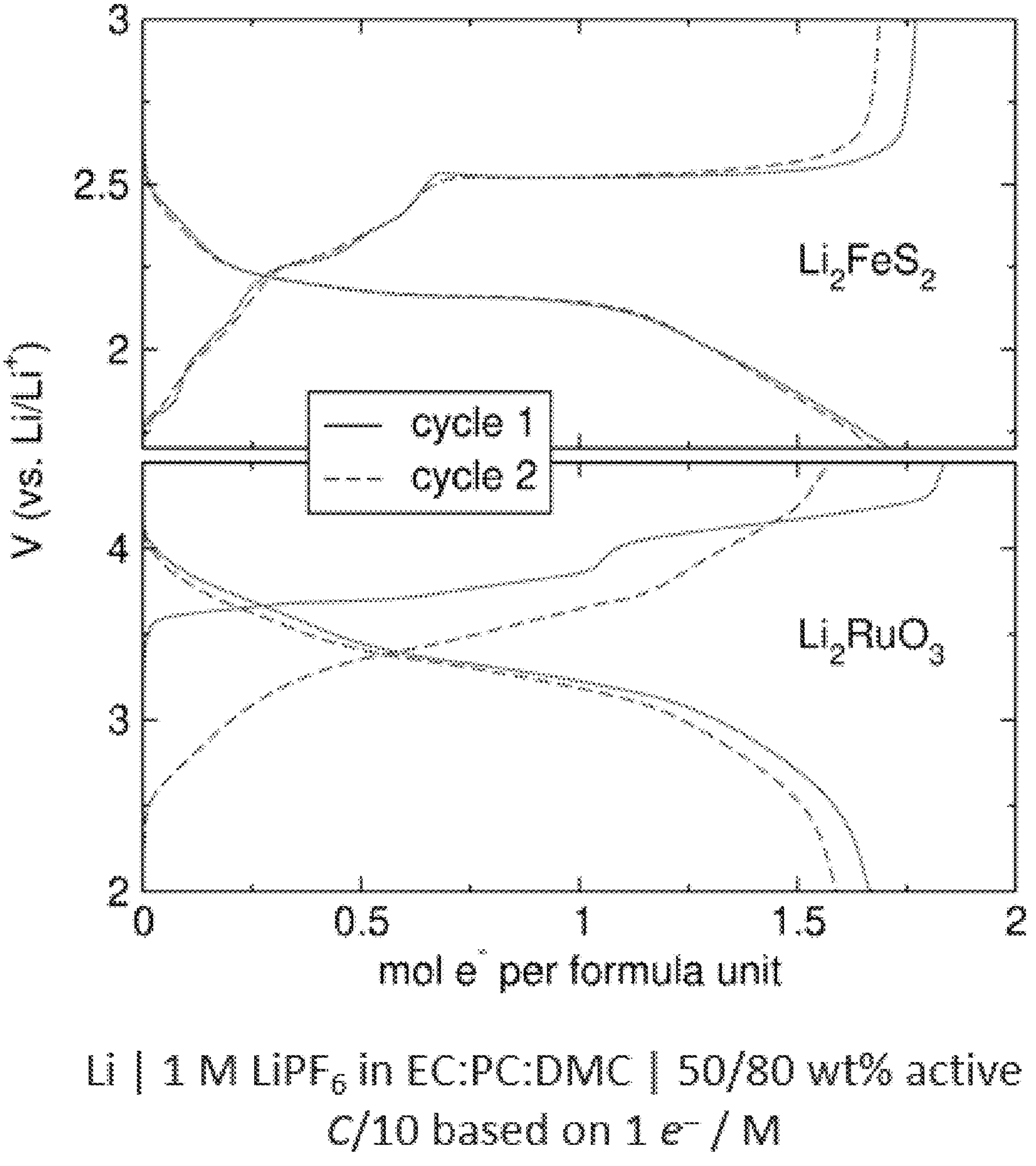
FIG. 18: Graph comparing the reproducibility of oxidation and reduction cycles of $Li_2FeS_2$ with those of $Li_2RuO_3$.

Having shown the non-criticality of iron in a global sense, we continue our discussion of the viability of using sulfides as a model system to understand anion redox. FIG. 18 compares charge/discharge cycles of $Li_2FeS_2$ and $Li_2RuO_3$. As can be seen in FIG. 18, the first and second cycles of $Li_2FeS_2$ overlay closely, suggesting that the redox mechanism invoked on the first cycle is highly reversible and subsequently invoked again on the second cycle. Contrastingly, the first and second cycles of the oxide material $Li_2RuO_3$ do not overlay, suggesting that the redox mechanism invoked on the second cycle is different than the first; and that the redox reaction invoked on the first cycle is largely irreversible. One of the sources of the irreversibility could be electrolyte decomposition or 02 gas evolution as suggested by the diagram in FIG. 16. Thus, the higher reversibility and stability of the multielectron redox mechanism in $Li_2FeS_2$ positions it as a viable candidate for further development/optimization towards functional materials for use in commercial batteries.

Figure 19:
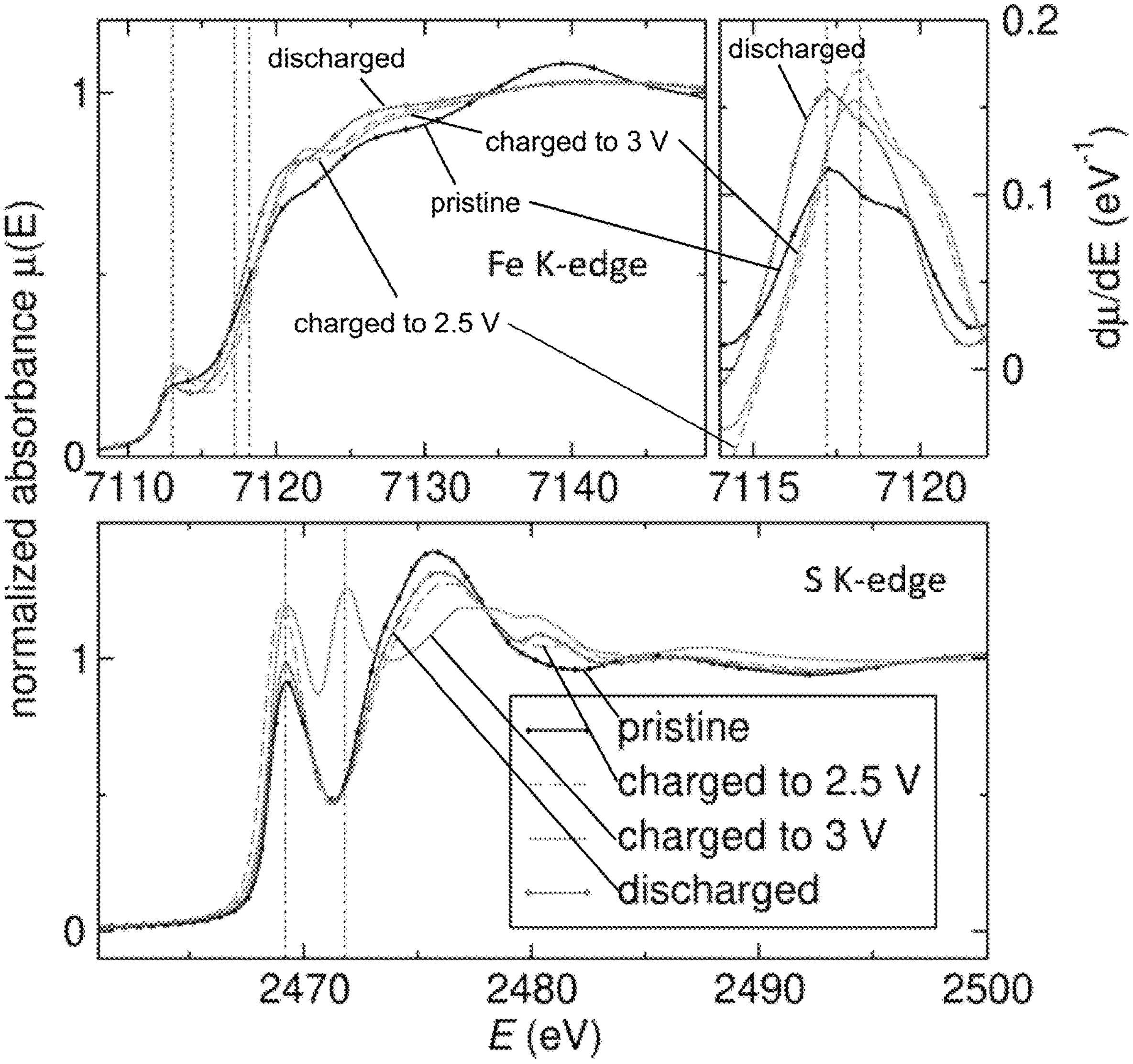
FIG. 19: Graphs obtained using X-ray absorption spectroscopy of the absorbance of $Li_2FeS$ at various energies.

Referring now to FIG. 19, X-ray absorption spectroscopy (XAS) suggests oxidation of Fe and S. The Fe pre-edge is ascribed to weakly allowed Fe 1s to Fe 3d transition which is depressed due to a slight displacement of the Fe in the tetrahedron. The S K-edge spectrum of $Li_2FeS_2$ show a pre-edge features due to the S 1s to Fe 3d transition. The intensity is a probe of covalency.

The Fe K-edge edge shifts when $Li_2FeS_2$ is oxidized to 2.5 V. The covalency of the Fe—S bond increases upon Fe oxidation, causing the S K-edge pre-edge to increase in intensity.

Oxidation to 3 V results in no shift in the Fe K-edge. The S K-edge spectrum shows a new pre-edge feature upon oxidation to 3 V and a shift in the edge, confirming the participation of S in the charge compensation.

The shifts in the Fe and S K-edge spectra upon oxidation are mostly reversible upon reduction. Changes in both spectra are observed after the edge suggesting irreversible structural changes.

Figure 20:
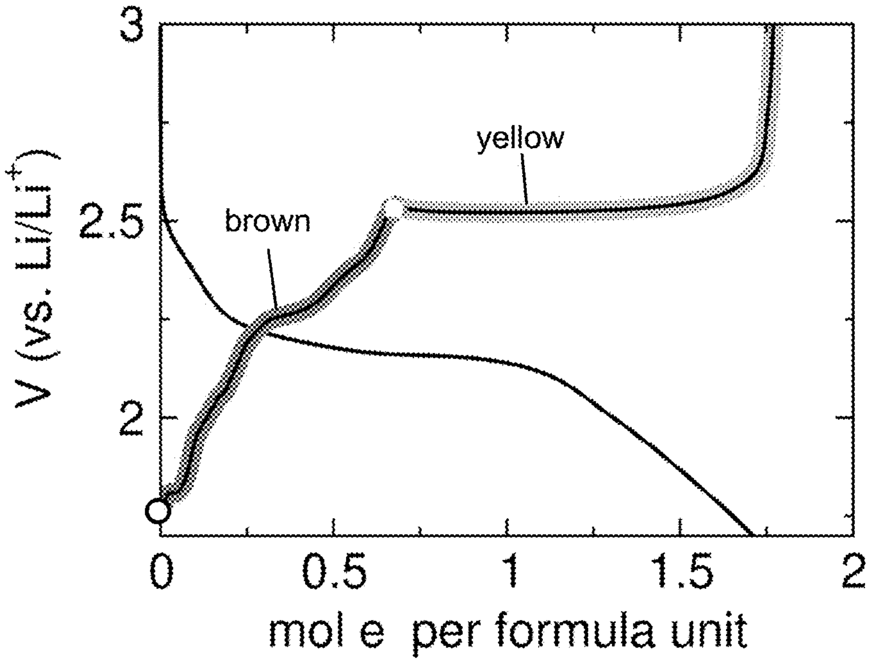
FIG. 20: Graph showing the change in voltage as a function of moles of electrons per formula unit.

As shown in FIG. 20, the initial sloping region can be assigned to $Fe^{2+}$ oxidation to $Fe^{2+/3+}$ and the plateau region is primarily due to $S^{2-}$ oxidation to $S_2^{2-}$.

Figure 21:
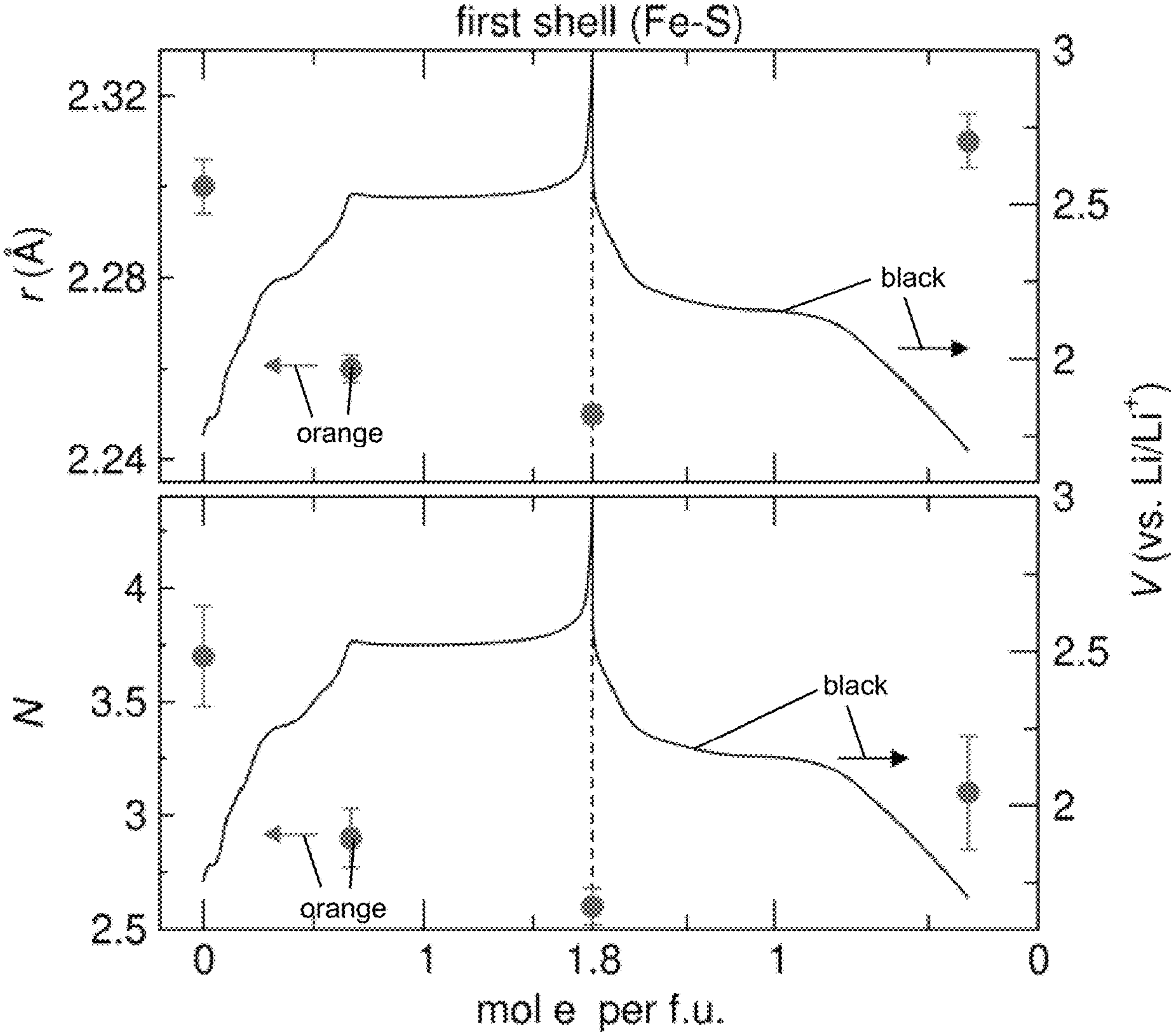
FIG. 21: Graphs obtained using extended X-ray absorption fine structure (EXAFS) illustrating changes in radius, voltage, and normalized absorption at various energies.

The local structure around Fe does not change upon anion oxidation. As shown in FIG. 21, EXAFS shows negligible change in the local structure of the Fe between 2.5 V to 3 V. Tilting of the $FeS_4$ tetrahedra would allow for a S—S bond to form without distorting the Fe local structure.

Figure 22:
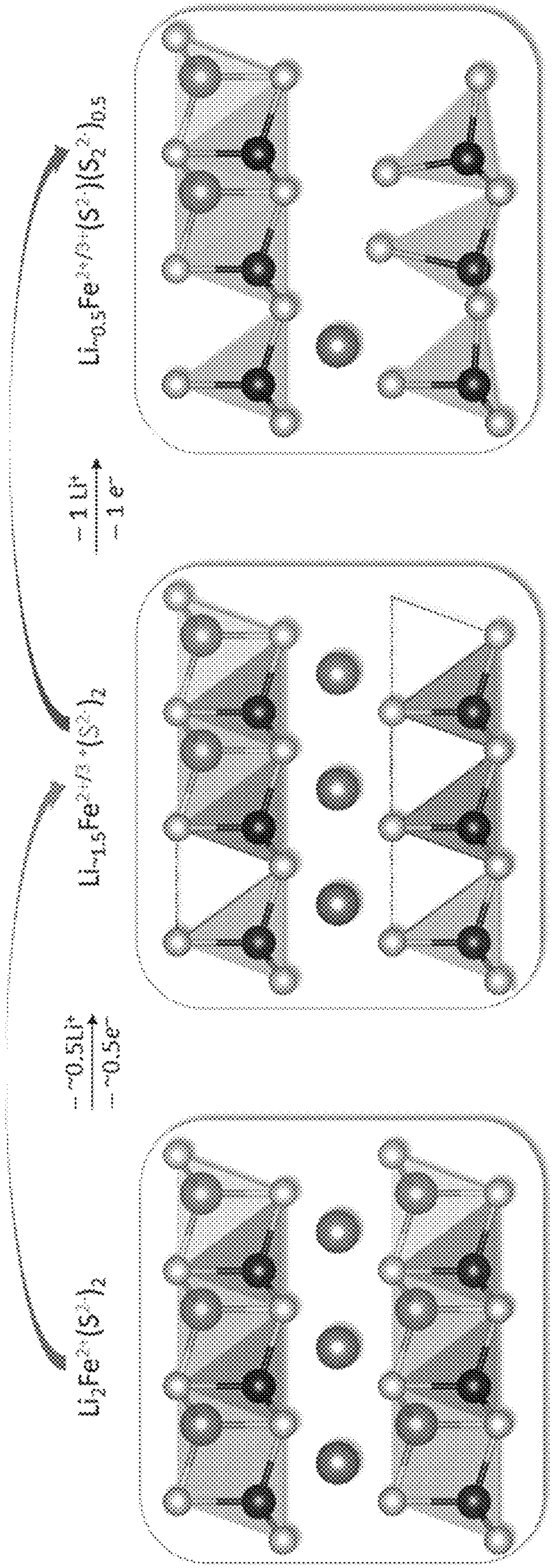
FIG. 22: Illustration showing the changes in the structure of $Li_2FeS_2$ as it is reduced.

$Li_2FeS_2$ undergoes anion redox. The reversibility is governed by structure. Specifically, as shown in FIG. 22, $Li_2FeS_2$ is capable of reversible redox of >1 mol $e^-$ per formula unit. A structural distortion associated with the second oxidation governs reversibility.

Figure 23A:
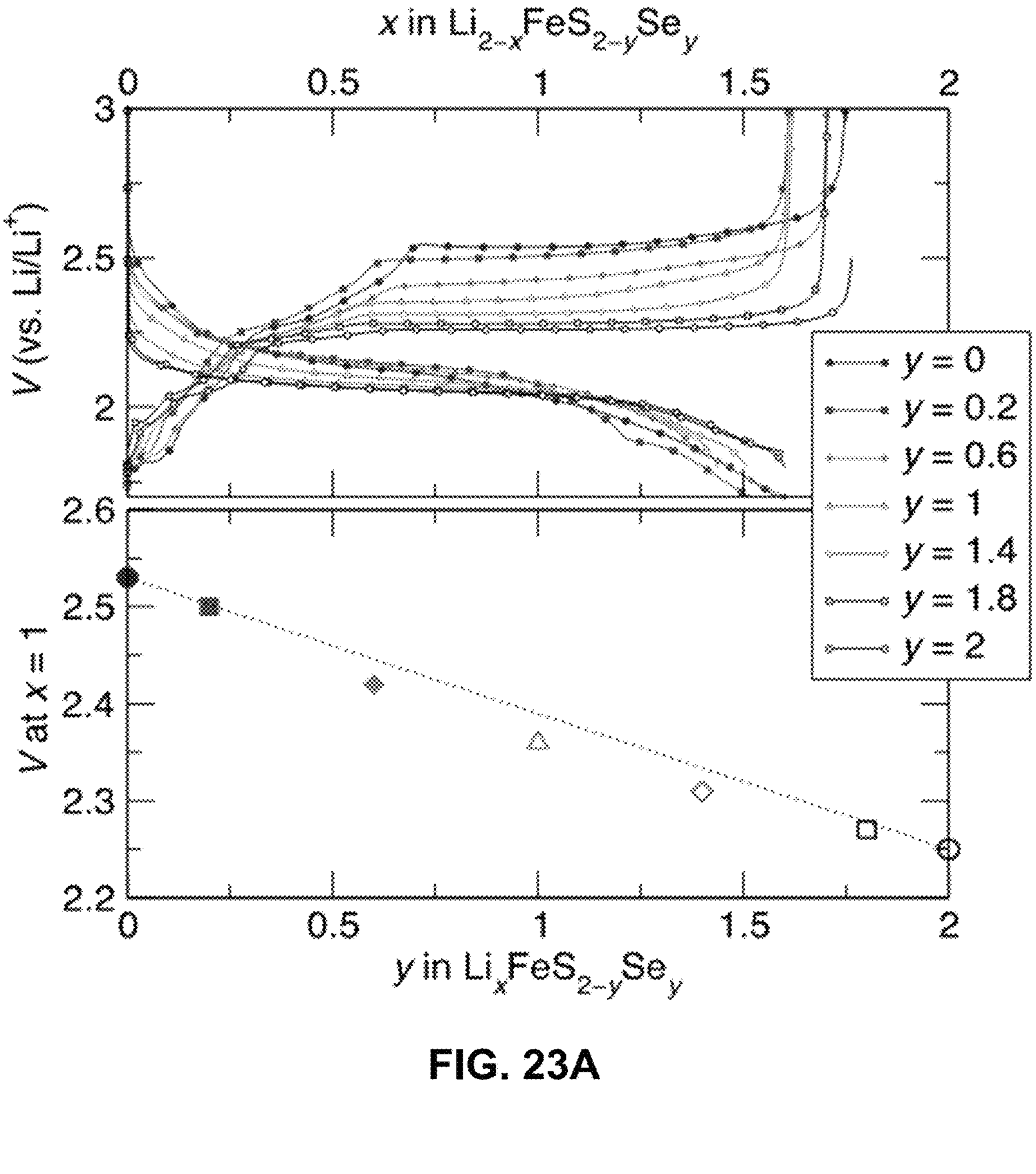
FIGS. 23A-23B: Illustrations showing changes in the charge voltage attributed to S oxidation as Se substitution in $Li_{2-x}FeS_{2-y}Se_y$ increases.
Figure 23B:
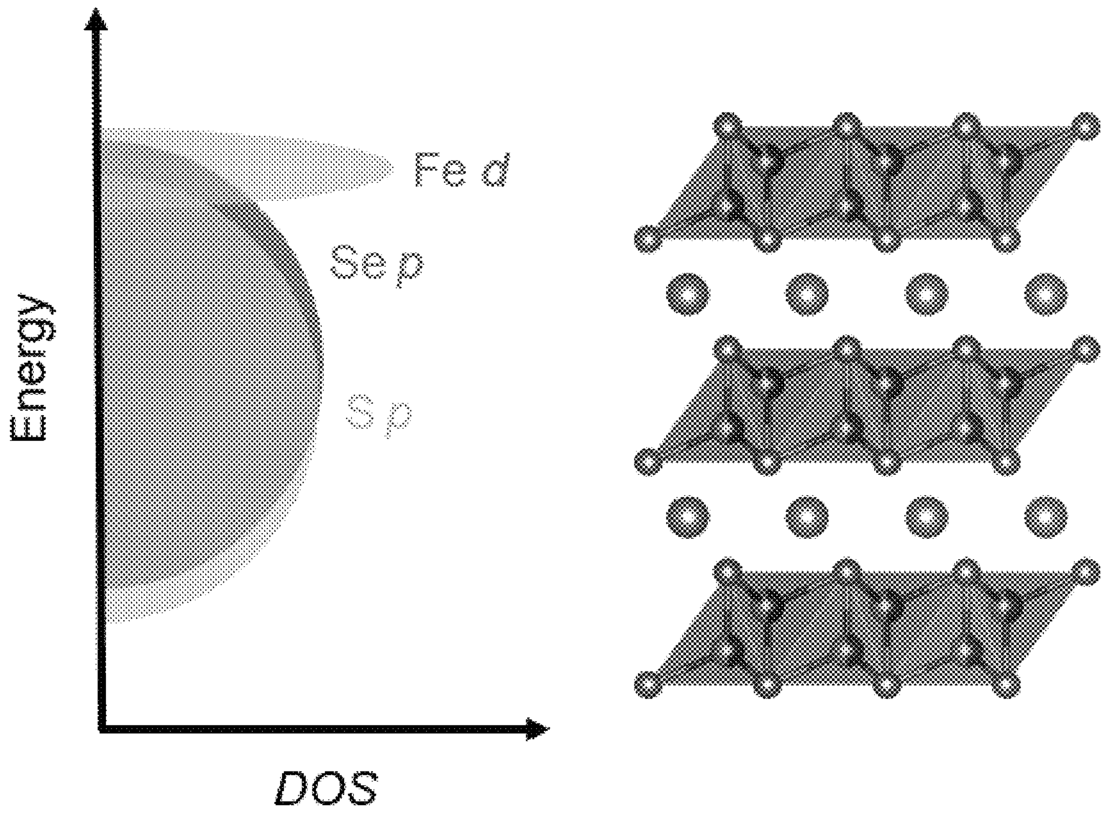

Example 3: Developing Structure Property Relationships for Multielectron Metal Sulfide Cathodes The $A_2MS_2$ phase provides tunability in the crystal chemistry, allowing us to probe the affect of electronic structure on anion redox. As shown in FIGS. 23A-23B, selenium substitution controllably shifts the redox potentials and the solid solution of $Li_2FeS_{2-y}Se_y$ shows tunable anionic redox. The charge voltage attributed to S oxidation shifts to lower potentials as Se substitution increases.

Figure 24A:
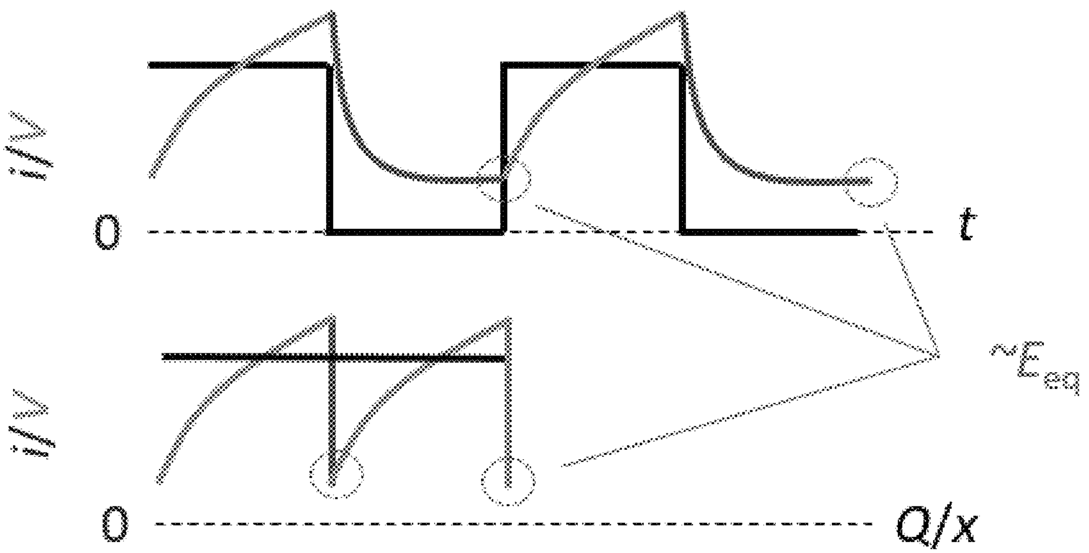
FIGS. 24A-24B: Illustrations showing how galvanostatic intermittent titration (GITT) can be used to approximate the equilibrium potential and how said potential changes with varying amounts of Se.
Figure 24B:
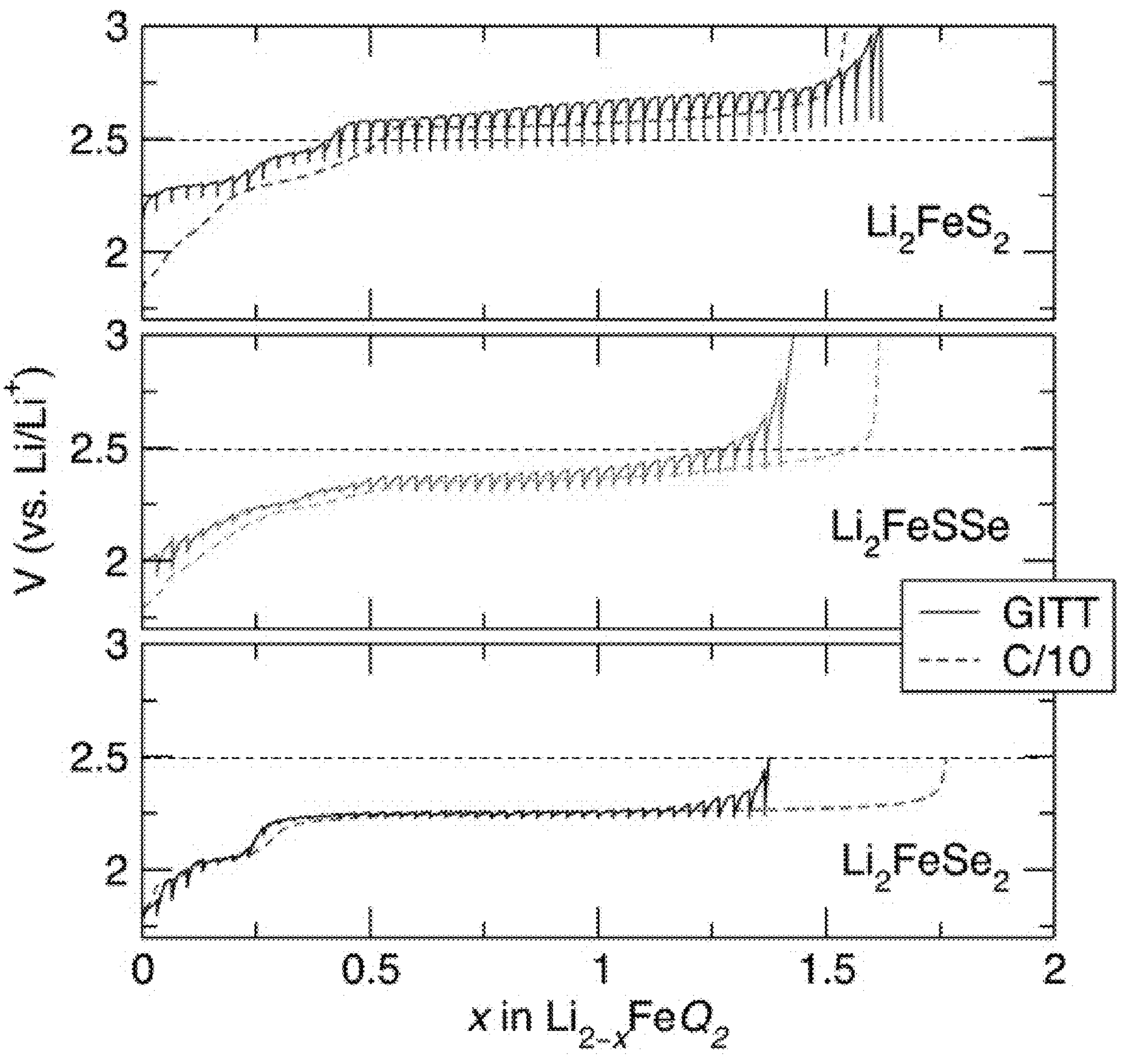

Galvanostatic intermittent titration shows lower overpotentials with increasing Se content. As shown in FIGS. 24A-24B, galvanostatic intermittent titration (GITT) can be used to approximate the equilibrium potential. The voltage shift in the anion redox plateau is a thermodynamic shift. Higher Se contents yield lower overpotentials, especially in the plateau region of the charge curve. $Li_2FeSe_2$ is a better electronic conductor than $Li_2FeS_2$.

Figure 25:
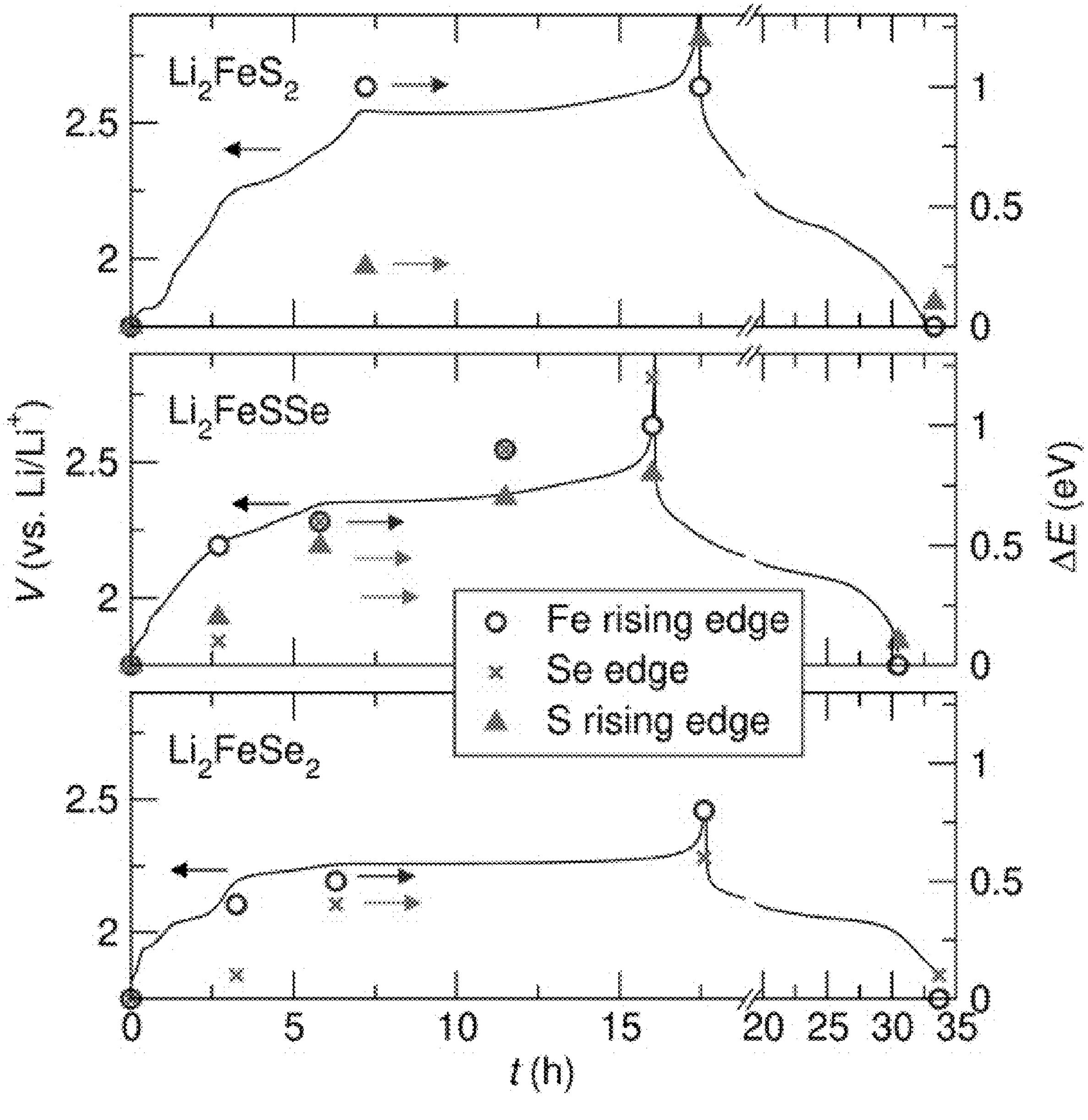
FIG. 25: Graph illustrating how the substitution of Se for S leads to greater Fe-anion covalency, yielding concomitant cation and anion oxidation throughout charge.

As shown in FIG. 25, the substitution of Se for S leads to greater Fe-anion covalency, yielding concomitant cation and anion oxidation throughout the charge cycle. S and Se both contribute to anion redox in the mixed material. The electrochemistry and spectroscopy suggest the electronic states are well mixed.

Example 4: Tuning the Electronic Structure to Increase the Voltage

Figure 26:
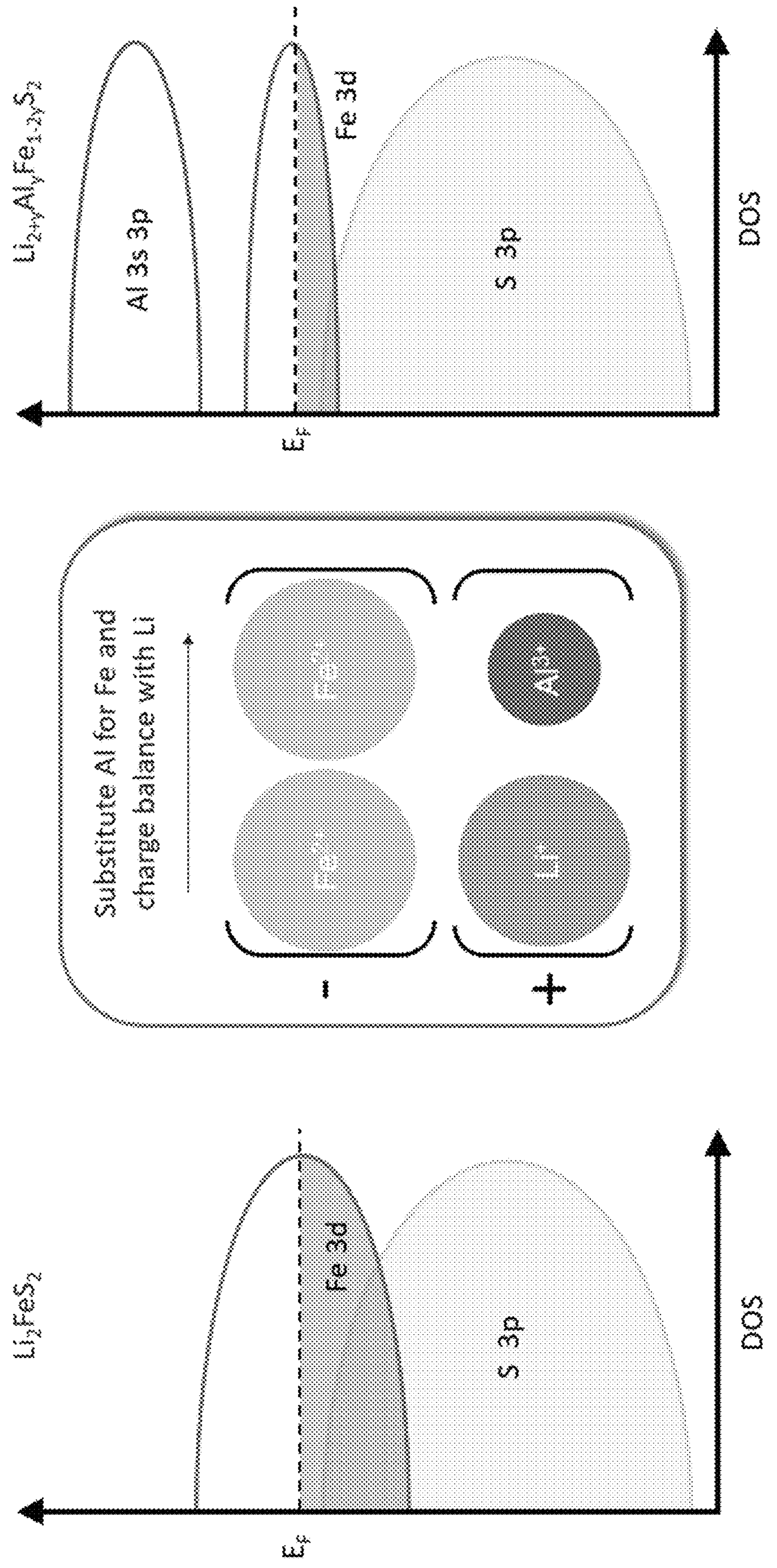
FIG. 26: Illustrations showing how the substitution of Al for Fe, charge balanced by Li, might increase the average voltage of the charge curve by shifting the charge compensation onto the anion.

As shown in FIG. 26, it is possible to increase the average voltage of the charge curve by shifting the charge compensation onto the anion.

As shown in FIGS. 3A-3C and 10, tuning the crystal chemistry tunes the charge compensation mechanism. As Fe content decreases and Al content increases, the contribution from $Fe^{2+}$ oxidation also decreases. The total capacity, though, can remain high thanks to a shift of charge compensation onto the anion.

TABLE 3

Capacity, voltage, and energy density of various cathodes.

| | capacity ($mA \cdot h \cdot g^{-1}$) | V (vs. $Li/Li^+$) | energy density ($Wh \cdot kg^{-1}$) | energy density ($Wh \cdot L^{-1}$) |
|---|---|---|---|---|
| NMC811 | 250 | 3.8 | 950 | 4500 |
| $LiFePO_4$ | 158 | 3.4 | 578 | 2068 |
| $Li_2FeS_2$ | 347 | 2.4 | 782 | 2231 |
| y = 0.2 | 449 | 2.5 | 1119 | 2618 |

Figure 27:
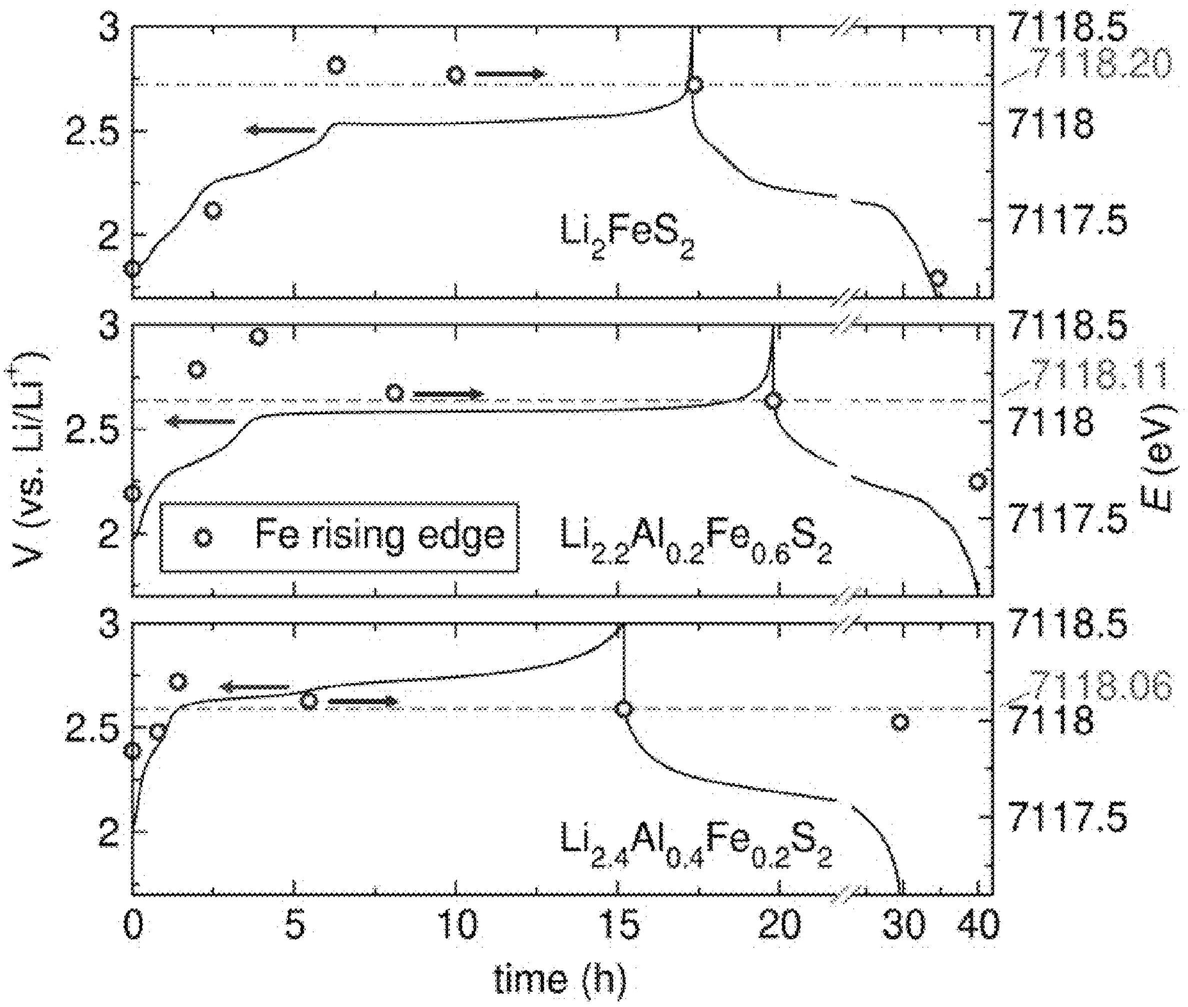
FIG. 27: Graph showing how as the materials are electrochemically oxidized, $Fe^{2+}$ is over-oxidized.

Referring now to FIG. 27, Al-containing materials seem to stabilize $Fe^{3+}$. As the materials are electrochemically oxidized, $Fe^{2+}$ is "over-oxidized" due to kinetic overpotentials for anion oxidation. The electrochemical product is a kinetic product. "$Fe^{3+}$" is reduced by $S^{2-}$ in a chemical electron transfer.

Example 5: The $LiTiS_2/Li_2TiS_3$ Family as a Model System

Figure 28A:
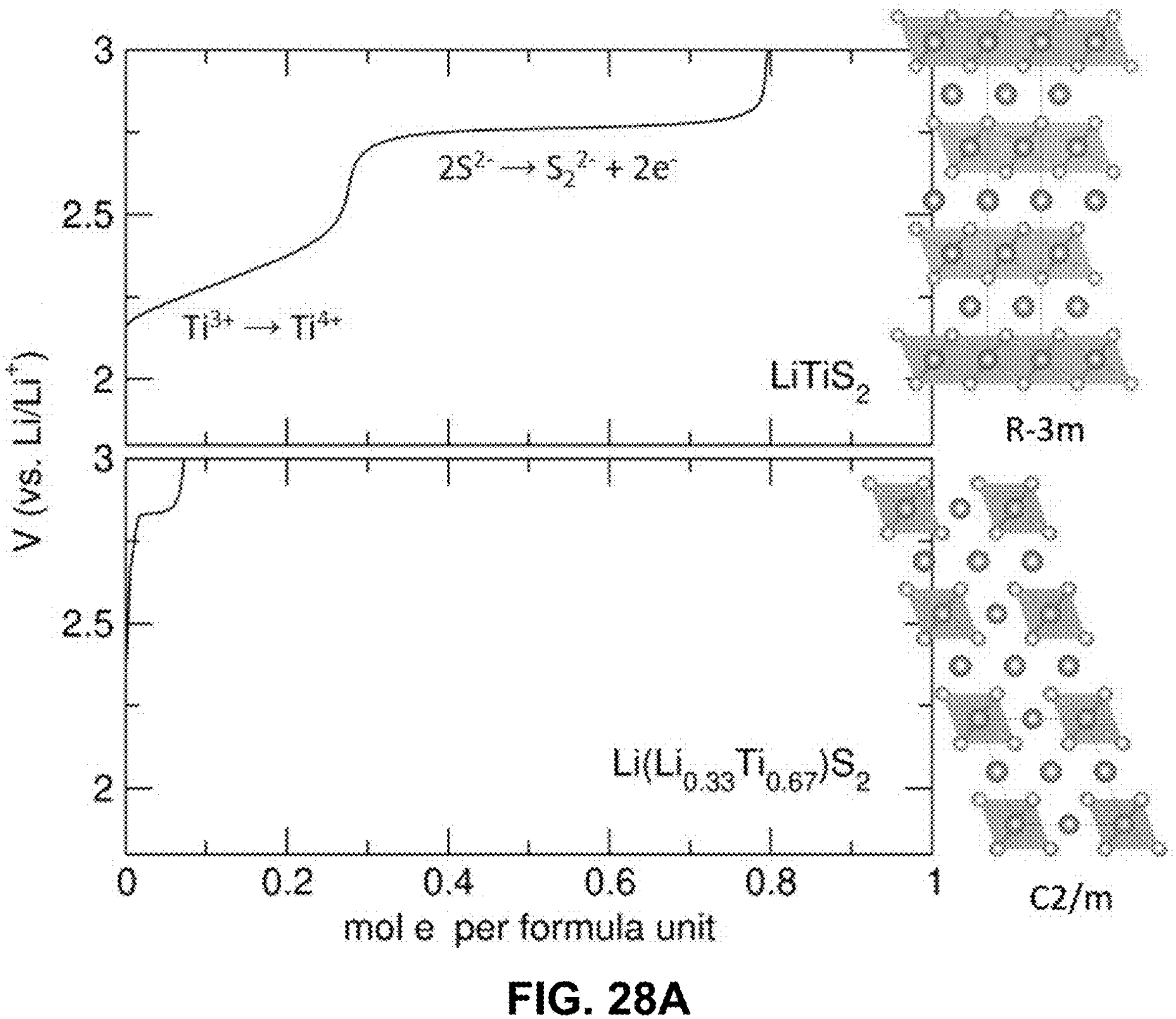
FIGS. 28A-28B: Graph and illustration showing changes in the charge curve of $LiTiS_2$ as compared to $Li_2TiS_3$ ($Li(Li_{0.33}Ti_{0.67})S_2$).
Figure 28B:
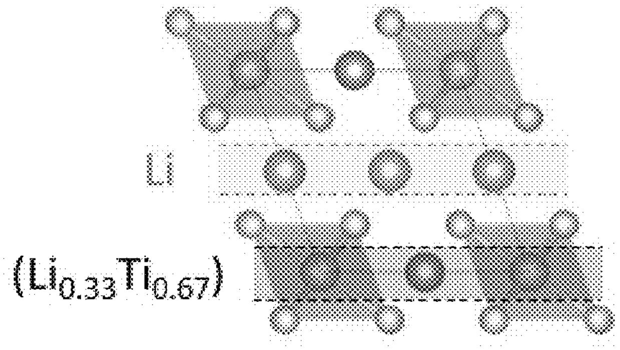

As shown in FIGS. 28A-28B, $LiTiS_2$ shows significant capacity on the first oxidation due to both Ti and S redox. Substituting Li for Ti results in a material with negligible capacity due to the inactive $Ti^{4+}$ and the lack of vacancies.

Figure 29:
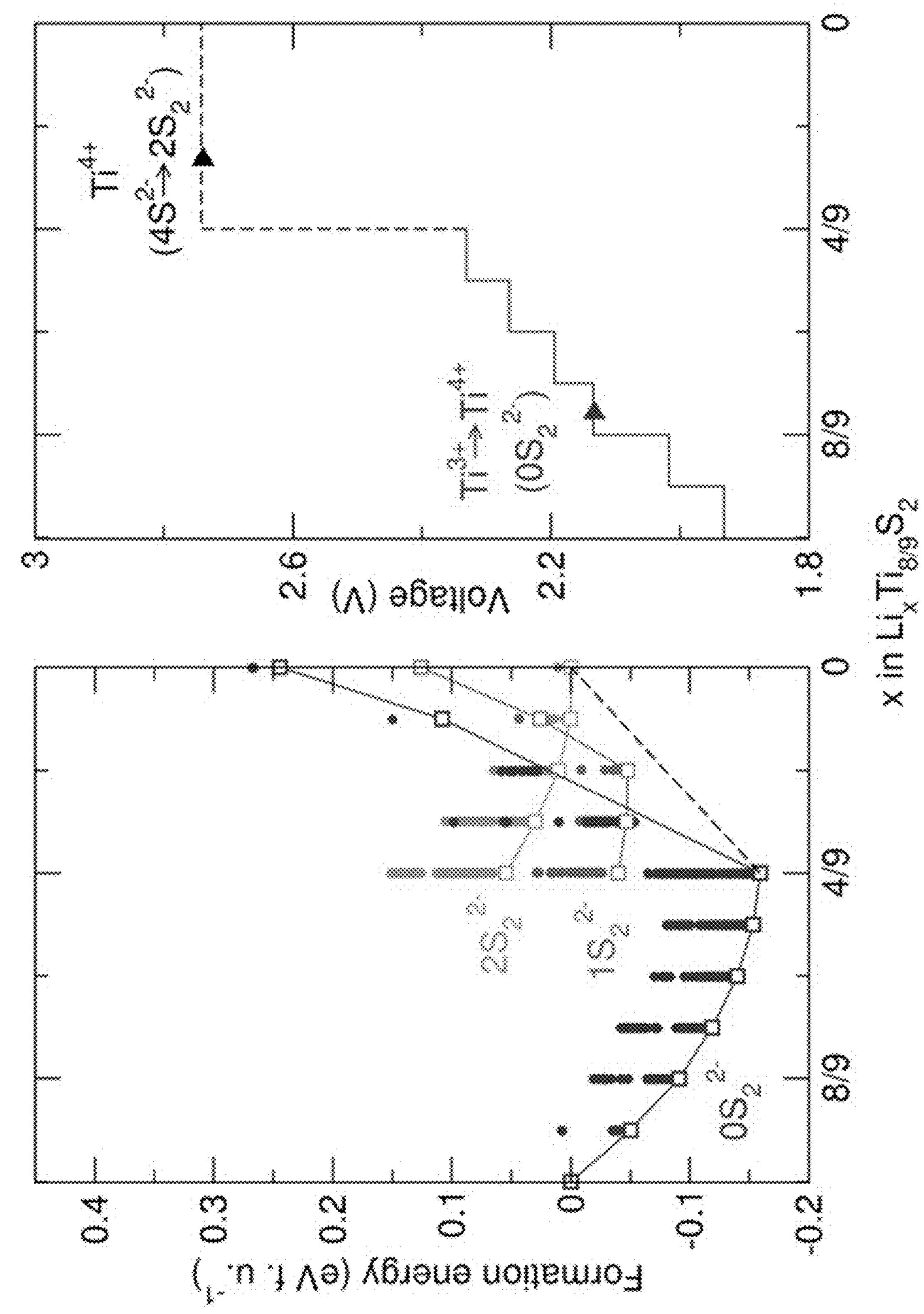
FIG. 29: Graphs showing the preferential formation of S—S bonds adjacent to vacancies as $LiTi_{8/9}S_2$ is reduced.

Referring now to FIG. 29, DFT calculations show that S—S bonds form around vacancies. Using $LiTi_{8/9}S_2$ as a case study, we observe that S—S bonds form preferentially adjacent to vacancies.

Figure 30A:
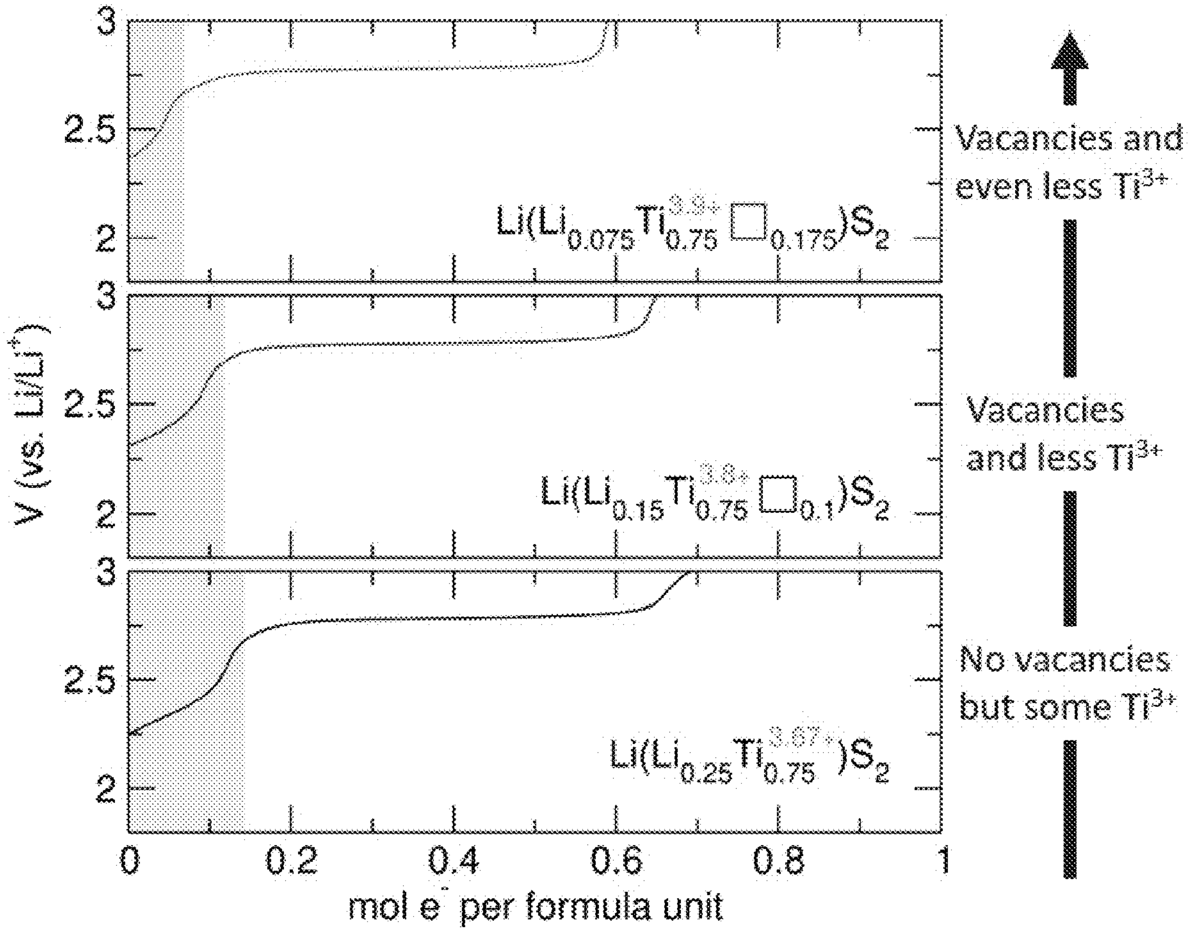
FIGS. 30A-30B: Graphs showing the changes in the formal oxidation state of Ti as the formation reaction is starved of $Li^+$.
Figure 30B:
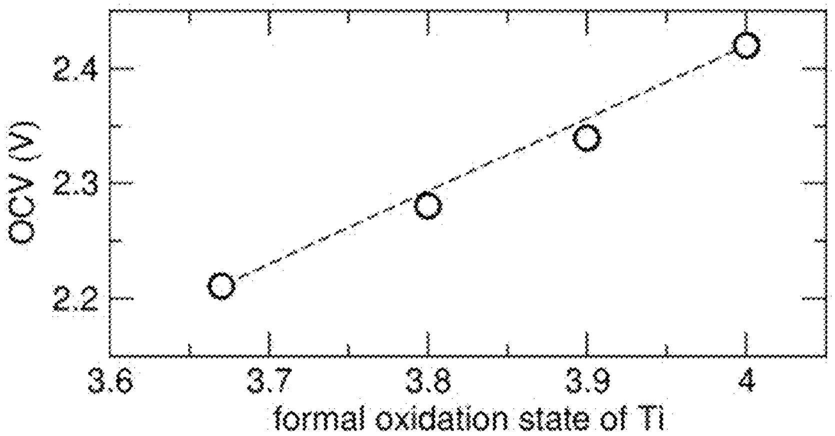

Referring now to FIGS. 30A-30B, controlling the $Li^+$ stoichiometry during synthesis can be used to introduce vacancies and control the Ti formal oxidation state. Starving the reaction of $Li^+$ during synthesis results in a high formal oxidation state of Ti, i.e. more $Ti^{4+}$ vs. $Ti^{3+}$. The characteristic sloping region in the beginning of charge grows in time with more $Ti^{3+}$.

Figure 31:
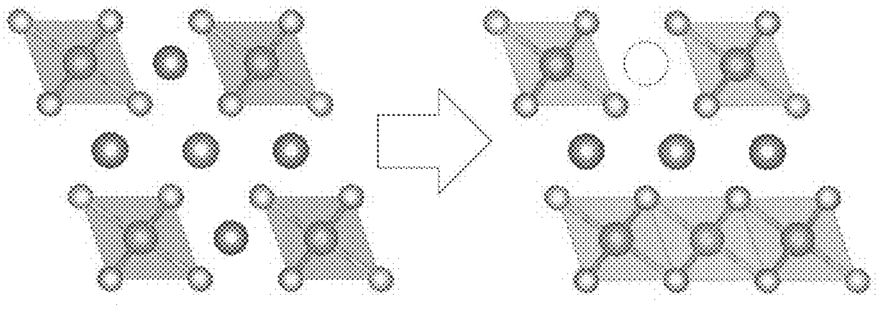
FIG. 31: Illustration showing how the substitution of Ti for Li allows for the introduction of vacancies while maintaining the formal oxidation state of Ti at $Ti^{4+}$.

Referring now to FIG. 31, substituting Ti for Li allows for introduction of vacancies while maintaining the formal oxidation state of Ti at $Ti^{4+}$:

$$Li(Li_{0.33}Ti_{0.67})S_2 \rightarrow Li(Li_{0.33-1.33z}Ti^{4+}_{0.67+0.33z}\square_z)S_2$$

Figure 32:
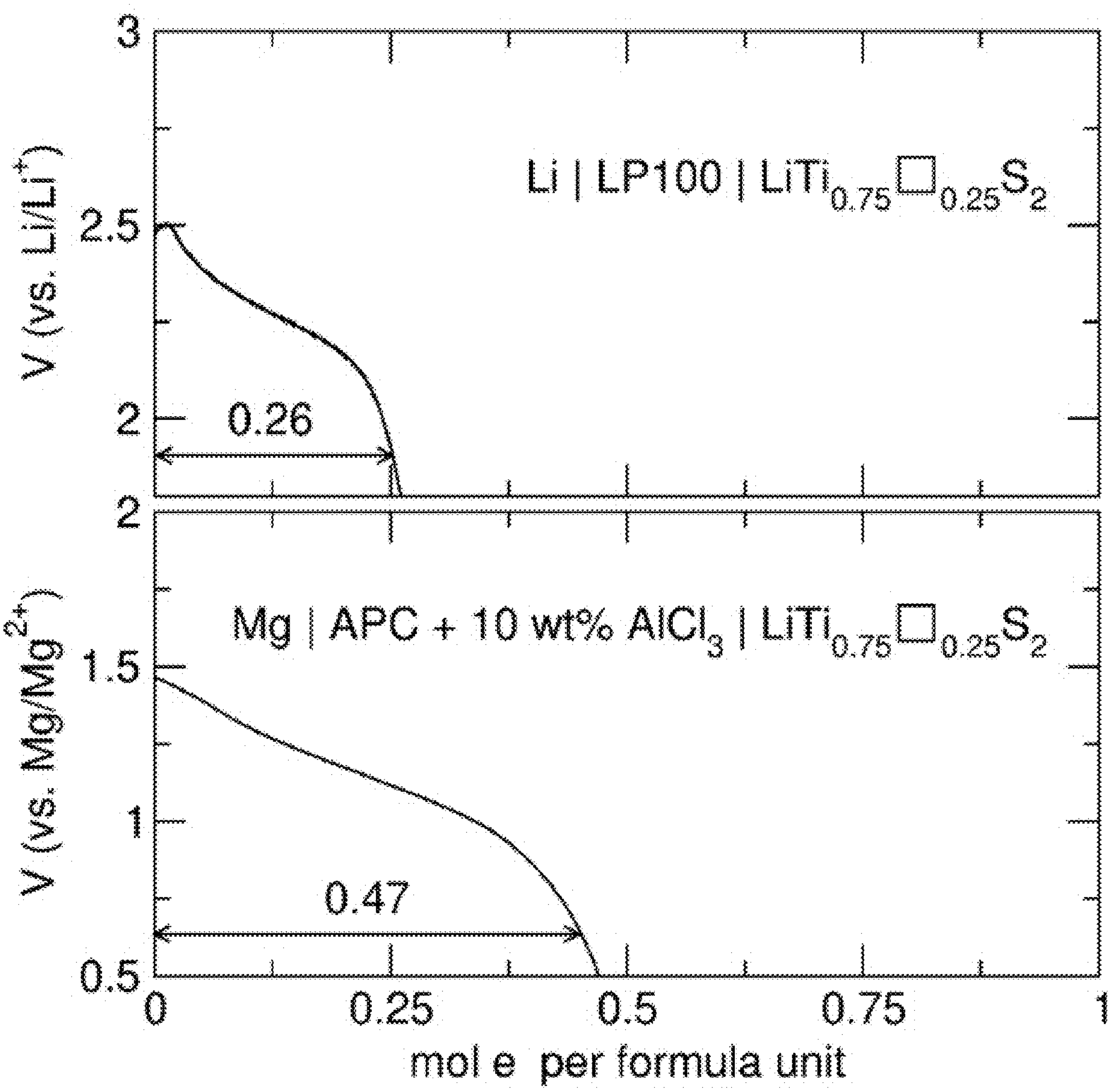
FIG. 32: Graphs from electrochemical techniques to determine if the material contains the expected vacancy content.

Referring now to FIG. 32, the presence of vacancies is confirmed by electrochemical techniques. To determine if the material contains the vacancy content we expect from the synthesis, the material is lithiated first (reduced). The capacity will be approximately equal to the vacancy concentration. When a divalent cation is intercalated, the capacity should be double the vacancy concentration. The Ti:S ratio is confirmed by electron probe microanalysis (EPMA).

Figure 33:
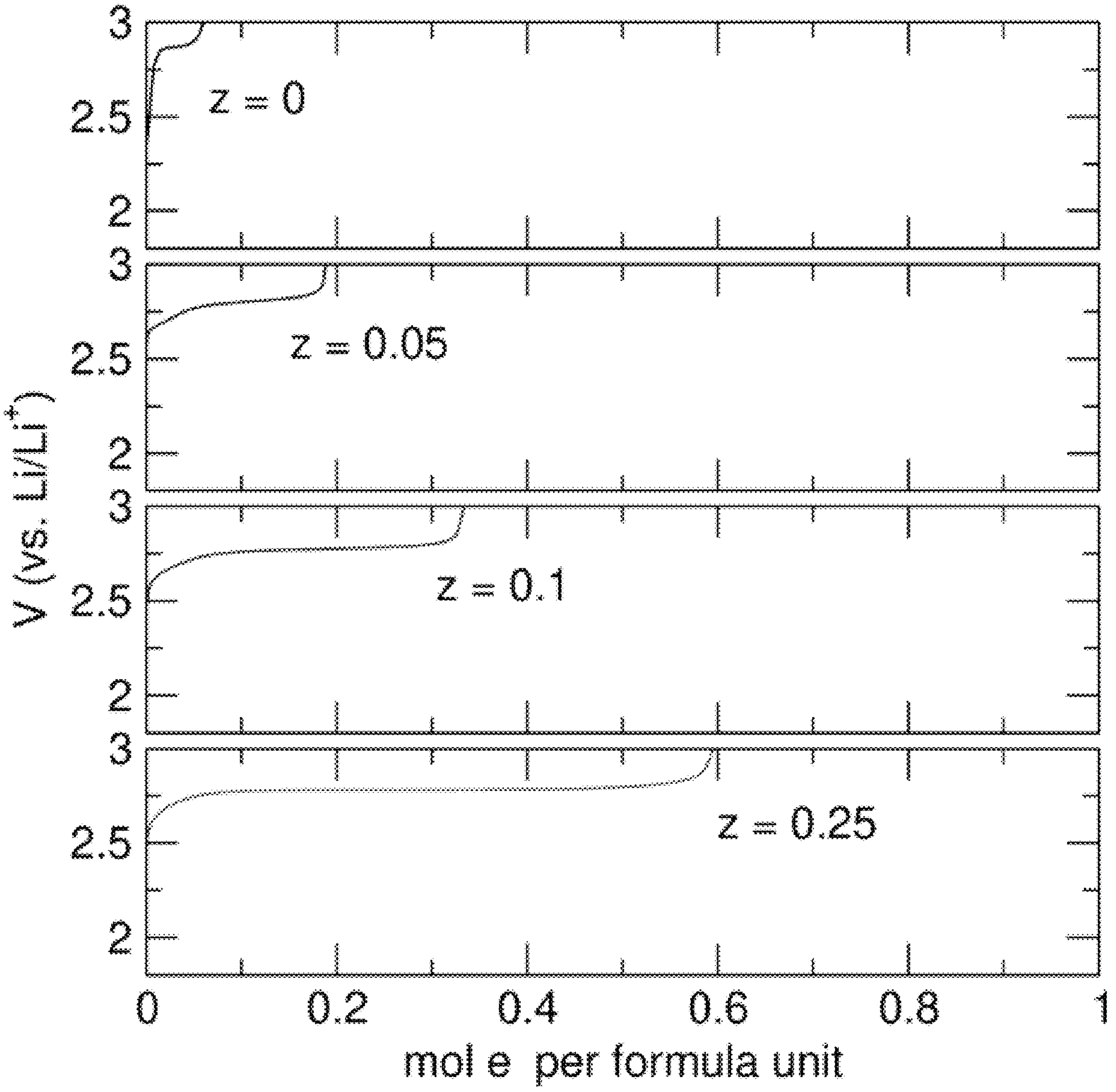
FIG. 33: Graphs showing how increasing the number of vacancies in $Li(Li_{0.33-1.33z}Ti_{0.67+0.33z}\square_z)S_2$ affects changes in cation redox.

Referring now to FIG. 33, after vacancies are introduced, the capacity is markedly increased. The introduction of vacancies "turns on" anion oxidation in the phase.

Figure 34:
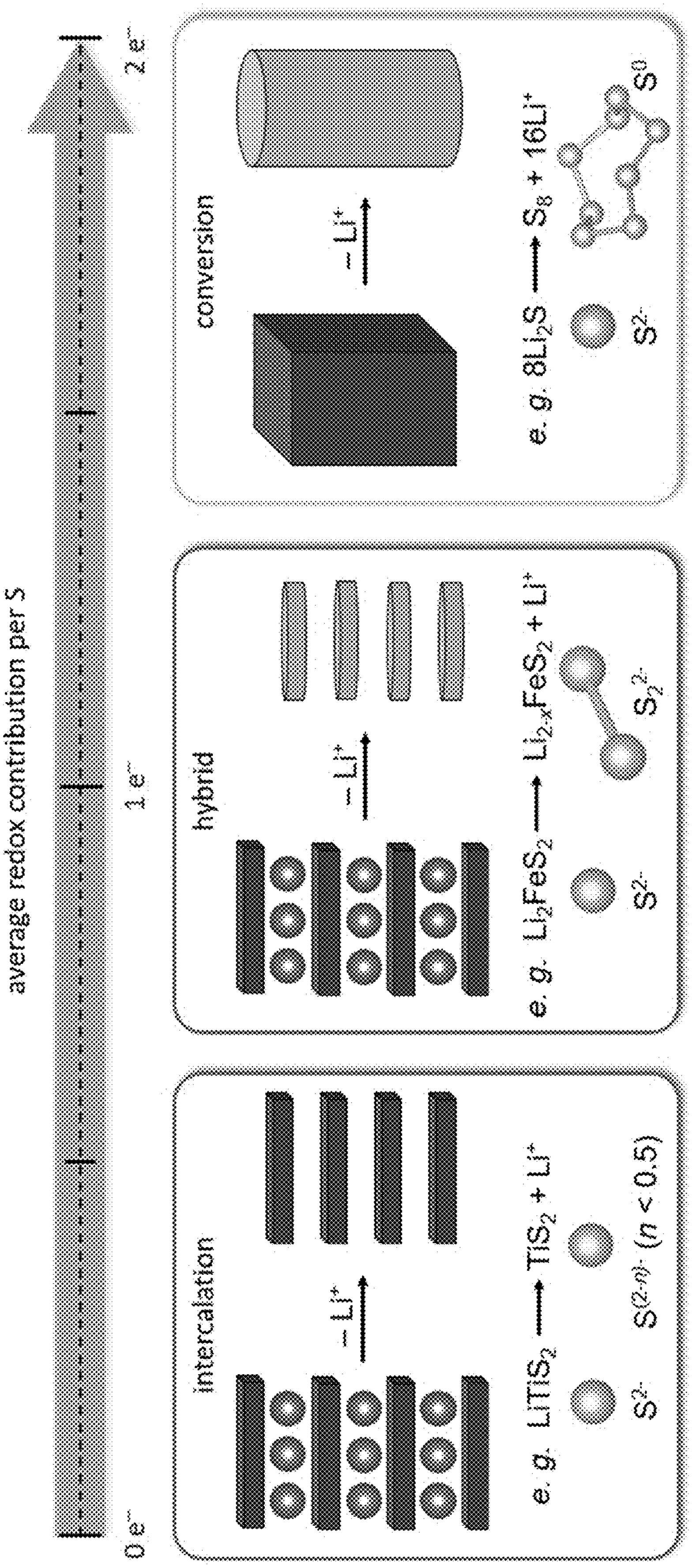
FIG. 34: Illustration showing the changes in anion redox as the average redox contribution per S atom increases.

Referring now to FIG. 34, anion redox is a sliding scale.

REFERENCES CORRESPONDING TO EXAMPLES 2-5

A. Dey, Y. Jiang, P. Ortiz de Montellano, K. O. Hodgson, B. Hedman, E. I. Solomon, *J. Am. Chem. Soc.* 2009, 131, 7869-7878

A. J. Martinolich, J. J. Zak, D. N. Agyeman-Budu, S. S. Kim, N. H. Bashian, A. Irshad, S. R. Narayan, B. C. Melot, J. Nelson Weker, K. A. See, *Chem. Mater.* 2021, 33, 378-391.

$Li_2TiS_3$ reported in: Flamary-Mespoulie, F. et al. *Energy Storage Mater.* 2020, 26, 213-222.

Example 6: Lithium-Rich Aluminum Iron Sulfide Li-Ion Battery Cathodes

Li-ion cathodes are the highest cost, least energy dense, and short lived component of a Li-ion battery. Current cathodes invoke transition metal redox for energy storage. However, cobalt and nickel pose severe scalability limits on current Li-ion cathodes. There is little room for improvement in the energy density of current cathodes.

Referring now to FIG. 2A-2D, the structural similarity of $Li_5AlS_4$ and $Li_2FeS_2$ enables co-substitution. Despite different symmetry, the monoclinic unit cell volume across the $Li_2FeS_2$—$Li_5AlS_4$ pseudo-solid-solution is a linear function of y.

Co-substitution at y=0.2 enables extra S redox capacity. Capacity from $Fe^{2+/3+}$ redox is a linear function of y. Despite less 40% less Fe than y=0, y=0.2 has greater multi-e– capacity; 80% of the S in y=0.2 oxidized compared to 54% in y=0.

Fe K-edge X-ray absorption spectroscopy (XAS) tracks the Fe oxidation state. Fe K-edge XAS excites the core Fe 1s electrons. The energy at which absorption is observed is called the "rising edge." A lower energy indicates a more shielded 1s electron. A higher energy indicates a less shielded 1s electron.

Figures 6A, 6B:
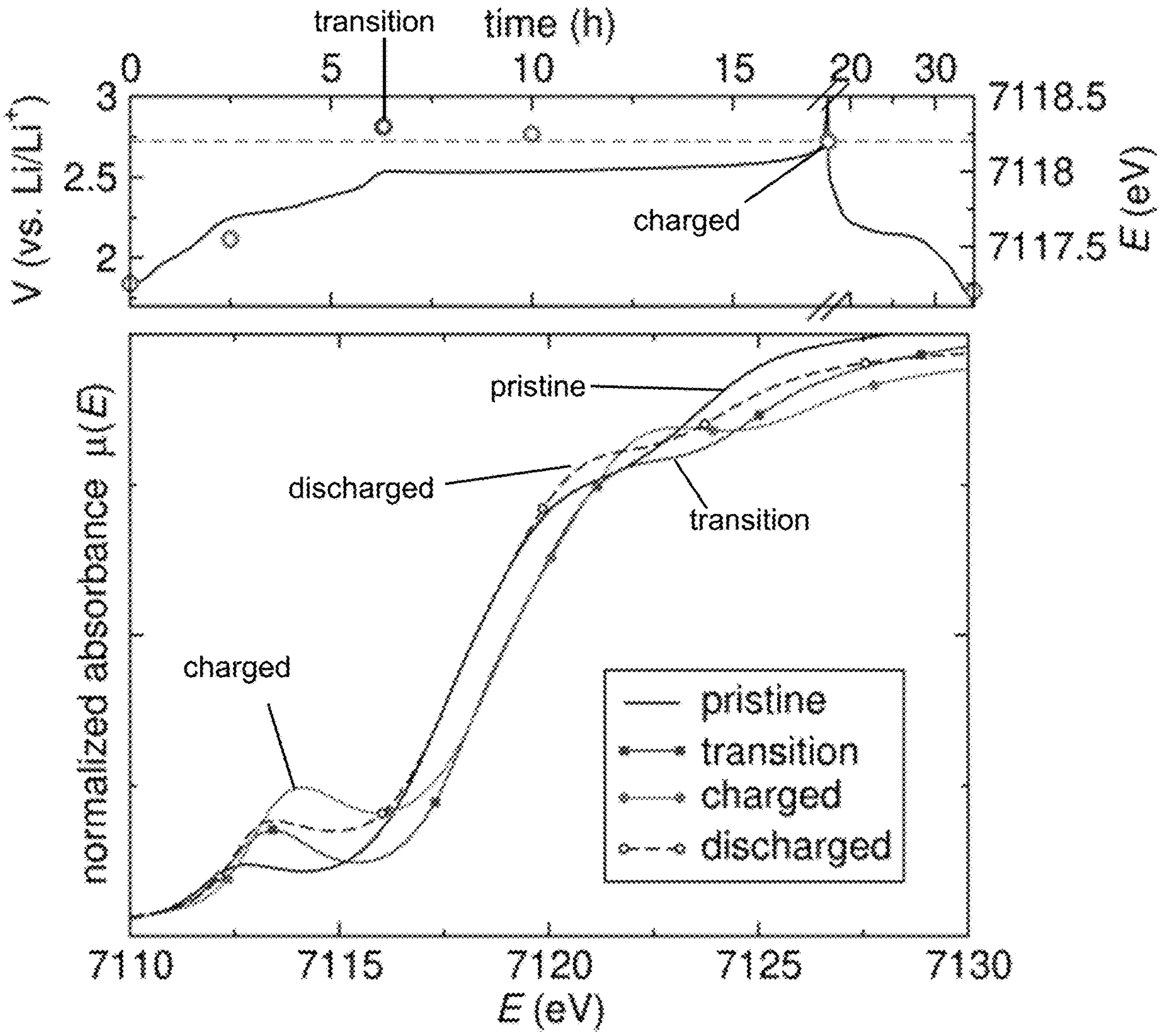
FIG. 6A: y=0 galvanostatic cycling with the extracted Fe K-edge position overlayed and (FIG. 6B) y=0 XANES spectra at various SOCs.
Figures 7A, 7B:
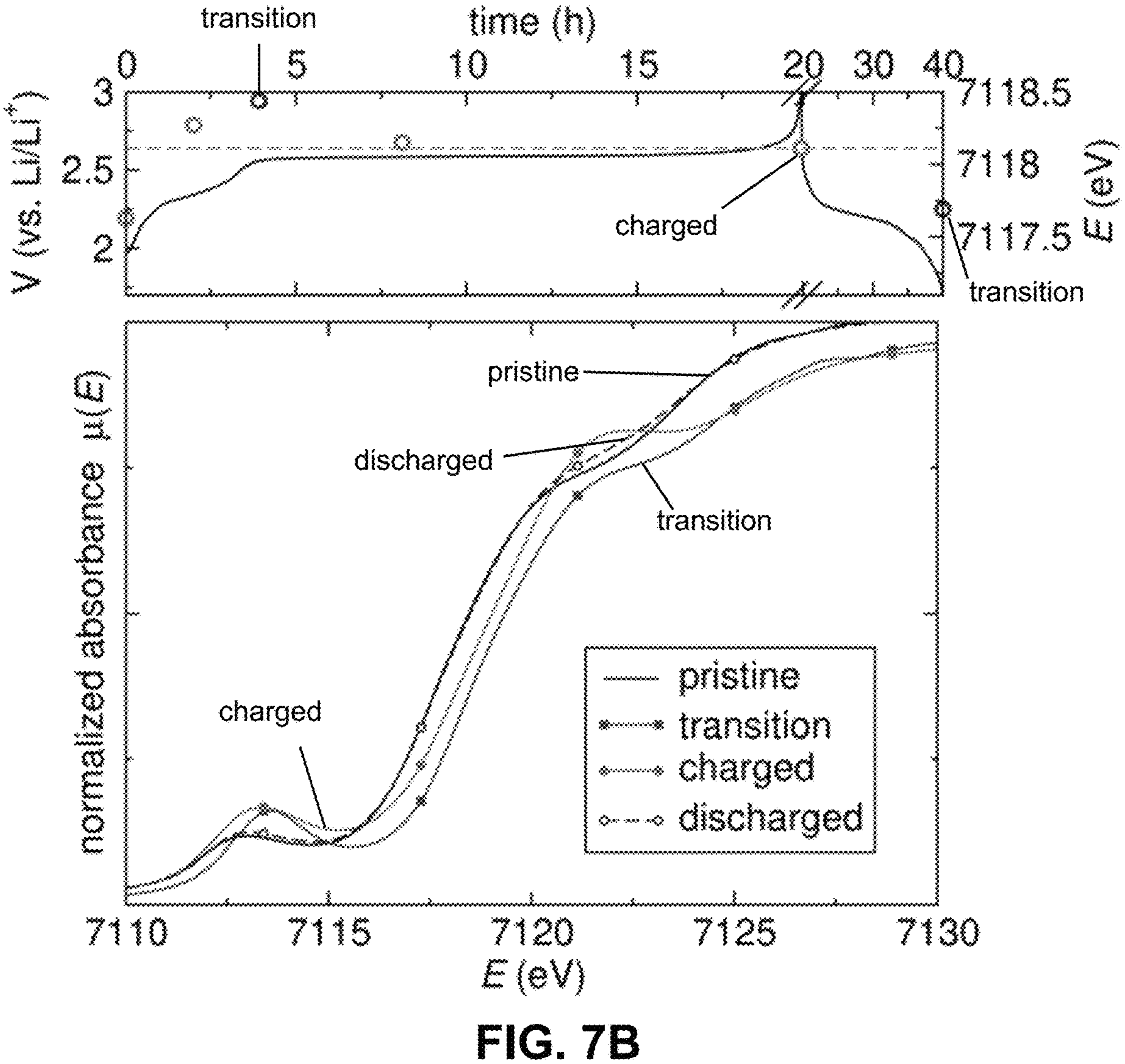
FIG. 7A: y=0.2 galvanostatic cycling with the extracted Fe K-edge position overlayed and (FIG. 7B) y=0.2 XANES spectra at various SOCs.

Referring now to FIGS. 6A-6B, Fe K-edge XAS of $Li_2FeS_2$ suggests Fe and S redox are distinct events. Ex-situ Fe K-edge XAS of $Li_2FeS_2$ shows that $Fe^{2+/3+}$ redox is active until the transition, and inactive in the $2S^{2-}/(S_2)^{2-}$ plateau.

Referring now to FIGS. 6A-6B and 7A-7B, Fe K-edge XAS of $Li_{2.2}Al_{0.2}Fe_{0.6}S_2$ suggests that Fe is non-innocent in S redox. We therefore hypothesize that extra S redox is mediated by electron transfer from $S^{2-}$ to $Fe^{3+}$.

High energy X-rays elucidate Fe local structure. Photoelectron scattering occurs from high energy X-rays above the Fe K-edge. The interference pattern of scattering can be fit to the local structure of Fe, via extended X-ray absorption fine structure analysis (EXAFS).

Figure 35:
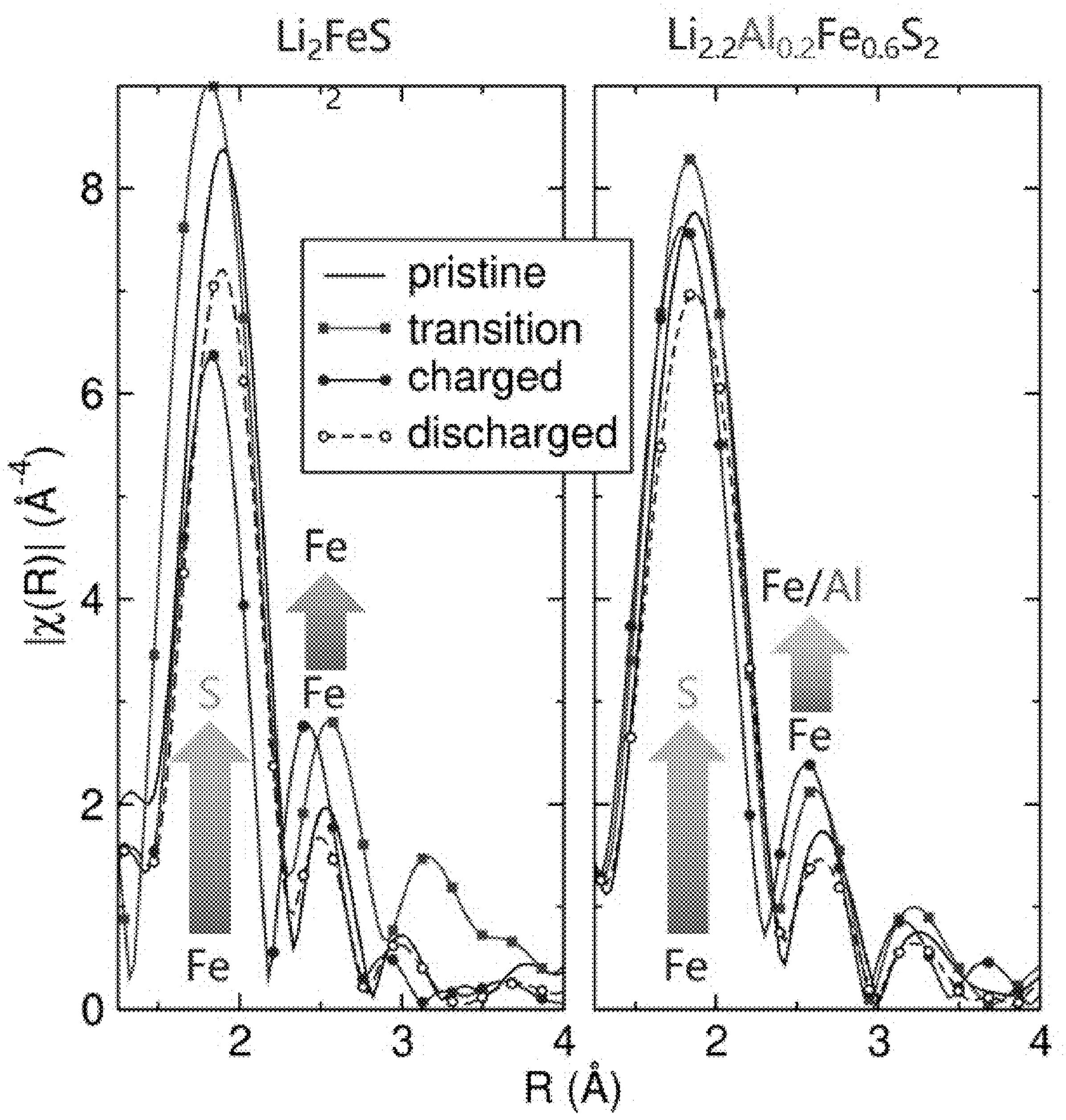
FIG. 35: Graphs obtained using extended X-ray absorption fine structure (EXAFS) illustrating that the local structure of $Li_{2.2}Al_{0.2}Fe_{0.6}S_2$ changes less than in $Li_2FeS_2$, despite far more $2S^{2-}/(S_2)^{2-}$ redox in $Li_{2.2}Al_{0.2}Fe_{0.6}S_2$.

Referring now to FIG. 35, Fe local structure changes less in y=0.2 than in y=0. EXAFS reveals that $e^-$ in y=0.2 the local structure changes less than in y=0, despite far more $2S^{2-}/(S_2)^{2-}$ redox in y=0.2.

Figure 36:
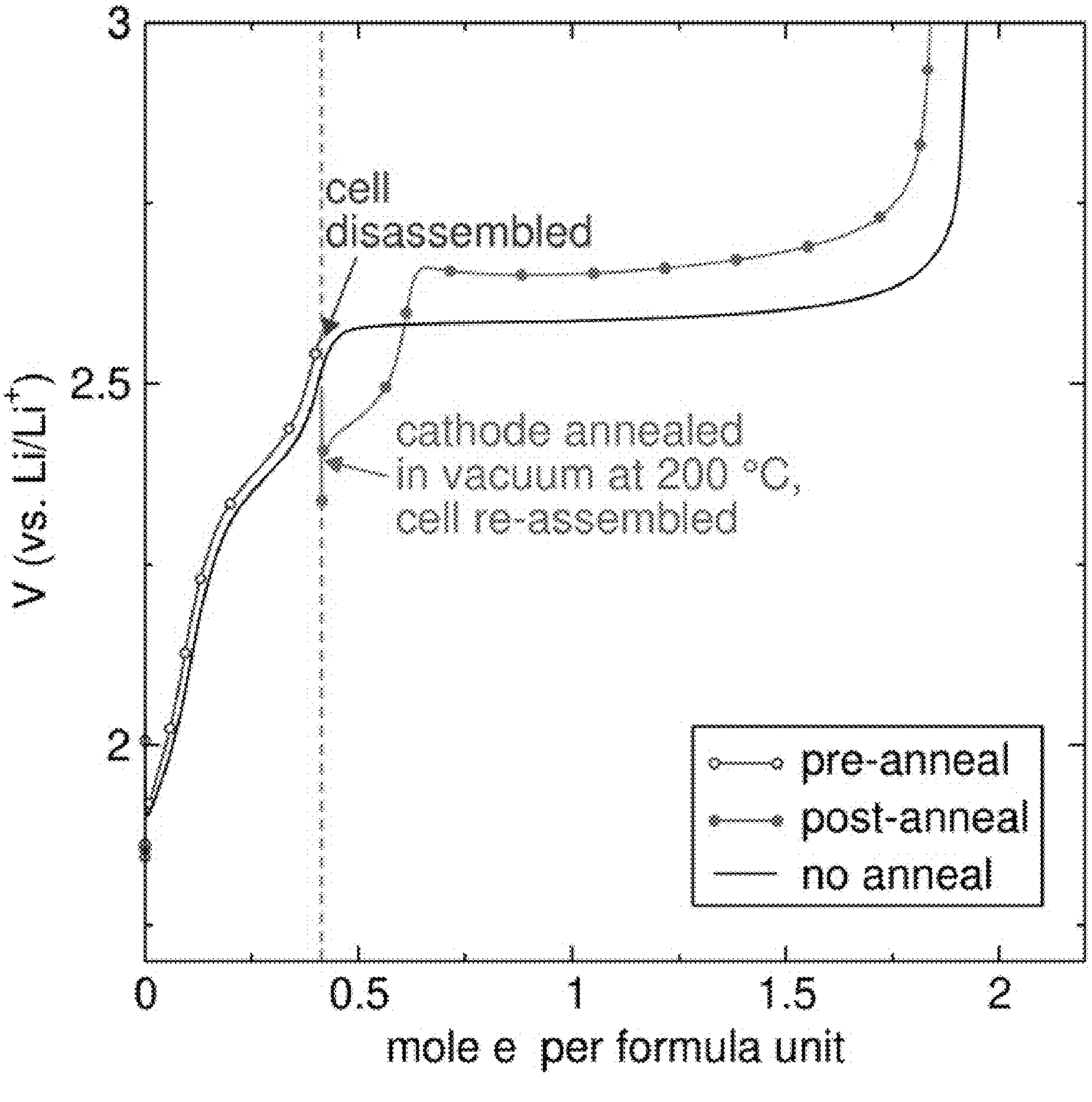
FIG. 36: Graph showing that annealing of $Li_{2.2}Al_{0.2}Fe_{0.6}S_2$ supports the electron transfer hypothesis.

Referring now to FIG. 36, annealing (i.e., thermodynamic) y=0.2 supports $e^-$ transfer hypothesis.

In summary, internal electron density redistributes to mediate multielectron redox. We observe Fe reduction during excess S oxidation in $Li_{2.2}Al_{0.2}Fe_{0.6}S_2$, suggesting multielectron redox is stabilized by internal $e^-$ redistribution.

Figure 41:
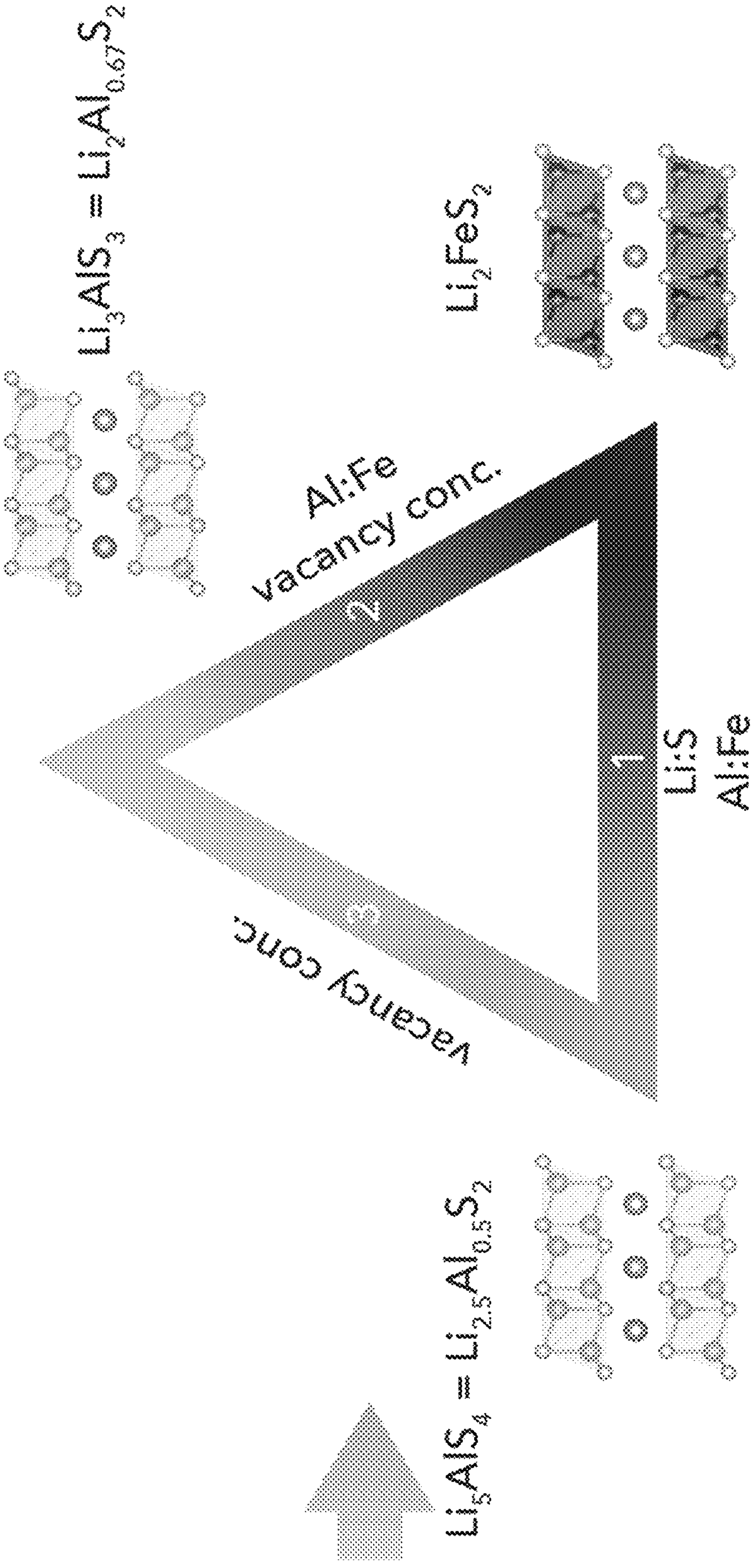
FIG. 41: An illustration of aliovalent substitution of 3 $Fe^{2+}$ for 2 $Al^{3+}$ and 1 vacancy as $Li_2Al_xFe_{1-1.5x}Q_{0.5x}S_2$ where $0<x<2/3$ and Q represents vacancies.

Example 7: Aliovalent Substitution of 3 $Fe^{2+}$ for 2 $Al^{3+}$ and 1 Vacancy as $Li_2Al_xFe_{1-1.5x}Q_{0.5x}S_2$ Referring now to FIG. 41, the work in Example 1 corresponds to side "1" of the triangle, i.e., the materials developed from the linear combination of $Li_2FeS_2$ and $Li_5AlS_4$. The additional data provided in this Example is of the preliminary exploration of side "2" of the triangle, i.e., the materials developed from the linear combination of $Li_2FeS_2$ and $Li_2Al_{2/3}Q_{1/3}S_2$ (i.e., $Li_3AlS_3$). The latter linear combination introduces up to ⅓ of vacancies in the crystal structure. The $Li_2Al_{2/3}Q_{1/3}S_2$ material is previously reported by Gamon et al.[10]

Figure 42:
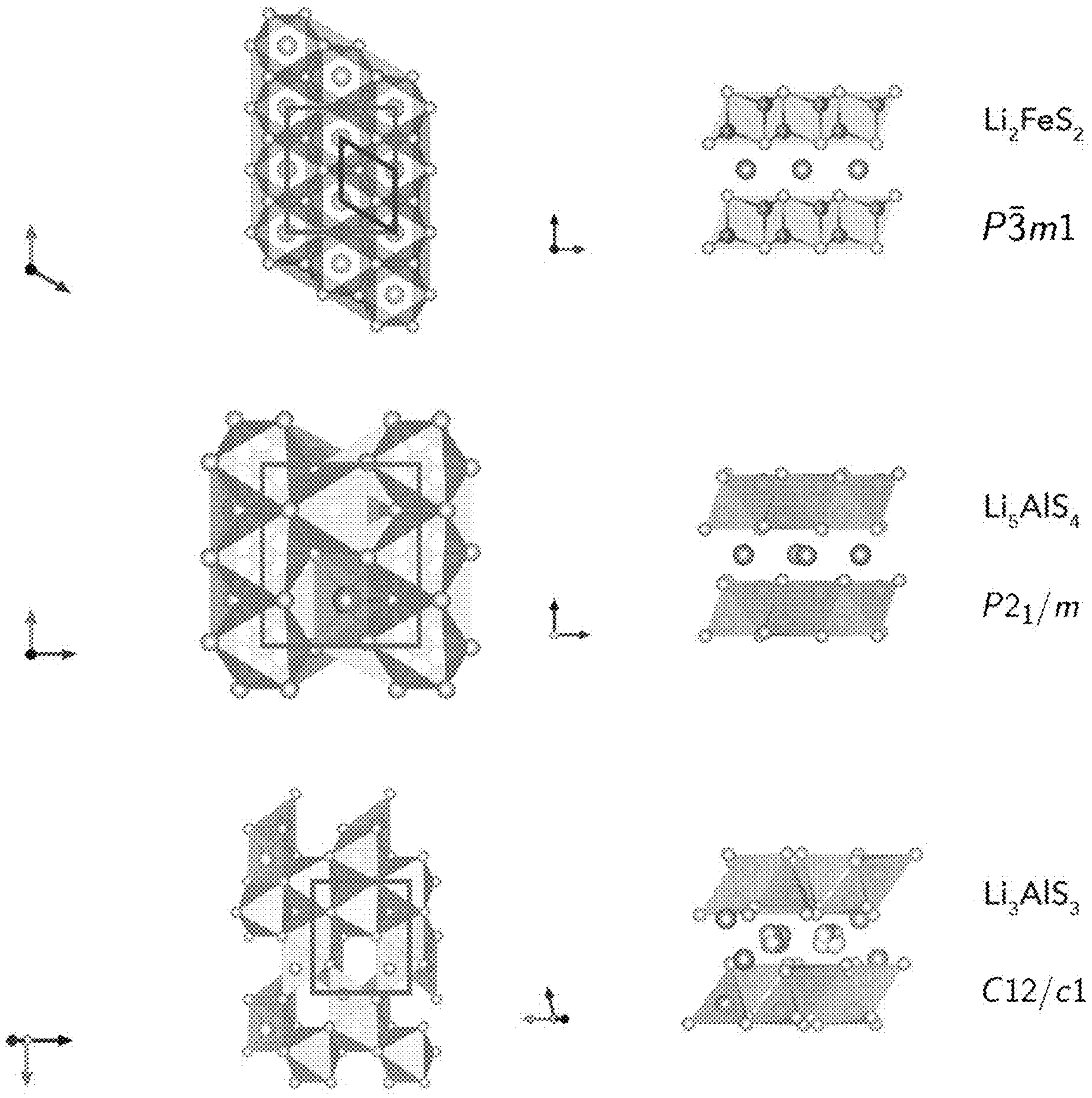
FIG. 42: Comparison of the crystal structures of all the 3 materials, $Li_2FeS_2$, $Li_5AlS_4$, and $Li_3AlS_3$.
Figure 43A:
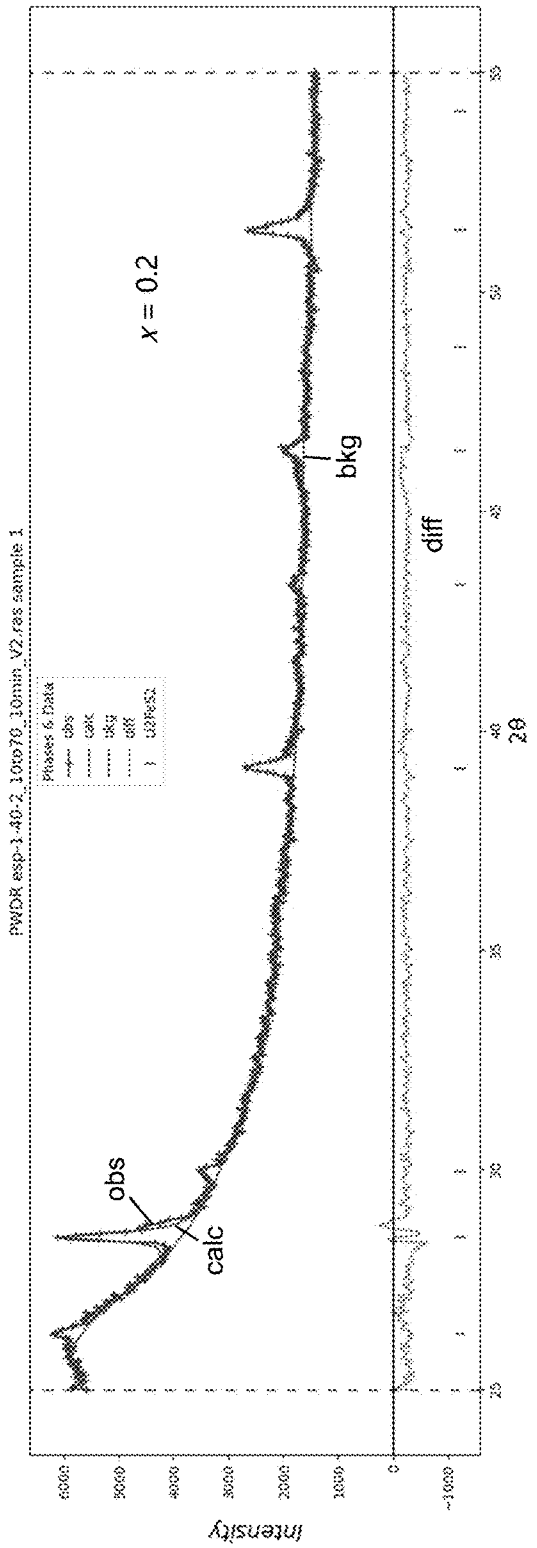
FIGS. 43A-43E: Graphs showing diffraction patterns, Rietveld refinements for (FIG. 43A) x=0.2, (FIG. 43B) x=0.33, (FIG. 43C) x=0.53, (FIG. 43D) x=0.6, and (FIG. 43E) x=0.67.
Figure 43B:
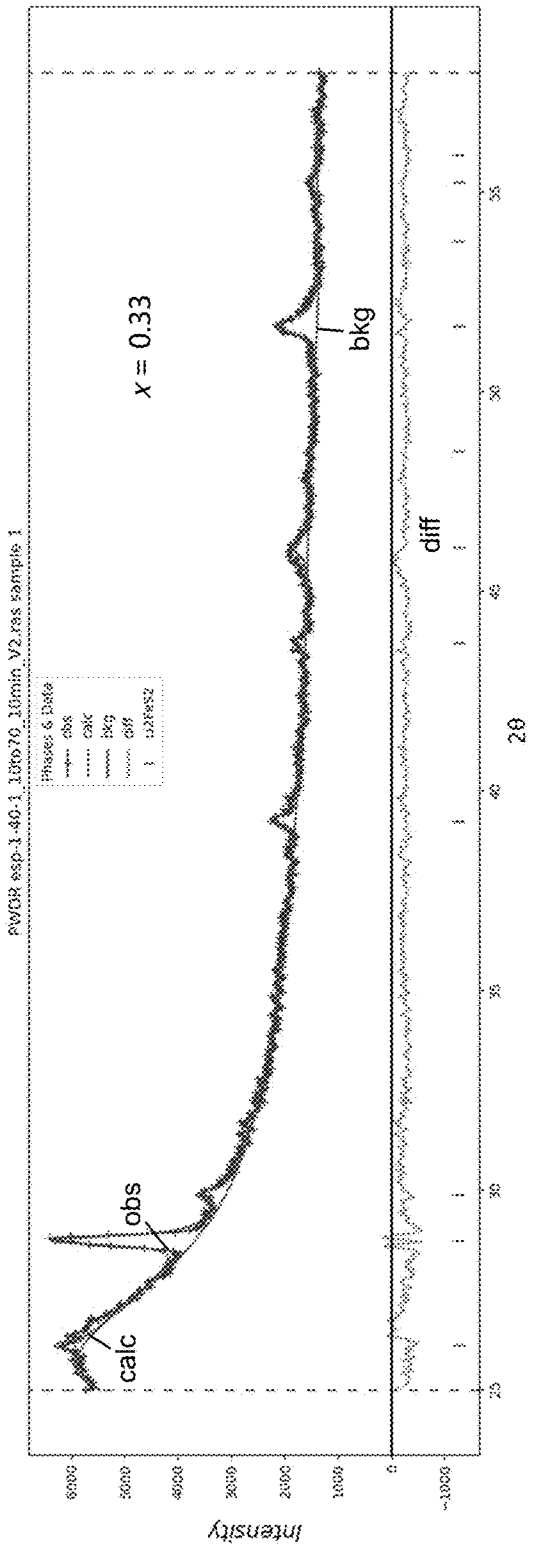
Figure 43C:
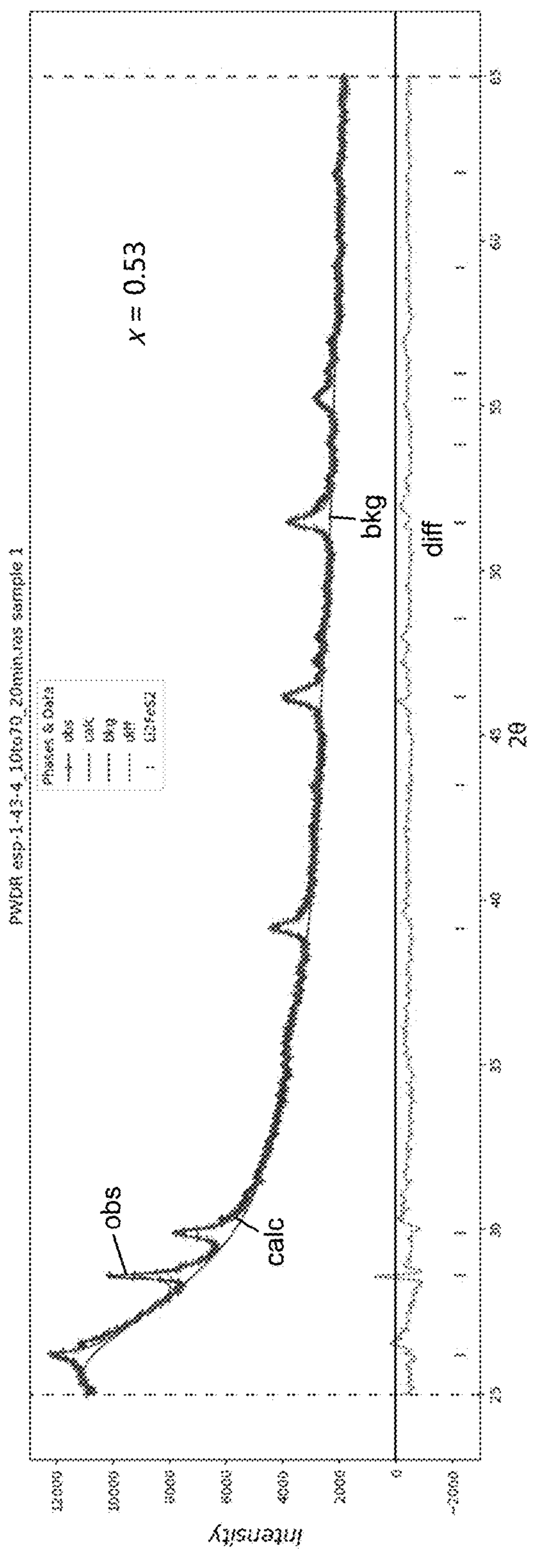
Figure 43D:
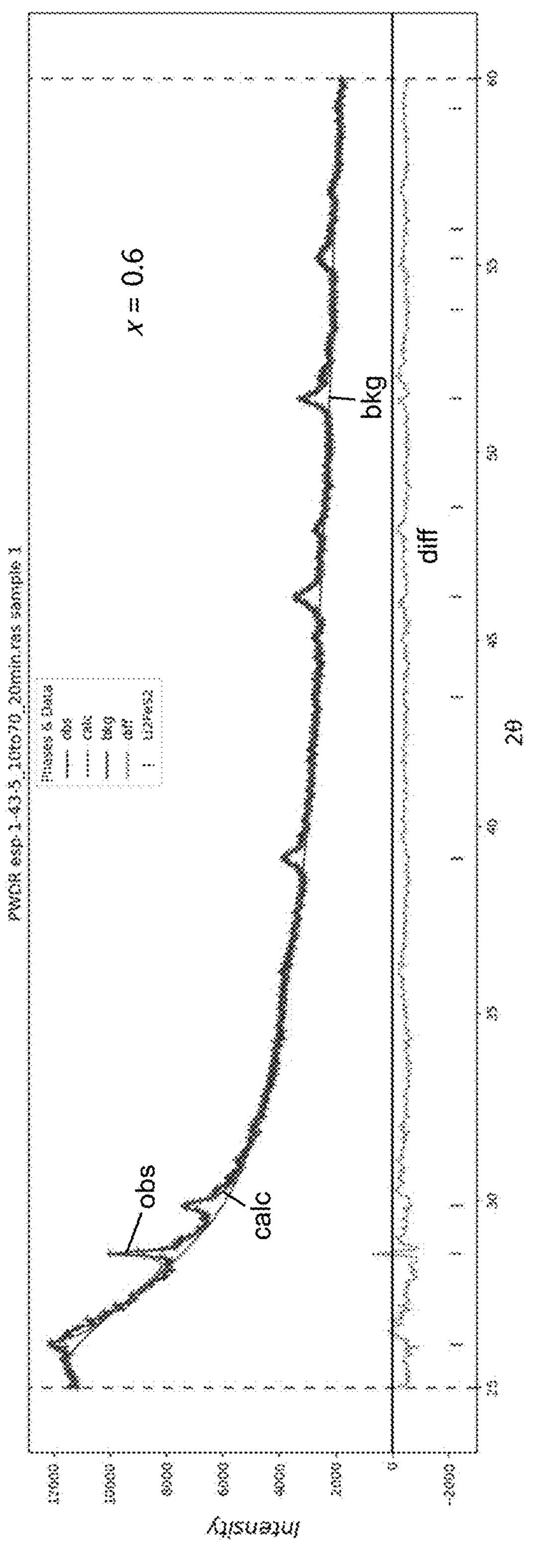
Figure 43E:
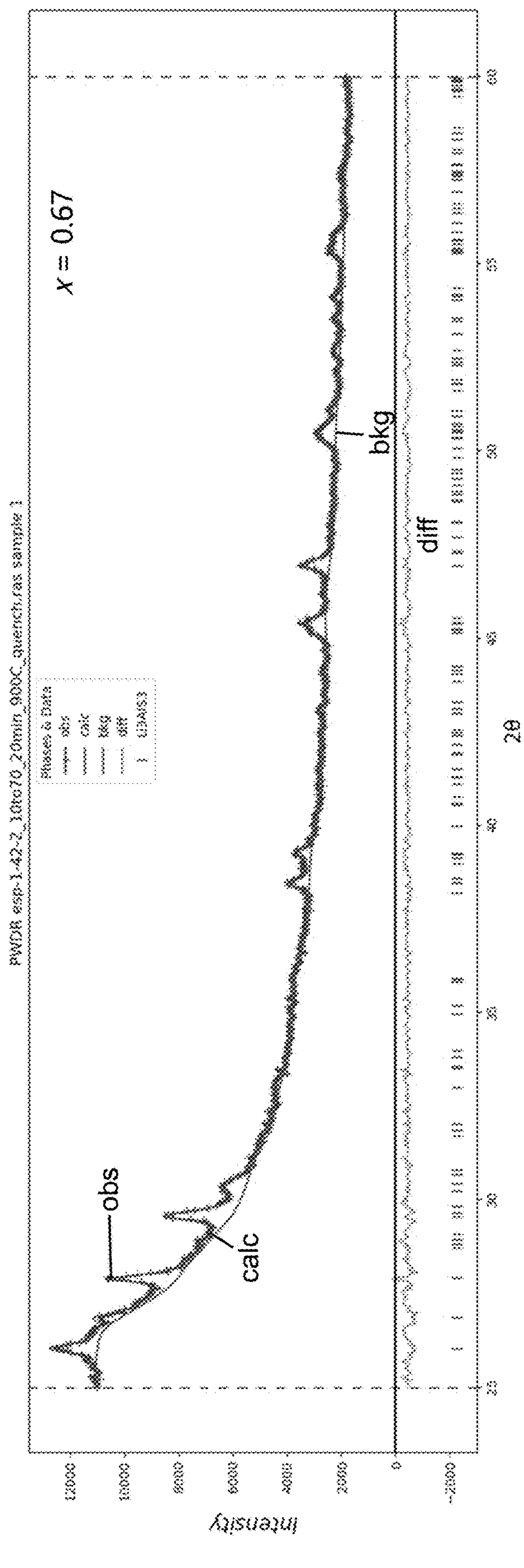

Referring now to FIG. 42, $Li_2FeS_2$, $Li_5AlS_4$ and $Li_3AlS_3$ consist of alternating layers of (mostly) tetrahedral and octahedral coordination of cations. In $Li_5AlS_4$ and $Li_3AlS_3$ the tetrahedral Al sites are ordered compared to the mixed occupancy of the tetrahedral sites by Li and Fe in $Li_2FeS_2$. This distorts the anion sublattice breaking the symmetry of the $P\bar{3}m1$ space group of $Li_2FeS_2$. The structures can be compared via a pseudo-unit cell in the lower symmetry $P2_1/m$ space group in $Li_2FeS_2$ and $Li_3AlS_3$ (drawn on each of the 3 crystal structures in blue).

The $Li_2Al_xFe_{1-1.5x}S_2$ alloys were synthesized at 900° C. for x=0.2, 0.33, 0.53, 0.6, and 0.67. The $Li_2FeS_2$ and $Li_3AlS_3$ end members annealed at 900° C. for 16 hours. The x=0.67 end member quenched at 900° C. could not be refined to the $P\bar{3}m1$ space group, whereas all other alloys could. FIGS. 43A-43E show the diffraction patterns and Rietveld refinements for the alloys. Other experimental details of the synthesis conditions, i.e., how precursors were handled, how reactants were heated, etc., are the same as those described in Example 1.

Figure 44:
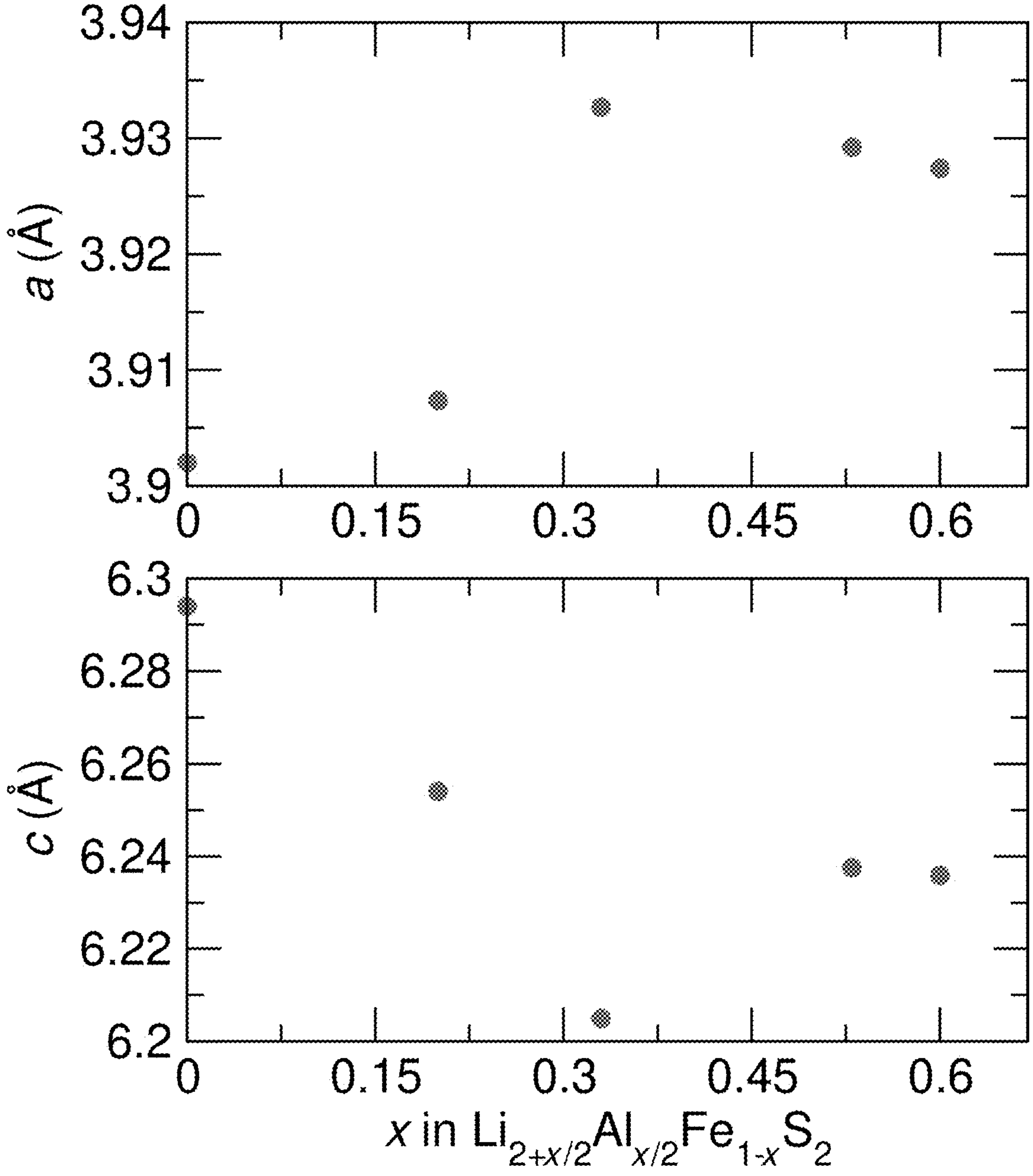
FIG. 44: Lattice parameter trends from the $Li_2Al_xFe_{1-1.5x}Q_{0.5x}S_2$ materials synthesized at values of x=0, 0.2, 0.33, 0.53, and 0.6 as refined to the $P\bar{3}m1$ space group.

Referring now to FIG. 44, the lattice parameters for the alloys shift systematically in response to attempted substitution (the trend suggests for x=0.33 compound should be re-annealed). The $Li_3AlS_3$ end member could not be refined to the $P\bar{3}m1$ space group. Thus, an expected linear trend between the end members cannot be determined. The PXRD patterns of the x=0.63 (Fe content=0.05) and x=0.653 (Fe content=0.02) are yet to be taken.

Figure 45:
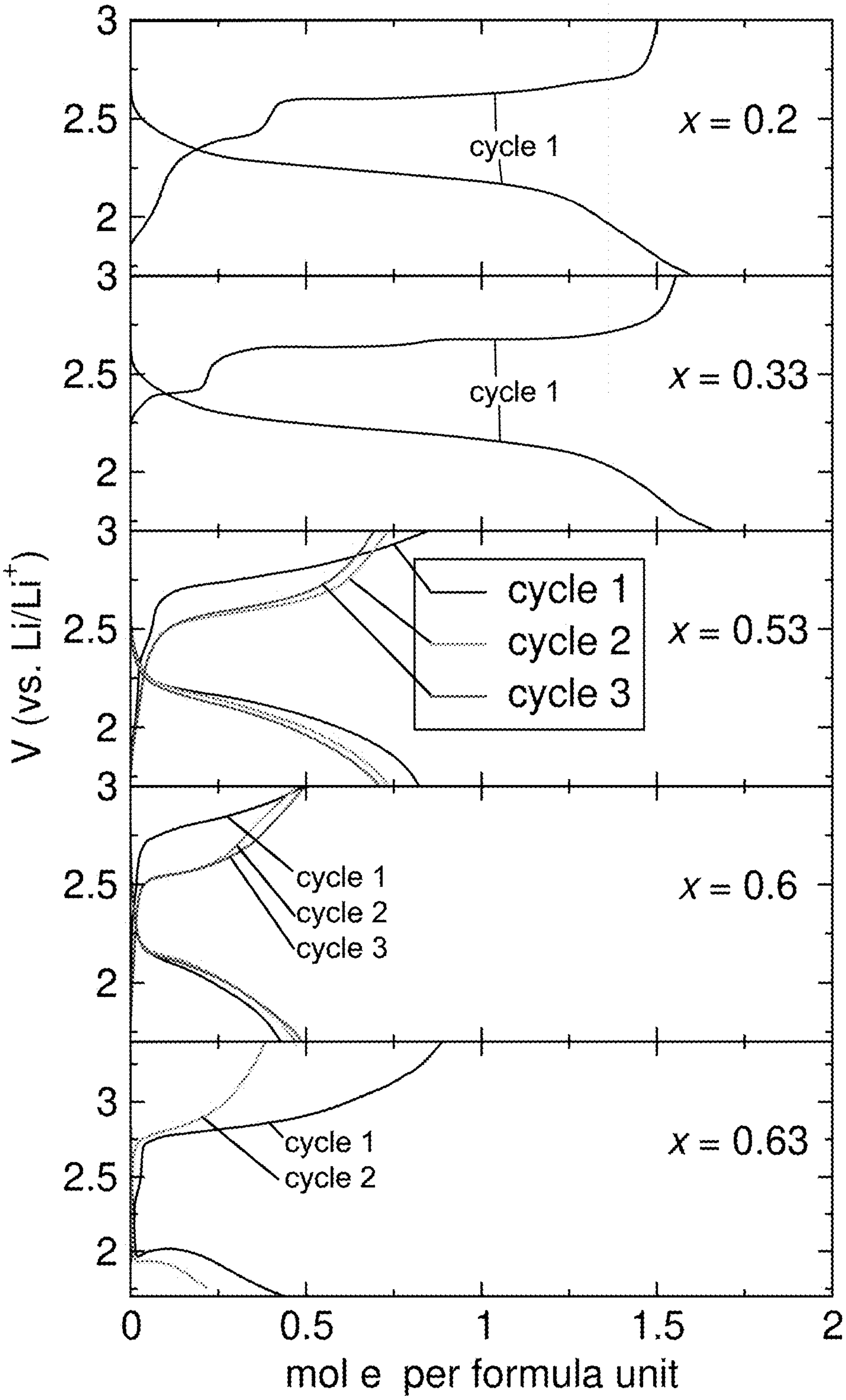
FIG. 45: Galvanostatic cycling data of the $Li_2Al_xFe_{1-1.5x}Q_{0.5x}S_2$ at various values of x.

Referring now to FIG. 45, the data demonstrates that the $Li_2Al_xFe_{1-1.5x}Q_{0.5x}S_2$ materials are electrochemically active. The capacity decreases significantly after substitution beyond x=0.33. The mechanistic impact of $Al^{3+}$ and vacancies is a subject of further/ongoing study.

REFERENCES CORRESPONDING TO EXAMPLE 7

(10) Gamon, J.; Duff, B. B.; Dyer, M. S.; Collins, C.; Daniels, L. M.; Surta, T. W.; Sharp, P. M.; Gaultois, M. W.; Blanc, F.; Claridge, J. B.; Rosseinsky, M. J. Computationally Guided Discovery of the Sulfide $Li_3AlS_3$ in the Li—Al—S Phase Field: Structure and Lithium Conductivity. Chem. Mater. 2019, 31 (23), 9699-9714. https://doi.org/10.1021/acs.chemmater.9b03230.

Statements Regarding Incorporation by Reference and Variations

All references throughout this application, for example, patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms “a”, “an”, and “the” include plural reference unless the context clearly dictates otherwise. Thus, for example, reference to “a cell” includes a plurality of such cells and equivalents thereof known to those skilled in the art. As well, the terms “a” (or “an”), “one or more” and “at least one” can be used interchangeably herein. It is also to be noted that the terms “comprising”, “including”, and “having” can be used interchangeably. The expression “of any of claims XX-YY” (wherein XX and YY refer to claim numbers) is intended to provide a multiple dependent claim in the alternative form, and in some embodiments is interchangeable with the expression “as in any one of claims XX-YY.”

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every device, system, composition, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant’s invention, including compounds for which an enabling disclosure is provided in the references cited herein, are not intended to be included in the composition of matter claims herein.

As used herein, “comprising” is synonymous with “including,” “containing,” or “characterized by,” and is inclusive or open-ended and does not exclude additional, unrecited elements or method steps. As used herein, “consisting of” excludes any element, step, or ingredient not specified in the claim element. As used herein, “consisting essentially of” does not exclude materials or steps that do not materially affect the basic and novel characteristics of the claim. In each instance herein any of the terms “comprising”, “consisting essentially of” and “consisting of” may be replaced with either of the other two terms. The invention illustratively described herein suitably may be practiced in the absence of any element or elements, limitation or limitations which is not specifically disclosed herein.

As used herein, “about” means within an acceptable error range for the particular value as determined by one of ordinary skill in the art, which is part of how the value is measured or determined, i.e., the limits of the measurement system. Unless explicitly stated otherwise in the Examples, Aspects, or elsewhere herein in connection with a particular assay, result or embodiment, "about" means within one standard deviation or at most according to practice in the art or within a range of 5%, whichever is greater.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A composition characterized by formula FX1:

$$Li_{w-\delta}Al_xFe_zS_2; \quad (FX1)$$

wherein w is greater than or equal to 2 and less than or equal to 2.5;

wherein x is greater than 0 and less than or equal to 0.5;

wherein z is greater than or equal to 0 and less than or equal to 1;

wherein δ is greater than or equal to 0 and less than w; and wherein the composition has an average net charge of 0.

2. The composition of claim 1, wherein:

the composition is characterized by formula FX2:

$$Li_{2+y-\delta}Al_yFe_{1-2y}S_2; \quad (FX2)$$

wherein y is greater than 0 and less than 0.5;

wherein δ is greater than or equal to 0 and less than 2+y.

3. The composition of claim 1, wherein:

the composition is characterized by formula FX3:

$$Li_{2+y}Al_yFe_{1-2y}S_2; \quad (FX3)$$

wherein y is greater than 0 and less than 0.5.

4. The composition of claim 2, wherein y is selected from the range of 0.1 to 0.3.

5. The composition of claim 2, wherein y is selected from the range of 0.15 to 0.25.

6. The composition of claim 2, wherein y is equal to 0.2.

7. The composition of claim 1, wherein the composition is formed by contacting and/or annealing a first precursor comprising $Li_2FeS_2$ with a second precursor comprising $Li_{2.5}Al_{0.5}S_2$ or contacting and/or annealing a first precursor comprising $Li_2S$, with a second precursor comprising FeS, and with a third precursor comprising $Al_2S_3$.

8. The composition of claim 1, characterized as a solid solution.

9. The composition of claim 8, wherein the solid solution follows Vegard's law with respect to a lattice constant as a function of a relative concentration of Al or Fe.

10. The composition of claim 1, wherein the composition comprises only intrinsic vacancies and no extrinsic vacancies.

11. The composition of claim 1, wherein the composition and crystal structure of the composition correspond to those of $Li_2FeS_2$ modified by replacement of approximately 2n of Fe ions with n Al ion and n Li ions in the crystal structure, wherein n is an integer greater than 0, and wherein the composition is characterized by formula FX3:

$$Li_{2+y}Al_yFe_{1-2y}S_2; \quad (FX3)$$

wherein y is greater than 0 and less than 0.5.

12. The composition of claim 1, wherein the composition is characterized by formula FX4:

$$Li_{2-\varepsilon}Al_{2y}Fe_{1-3y}Q_yS_2; \quad (FX4)$$

y is greater than or equal to 0 and less than or equal to 0.33;

ε is greater than or equal to 0 and less than or equal to 2; and the composition comprises extrinsic cation vacancies, where an extrinsic cation vacancy is represented in the chemical formula as Q.

13. The composition of claim 1, wherein the composition and crystal structure of the composition correspond to those of $Li_2FeS_2$ modified by replacement of approximately 3n of $Fe^{2+}$ ions with 2n $Al^{3+}$ ions in the crystal structure; wherein n is an integer greater than 0.

14. The composition of claim 1, wherein a lattice constant or a lattice volume of the composition has a linear dependence on x in FX1, the linear dependence having a linear regression or R-squared value greater than 0.91.

15. The composition of claim 1, wherein a lattice constant or a lattice volume of the composition has a linear dependence on y in FX3, the linear dependence having a linear regression or R-squared value greater than 0.91; wherein the composition is characterized by formula FX3:

$$Li_{2+y}Al_yFe_{1-2y}S_2; \quad (FX3)$$

wherein y is greater than 0 and less than 0.5.

16. The composition of claim 1, wherein the composition is characterized by an atomic unit cell having formula FX1, FX2, FX3, or FX4.

17. The composition of claim 1, wherein:

the composition has lattice parameters a, b, c, and β;

lattice parameter a is selected from the range of 6.75 Å and 6.86 Å;

lattice parameter b is selected from the range of 7.80 Å and 7.84 Å;

lattice parameter c is selected from the range of 6.23 Å and 6.30 Å; and lattice parameter β is selected from the range of 89.98° and 90.34°.

18. The composition of claim 1 having a crystal structure characterized by a trigonal or monoclinic space group or as a $P2_1/m$ monoclinic space group.

19. The composition of claim 1, wherein a gravimetric energy density of the composition is greater than or equal to 900 Wh/kg.

20. The composition of claim 1 being capable of one or more multielectron redox reactions and one or more anion redox reactions.

21. The composition of claim 1, wherein an electrical conductivity of the composition is selected from the range of $1.25\times10^{-2}$ S·cm$^{-1}$ to $1.75\times10^{-2}$ S·cm$^{-1}$.

22. A device comprising the composition of claim 1, the device being an electrochemical cell or a rechargeable lithium battery.

23. An electrochemical system comprising:

a cathode comprising a composition characterized by formula FX1:

$$Li_{w-\delta}Al_xFe_zS_2; \quad (FX1)$$

wherein w is greater than or equal to 2 and less than or equal to 2.5;

wherein x is greater than 0 and less than or equal to 0.5;

wherein z is greater than 0 and less than or equal to 1;

wherein δ is greater than or equal to 0 and less than w; and wherein the composition has an average net charge of 0.

24. A cathode of an electrochemical system, the cathode comprising:

a composition characterized by formula FX1:

$$Li_{w-\delta}Al_xFe_zS_2; \quad (FX1)$$

wherein w is greater than or equal to 2 and less than or equal to 2.5;

wherein x is greater than 0 and less than or equal to 0.5;

wherein z is greater than 0 and less than or equal to 1;

wherein δ is greater than or equal to 0 and less than w; and wherein the composition has an average net charge of 0.

25. A method of making a composition, the method comprising:

providing a first amount of $Li_2FeS_2$ and a second amount of $Li_{2.5}Al_{0.5}S_2$;

combining the first amount of $Li_2FeS_2$ and the second amount of $Li_{2.5}Al_{0.5}S_2$, thereby forming a combination; and heating the combination to form the combination having a lithium iron aluminum sulfide composition;

wherein the lithium iron aluminum sulfide composition is characterized by formula FX1:

$$Li_{w-\delta}Al_xFe_zS_2; \quad (FX1)$$

wherein w is greater than or equal to 2 and less than or equal to 2.5;

wherein x is greater than 0 and less than or equal to 0.5;

wherein z is greater than 0 and less than or equal to 1;

wherein δ is greater than or equal to 0 and less than w; and the lithium iron aluminum sulfide composition has a net charge of 0.

26. A method of making a composition, the method comprising:

providing a first amount of $Li_2S$, a second amount of FeS, and a third amount of $Al_2S_3$;

combining the first amount of $Li_2S$, the second amount of FeS, and the third amount of $Al_2S_3$, thereby forming a combination; and heating the combination to form the composition having a lithium iron aluminum sulfide composition;

wherein the lithium iron aluminum sulfide composition is characterized by formula FX1:

$$Li_{w-\delta}Al_xFe_zS_2; \quad (FX1)$$

wherein w is greater than or equal to 2 and less than or equal to 2.5;

wherein x is greater than 0 and less than or equal to 0.5;

wherein z is greater than 0 and less than or equal to 1;

wherein δ is greater than or equal to 0 and less than w; and the lithium iron aluminum sulfide composition has a net charge of 0.

* * * * *